US010242028B2

(12) United States Patent
Lavine

(10) Patent No.: US 10,242,028 B2
(45) Date of Patent: Mar. 26, 2019

(54) USER INTERFACE FOR SEARCH METHOD AND SYSTEM

(71) Applicant: Transparensee Systems, Inc., New York, NY (US)

(72) Inventor: Steven David Lavine, New York, NY (US)

(73) Assignee: Transparensee Systems, Inc., New York, NY (US)

( * ) Notice: Subject to any disclaimer, the term of this patent is extended or adjusted under 35 U.S.C. 154(b) by 1087 days.

(21) Appl. No.: 14/283,659

(22) Filed: May 21, 2014

(65) Prior Publication Data

US 2014/0258285 A1 Sep. 11, 2014
US 2017/0364535 A9 Dec. 21, 2017

Related U.S. Application Data

(63) Continuation of application No. 12/120,114, filed on May 13, 2008, now abandoned, which is a continuation-in-part of application No. 10/534,627, filed as application No. PCT/US03/36045 on Nov. 10, 2003, now Pat. No. 7,461,051.

(60) Provisional application No. 60/425,361, filed on Nov. 11, 2002.

(51) Int. Cl.
*G06F 17/30* (2006.01)
*G06F 7/00* (2006.01)

(52) U.S. Cl.
CPC .. *G06F 17/30241* (2013.01); *G06F 17/30554* (2013.01); *G06F 17/30864* (2013.01); *G06F 17/30994* (2013.01)

(58) Field of Classification Search
CPC ......... G06F 17/30398; G06F 17/30595; G06F 17/30716
See application file for complete search history.

(56) References Cited

U.S. PATENT DOCUMENTS 5,926,812 A * 7/1999 Hilsenrath .......... G06F 17/3071
707/737
6,463,431 B1 * 10/2002 Schmitt ............ G06F 17/30398
707/999.004
6,640,227 B1 * 10/2003 Andreev .............. G06K 9/6219
707/737

(Continued)

*Primary Examiner* — Pavan Mamillapalli
(74) *Attorney, Agent, or Firm* — Hickman Palermo Becker Bingham LLP

(57) ABSTRACT

A user interface for searching records in a database is provided. Each record contains information regarding one or more categories. The user interface receives search criteria of one or more categories and provides search results comprising exact and/or non-exact matching records. A non-exact matching record has a relevance value representing the relevance of the record to the search query, the non-exact matching records being displayed in an ordering based on the relevance values. The user interface provides slider tools for receiving changes in a weight value or search criterion of an associated category. A new ordering of the non-exact matching records is displayed in real-time based on the new received weight values or search criterion. The user interface may also provide a mapping tool, a search-result selection function, and/or one or more drill down tools. The user interface may provide any tool or function alone or in any combination.

20 Claims, 50 Drawing Sheets

(56) References Cited

U.S. PATENT DOCUMENTS

| | | | |
|---|---|---|---|
| 2003/0088545 A1* | 5/2003 | Subramaniam | G06F 17/30595 707/999.003 |
| 2005/0004918 A1* | 1/2005 | Platt | G06F 17/30595 707/999.1 |
| 2005/0010606 A1* | 1/2005 | Kaiser | G06F 17/30595 707/999.2 |
| 2005/0015368 A1* | 1/2005 | Payton | G06F 17/30398 707/999.003 |
| 2005/0049902 A1* | 3/2005 | Cordery | G06F 17/3053 707/792 |
| 2005/0053072 A1* | 3/2005 | Guerrero | G06F 17/30448 370/395.32 |
| 2005/0108252 A1* | 5/2005 | Pfaltz | G06F 17/30539 707/999.1 |
| 2013/0227077 A1* | 8/2013 | Tsai | H04L 63/0823 709/219 |
| 2014/0297614 A1 | 10/2014 | Lavine et al. | |

* cited by examiner

Anonymity Level Properties - Posting Content

| | Anonymous | Unlinked Anonymous | Linked Anonymous | Pseudonymous |
|---|---|---|---|---|
| Logged in? | No | Yes | Yes | Yes |
| Reputation tracking | No | No, but reputation at time of posting attached to message | Yes | Yes |
| Content posted as | "Anonymous" | "Anonymous" | Unique id per context (I.e. discussion). For example "Anon23" | Username (e.g. "BobSmith" |
| Can mail poster | No | No | Yes | Yes |

FIG. 19

[Find Text]

42 [Search] [Enhanced Search] 44

Multiple Choice

| | | | |
|---|---|---|---|
| Gender | Male / Female — 40 | Age | 18-20 / 21-25 / 26-30 / 31-35 — 40 |
| Height | Under 5ft / 5ft - 5ft2 / 5ft2 – 5ft4 / 5ft4 – 5ft6 | Marital Status | Never Married / Divorced / Widowed / Involved |
| Weight | Under 100 lbs / 100 – 110 lbs / 110 – 125 lbs / 125 – 140 lbs | Education | Self-Taught / High School / Technical-Training / Bible College |
| Eye Vision | No eyewear / Reading Glasses / Great Glasses / Cool Contacts | Occupation | Executive / Administrative / Financial / Government |
| Eye Color | Blue / Green / Hazel / Brown | Salary | Not Listed / Under 15K / 15-25K / 25-40K |
| Hair Color | Blonde / Dark Blonde / Brown / Brunette | Hair Length | Long curly/wavy / Long straight / Medium curly/wavy / Medium straight |
| Race | White-Caucasian / Asian / African Descent / Hispanic-Latino | Body Type (Ladies) | Slender / Slim-Fit / Toned / Average |
| Location | North-East US / East-Coast US / North-West US / Central US | Body Type (Gentlemen) | Thin-Lean / Toned-Athletic / Muscular / Average |
| Children | 1 / 2 / 3 / 4 | Smoke | Yes / No / On occasion / Trying to quit |
| Children at Home | Yes / No | Drink | Never / Rarely / Socially / Regularly |

*Fig. 23*

Search results

Selection: Weight=[110-125 lbs / 50-57 kg] Education=[Masters] Gender=[Female] Eye color=[Blue] Height=[5ft2 - 5ft4 / 1.57m-1.63m] Hair color={Blonde] Age=[31-35] Marital status=[Single-Never Married]

[find text]

[search] [enhanced search]

Time taken: 0.267 seconds

Displaying 1-2 of 115401 users

| Id | Gender | Age | Height | Marital status | Weight | Education | Eye vision | Occupation | Eye color | Salary | Ha |
|---|---|---|---|---|---|---|---|---|---|---|---|
| Selection | Female | 31-35 | 5ft2-5ft4 | Never Married | 110-125 lbs | Masters | | | Blue | | Bl |
| heididitch | Female | 31-35 | 5ft2-5ft4 | Never Married | 110-125 lbs | Masters | Reading Glasses | Professional | Blue | 25-40K | Bl |
| bobou | Female | 31-35 | 5ft2-5ft4 | Never Married | 110-125 lbs | Masters | No eyewear | Legal Services | Blue | Over 100K | Bl |

*Fig. 24*

Enhanced Search results

Selection: Weight=[110-125 lbs / 50-57 kg] Education=[Masters] Gender=[Female] Eye color=[Blue] Height=[5ft2 - 5ft4 / 1.57m-1.63m] Hair color=[Blonde] Age=[31-35] Marital status=[Single-Never Married]

[          ]  [ find text ]

[ search ]  [ enhanced search ]

Time taken: 3.065 seconds

Page: [ 1 ▼ ]  Displaying 1-20 of 115401 users

| Id | Gender | Age | Height | Marital status | Weight | Education | Eye vision | Occupation | Eye color | Sa |
|---|---|---|---|---|---|---|---|---|---|---|
| Selection | Female | 31-35 | 5ft2 - 5ft4 | Never Married | 110 - 125 lbs | Masters | | | Blue | |
| bobou | Female | 31-35 | 5ft2 - 5ft4 | Never Married | 110 - 125 lbs | Masters | No eyewear | Legal Services | Blue | Ov 10 |
| heididitch | Female | 31-35 | 5ft2 - 5ft4 | Never Married | 110 - 125 lbs | Masters | Reading Glasses | Professional | Blue | 25 |
| LANDDECKER | Female | 31-35 | 5ft2 - 5ft4 | Never Married | 125 - 140 lbs | Masters | Cool Contacts | Financial | Blue | No yo bu |
| Barb | Female | 31-35 | 5ft2 - 5ft4 | Never Married | 125 - 140 lbs | Masters | No eyewear | Professional | Blue | 40 |
| Julie | Female | 31-35 | 5ft2 - 5ft4 | Never Married | 125 - 140 lbs | Masters | No eyewear | Professional | Blue | 40 |
| helena | Female | 31-35 | 5ft2 - 5ft4 | Never Married | 100 - 110 lbs | Masters | No eyewear | Executive | Blue | No yo bu |
| kooky | Female | 26-30 | 5ft2 - 5ft4 | Never Married | 110 - 125 lbs | Masters | Great Glasses | Financial | Blue | 40 |
| jeda | Female | 26-30 | 5ft2 - 5ft4 | Never Married | 110 - 125 lbs | Masters | No eyewear | Musician | Blue | No lst |
| Gotfaith | Female | 36-40 | 5ft2 - 5ft4 | Never Married | 110 - 125 lbs | Masters | Cool Contacts | Teacher | Blue | 25 |
| freedom | Female | 26-30 | 5ft2 - 5ft4 | Never Married | 110 - 125 lbs | Masters | No eyewear | Unsure | Blue | 25 |
| Randborn | Female | 26- | 5ft2 - | Never | 110 - | Masters | No | Executive | Blue | Po |

*Fig. 25A*

| | | 30 | 5ft4 | Married | 125 lbs | | eyewear | | | |
|---|---|---|---|---|---|---|---|---|---|---|
| catscratch | Female | 26-30 | 5ft2-5ft4 | Never Married | 110-125 lbs | Masters | No eyewear | Writer | Blue | No list |
| blondechick | Female | 31-35 | 5ft2-5ft4 | Never Married | 110-125 lbs | College-University | Great Glasses | Legal Services | Blue | No list |
| Kay | Female | 31-35 | 5ft2-5ft4 | Never Married | 110-125 lbs | College-University | No eyewear | Professional | Blue | 15 |
| anydaynow | Female | 31-35 | 5ft2-5ft4 | Never Married | 110-125 lbs | College-University | No eyewear | Technical | Blue | No you bu |
| hopesthall | Female | 31-35 | 5ft2-5ft4 | Never Married | 110-125 lbs | College-University | Great Glasses | Administrative | Blue | No list |
| sarasotabound | Female | 31-35 | 5ft2-5ft4 | Never Married | 110-125 lbs | College-University | Cool Contacts | Financial | Blue | No you bu |
| Colleen | Female | 31-35 | 5ft2-5ft4 | Never Married | 110-125 lbs | College-University | Cool Contacts | Executive | Blue | 60 |
| Nicole | Female | 31-35 | 5ft3-5ft4 | Never Married | 110-125 lbs | College-University | No eyewear | Sales | Blue | 40 |
| sheri | Female | 31-35 | 5ft4-5ft6 | Never Married | 110-125 lbs | Masters | No eyewear | Medical | Blue | 40 |

*Fig. 25B*

| Find more users like this | | 50 | Most similar users |
|---|---|---|---|
| Vitals : LandK | | | search: |
| Create date 2 | 002-02-18 | Create time 19:52:32 | LubaQ |
| First name | | Last name | loveofgod |
| Address | | Apt | wildernessgal |
| City | San Bernardino | Province California | beth |
| Country | United States | Zip code 92423 | Stullions |
| Birth month | 1 | Birth day 21 | Summer |
| Birth year | | Heard from 28 | Amy |
| Heard from text | | | candlesticks |
| | | | webgrrl |
| | | | haledon |

Long Answers

| | |
|---|---|
| What are some of your personal goals in life? | To please God, spend time with my family, find the man he has chosen for me, enjoy life on this earth to the fullest, and rejoice in heaven. |
| What would be the perfect setting for a first meeting with a new friend or date? Describe it :-) | Coffee, burgers, church- I'm up for anything!! |
| Describe your Christian faith. Where are you at and what are your goals? What Scripture verses are important to you? | I am learning on strengthening my faith right now, living in God's will, and preparing for his coming. |
| Describe a little of your personality and character traits. (Are you funny, laid back, more serious, open, shy, etc.?) | I am serious alot of times but also have a very funny side when with good company |
| Describe your current occupation. Do you like what you do? What is your dream job? | My current job is in Research Marketing. I also work with databases. I find this field both challenging and rewarding. I am always striving to do better and move up the ladder. |
| Where were you born? Have you ever traveled? If so, where? What is your ideal adventure? | Born on the east coast, raised in Texas and Arizona, lived in Germany, and California. Love to settle somewhere where there are stars in the sky, big open fields and clean air. Been traveling since I was a baby and recently went to Japan. |
| What are your favorite activities? (Including sports, leisure, artistic/musical, etc.) | not a big sports fan but like just about everything else |
| Where did you go to school (i.e. high school or college/university, etc.)? What did you study? Did you like it? Would you like to do more? | University of Redlands- Business and Management |
| Describe the type of relationship you are looking for. What qualities would you like in this relationship or person? | I am not sure exactly right now. I think that I will know when I find it. But definitely must be caucasian, tall, good-looking gentelman who is neat, clean-cut, sincere, likes to travel, has a sense of humor, and a follower of Christ. They must also love |
| What caused your last relationship to end? | My mom died about 2 years ago and I rushed into a relationship too |

*Fig. 26A*

| | |
|---|---|
| What have you learned from past relationships? | fast. I have learned to follow God's will and not my own. I have also learned that it is far better to have one good relationship than several bad ones. So I will wait as long as it takes |

Multiple Choice

| | | | |
|---|---|---|---|
| Gender | Female | Age | 26-30 |
| Height | 5ft2 - 5ft4 | Marital status | Divorced |
| Weight | 110 - 125 lbs | Education | College - University |
| Eye vision | No eyewear | Occupation | Computers |
| Eye color | Blue | Salary | Not listed |
| Hair color | Blonde | Hair length | Medium straight |
| Race | White-Caucasian | Body type (ladies) | Toned |
| Location | South-West US | Body type (gentlemen) | Thin - Lean |
| Children | 1 | Smoke | No |
| Children at home | Yes | Drink | Socially |
| Want children | Undecided | Pets | Cat |
| Christian faith | Significant place in my life | Personality type 1 | Go-getter |
| Denomination | Non-denominational | Quirks habits | A few eccentricities |
| Church involvement | Attend Regularly | Fashion sense | Depends on my mood |
| Mood | Usually cheerful | Personality type 2 | Generally organized |
| Sense of humor | Enjoy a good joke or story | Favorite music | All except for Rap! |
| Favorite outdoor activity | Traveling | Transportation | SUV |
| Travel | Would like to see more | Describe looks | Stunning |
| Describe intellect | Smart | Reading material | A variety |
| Relationship kind | Wherever God leads | | |

*Fig. 26B*

[ Find more users like this ]

Vitals : LubaO

| | | | | Most similar users |
|---|---|---|---|---|
| | | | | search: |
| Create date | 2001-10-30 | Create time | 04:52:20 | |
| First name | | Last name | | Stallone |
| Address | | Apt | | beth |
| City | Blysk | Province | Outside US, Canada and Australia | wildernessgal |
| Country | Russia | Zip code | 659302 | daughteroftheking |
| Birth month | 3 | Birth day | 23 | Landk |
| Birth year | | Heard from | 50 | clare |
| Heard from text | | | | Teryl |
| | | | | light |
| | | | | Summer |
| | | | | SusieQ |

Multiple Choice

| | | | |
|---|---|---|---|
| Gender | Female | Age | 36-40 |
| Height | 5ft4 - 5ft6 | Marital status | Divorced |
| Weight | 125 - 140 lbs | Education | College - University |
| Eye vision | Great Glasses | Occupation | Computers |
| Eye color | Blue | Salary | Not listed |
| Hair color | Blonde | Hair length | Medium curly/wavy |
| Race | White-Caucasian | Body type (ladies) | Average |
| Location | Russia-CIS | Body type (gentlemen) | Thin - Lean |
| Children | 1 | Smoke | No |
| Children at home | Yes | Drink | Socially |
| Want children | Undecided | Pets | None currently |
| Christian faith | I believe in God | Personality type 1 | Emotional |
| Denomination | Just Christian | Quirks habits | Nothing serious |
| Church involvement | Attend occasionally | Fashion sense | Elegant |
| Mood | Usually cheerful | Personality type 2 | Generally organized |
| Sense of humor | Enjoy a good joke or story | Favorite music | Classic Rock |
| Favorite outdoor activity | Traveling | Transportation | Economy car |
| Travel | Would like to see more | Describe looks | Above average |
| Describe intellect | Smart | Reading material | Adventure |
| Relationship kind | Marriage minded | | |

*Fig. 27*

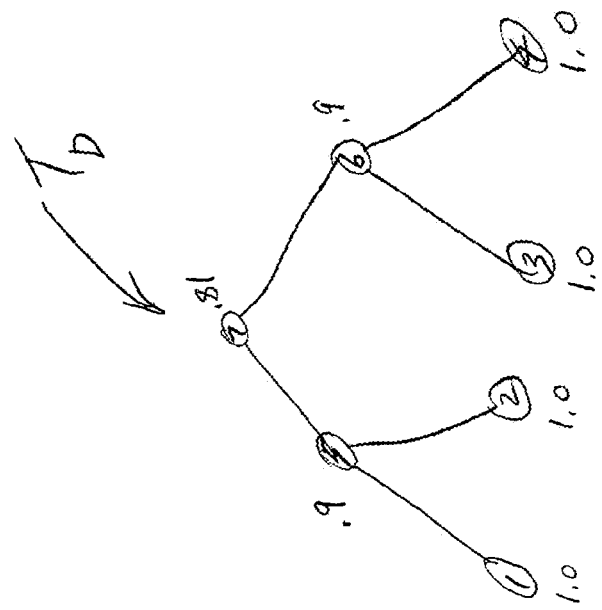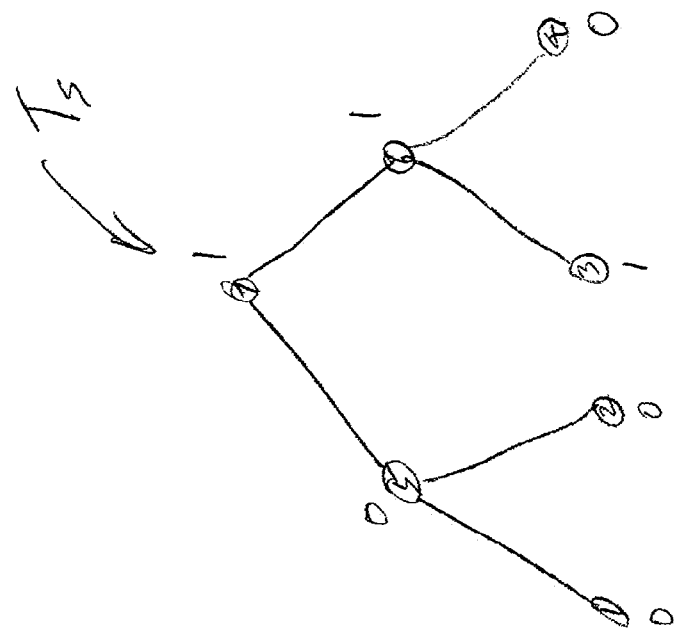
Fig. 30

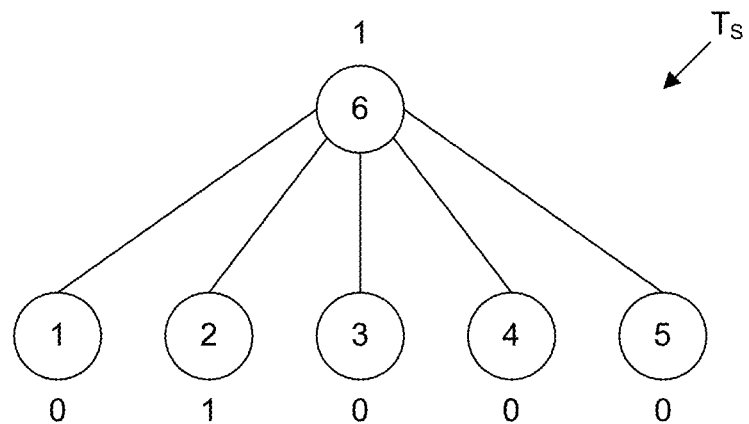
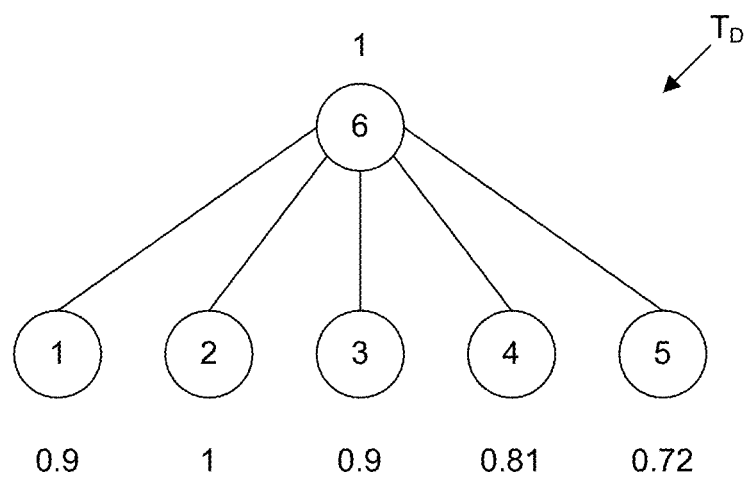
*Fig. 31*

|  | Address | Zip Code | Price | Bedrooms | Bathrooms |  |
|---|---|---|---|---|---|---|
| Exact Matches | A1 | 95129 | $742,000 | 4 | 2 | ... |
| 3301 | A2 | 95129 | $748,000 | 4 | 2 | ... |
| Non-Exact Matches | A3 | 95129 | $752,000 | 4 | 2 | ... |
|  | A5 | 95130 | $740,000 | 4 | 3 | ... |
| 3302 | A7 | 95128 | $748,000 | 4 | 2 | ... |
|  | A4 | 95129 | $748,000 | 5 | 2 | ... |
|  | A6 | 95129 | $735,000 | 5 | 2 | ... |
|  | ⋮ | ⋮ | ⋮ | ⋮ | ⋮ |  |

Fig. 33B

3625 { Price: 200-300    Rating: 3                                  3600

| | | Name | Price | Resolution | Rating |
|---|---|---|---|---|---|
| | Resolution | | | | |
| ☐ | < 5 MP (0) | | | | |
| ☐ | 5 MP (2) | | | | |
| ☐ | 6 MP (5) | Exact Matches | | | |
| ☐ | 7 MP (6) | Na | 225 | 6 | 3 |
| ☒ | 8 MP&up (2) | Nb | 270 | 7 | 3 |
| | | 3301 ⋮ | ⋮ | ⋮ | ⋮ |
| | LCD Size | Non-exact matches | | | |
| ☐ | 1-2 in (6) | Nc | 305 | 8 | 3 |
| ☐ | 2-3 in (4) | Nd | 255 | 7 | 4 |
| ☐ | 3 in&up (5) | 3302 ⋮ | ⋮ | ⋮ | ⋮ |

3625 { Price: 200-300     Rating: 3     Resolution: 8                    3600

| | | Name | Price | Resolution | Rating |
|---|---|---|---|---|---|
| Resolution | | | | | |
| ☐ < 5 MP (0) | | | | | |
| ☐ 5 MP (0) | Exact Matches | Na | 285 | 8 | 3 |
| ☐ 6 MP (0) | | Nb | 292 | 8 | 3 |
| ☐ 7 MP (0) | | Nc | 225 | 6 | 3 |
| ☒ 8 MP&up (2) | | Nd | 270 | 7 | 3 |
| | | ⋮ | ⋮ | ⋮ | ⋮ |
| LCD Size | Non-exact matches | Ne | 305 | 8 | 3 |
| ☐ 1-2 in (0) | | Nf | 277 | 7 | 3 |
| ☐ 2-3 in (0) | | ⋮ | ⋮ | ⋮ | ⋮ |
| ☐ 3 in&up (2) | | | | | |

3625 {LCD Size: 1-2in   LCD Size: 2-3in

3600

3610

3605

| | Price | | | |
|---|---|---|---|---|
| ☐ | <100 (102) | | | |
| ☐ | 100-200 (75) | | | |
| ☐ | 200-300 (57) | | | |
| ☐ | 300-400 (101) | | | |
| ☐ | > 400 (42) | | | |

3601

| Name | Price | Resolution | Rating |
|---|---|---|---|
| Na | 335 | 7 | 2 |
| Nb | 215 | 5 | 4 |
| Nc | 420 | 8 | 3 |
| ⋮ | ⋮ | ⋮ | ⋮ |

3350

3620

| | Resolution | |
|---|---|---|
| ☐ | < 5 MP (96) | |
| ☐ | 5 MP (96) | |
| ☐ | 6 MP (54) | |
| ☐ | 7 MP (83) | |
| ☐ | 8 MP&up (48) | |

3601

| | LCD Size | |
|---|---|---|
| ☒ | 1-2 in (229) | |
| ☒ | 2-3 in (148) | |
| ☐ | 3 in&up (0) | |

3615

| | Editor Rating | |
|---|---|---|
| ☐ | 0 (6) | |
| ☐ | 1 (95) | |
| ☐ | 2 (176) | |
| ☐ | 3 (88) | |
| ☐ | 4 (12) | |

Fig. 36F

3625 { Price: 200-300    Rating: 3    3700
| | | Name | Price | Resolution | Rating |
|---|---|---|---|---|---|
| Resolution | | | | | |
| ☐ < 5 MP (0) | | | | | |
| ☐ 5 MP (2) | Exact Matches | Na | 225 | 6 | 3 |
| ☐ 6 MP (5) | | Nb | 270 | 7 | 3 |
| ☐ 7 MP (6) | 3301 | ⋮ | ⋮ | ⋮ | ⋮ |
| ☐ 8 MP&up (2) | | | | | |
| LCD Size | Non-exact matches | Nc | 305 | 8 | 3 |
| ☐ 1-2 in (6) | | Nd | 255 | 7 | 4 |
| ☐ 2-3 in (4) | 3302 | ⋮ | ⋮ | ⋮ | ⋮ |
| ☐ 3 in&up (5) | | | | | 3350 |
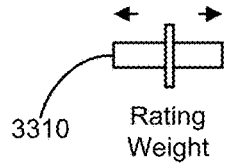
3310  Rating Weight
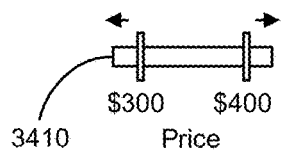
3410  $300  $400  Price
Fig. 37A

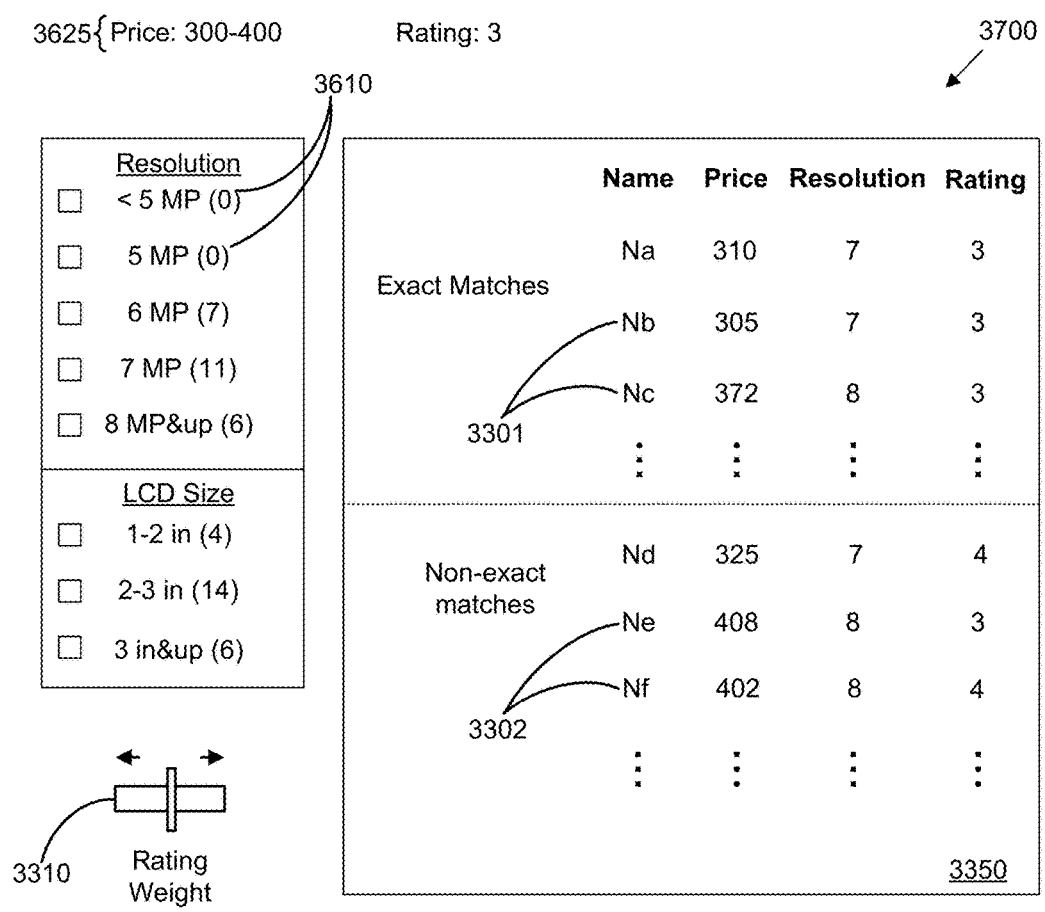
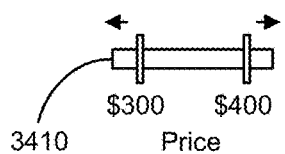
Fig. 37B

|  | Address | Zip Code | Price | Bedrooms | Bathrooms | |
|---|---|---|---|---|---|---|
| Exact Matches | | | | | | |
| 3301 — Ax | | 95128 | $748,000 | 4 | 2 | ... |
| Non-Exact Matches | | | | | | |
| 3302 — Ay | | 95128 | $752,000 | 4 | 2 | ... |
| ⌐ Az | | 95129 | $748,000 | 4 | 2 | ... |
| ⋮ | ⋮ | ⋮ | ⋮ | ⋮ | ⋮ | |

USER INTERFACE FOR SEARCH METHOD AND SYSTEM

RELATED APPLICATIONS

This patent application claims benefit to and is a continuation of the United States Patent Application entitled "USER INTERFACE FOR SEARCH METHOD AND SYSTEM," having Ser. No. 12/120,114 filed on May 13, 2008.

FIELD OF THE INVENTION

The present invention relates generally to a user interface for a searching method and system.

BACKGROUND OF THE INVENTION

The Internet, and particularly the Worldwide Web, has caused a virtual information explosion. An average user, making use of a conventional web browser, now has available to him a mass of information that would have been unimaginable just a few years ago. This includes information available from professional and commercial sources, individuals, and message boards or forums, where users "congregate" to discuss every imaginable topic, and some that are not. With the wealth of information that is available, a new problem has arisen: How can that information be found?

This problem has been addressed by a plethora of "search engines", which are software programs and information systems that are specifically designed to assist users in finding information. While existing search engines have been adequate, they are limited in their ability to uncover useful information when users are searching. The primary reason is that search engines tend to be language based, and a searcher is not always familiar with the common terminology in his field of search. Also, there may be useful information available which does not conform to the common terminology. It also takes substantial skill or experience to formulate queries that will produce meaningful results.

In accordance with the present invention, search results are achieved that are broader and more intelligent than basic keyword searching. This is achieved by imposing a structure on data being searched and utilizing the same structure for search queries. Relevant information is then uncovered by correlating the structure of the data being searched and the structure of the query. Items to be searched can include anything: messages, discussions, articles, polls, transcripts, or anything else that can be linked to or pulled from a database. Search results can be included that are less than 100% relevant, and not just 100% relevant. In the absence of, or in addition to, results that would be generated by a Boolean keyword-only-search, users can retrieve results of some relevance, for example as determined by a set of selectable filter criteria. Consequently, merchants can sell inventory which might otherwise be unseen and/or users can find information which might otherwise stay hidden in an overly strict Boolean search.

The method of the present invention is the glue that holds online speakers together as they seek to use the Worldwide Web to communicate as they do in life. It lets users speak without seeing the spam that fills most message boards; allows interesting conversations to take place without interruption; and gives users the anonymity to talk candidly without fear that their identities may be revealed.

Where message board sites or forums are concerned, the present invention transforms ordinary sites into profitable "para-sites." Para-sites are sites that feed off the work of their own users. A para-site powered by the present invention collects interesting, relevant information by harnessing users to post and organize content, at no cost to the site-operator. Methods and systems embodying the present invention will hereafter be referred to by use of the assignee's trademark TRANSPARENSEE™. Users find sites stickier than other sites because of the high quality of information generated by the present invention. Site owners can restrict access to this information in different ways, allowing the most valuable information to be repackaged and resold to different markets at different price points.

As repositories of filtered information, TRANSPARENSEE™ sites attract users with specific interests. Users who speak intelligently about subjects they know soon find that their opinions on that subject carry more weight—and are heard by more people—than the opinions of others. The weight given to a particular user's thoughts on a subject is quantified as the user's "reputation" for knowing that subject.

TRANSPARENSEE™ sites allow users to develop and maintain complex, multi-variable reputations for a wide variety of different subjects. As users develop high reputations for knowing a particular subject, they gain privileges on the site as a result; as they gain privileges, their investment in the site grows. High-reputation users become reluctant to move conversations off-site because, by leaving, they'll lose the benefits they've gained as high-reputation users.

As a result, high-reputation users tend to remain on TRANSPARENSEE™ sites, and communities develop. These communities are deeply rooted in the site due to the investments their members have made by building reputations. For this reason, community members (and communities) cannot easily be lured away to non-TRANSPARENSEE™ sites.

A sticky community of experts sharing information in a highly accessible way attracts new users. New users generate content, develop reputations, and become community members, thus adding to the attractive pull of the community.

These network effects feed upon themselves, building small communities into large ones. The larger a community grows, the more information it has under discussion, the greater the number and expertise of its users, and the stronger a pull it exerts on new members. When a community grows large enough and vibrant enough, it becomes the only logical place for a new user to go in order to learn about or discuss a subject.

Because the present invention makes it easier for people to communicate, sites that use the present invention quickly attract users. As these users gain reputations they develop into communities that are hard to displace. Network effects cause these communities to grow quickly. Taken together, this means that the first company to use the reputation feature of the present invention in any particular market has a substantial first-mover advantage. The bulk of users in that market will end up on TRANSPARENSEE™ sites, and will form deep-rooted communities TRANSPARENSEE™ site reputations are portable. Reputation values are stored at and administered from a central location, allowing users to carry their reputations with them from TRANSPARENSEE™ site to TRANSPARENSEE™ site. In other embodiments, reputation values are stored in a partly or wholly distributed fashion.

As the number of TRANSPARENSEE™ sites grows, the company's proprietary database of reputations also grows.

When this database has reached a critical mass it will have tremendous value. Companies that choose to power their sites with the present invention will automatically become members of the TRANSPARENSEE™ Network, allowing them access to a large user base of individuals who may start using their pre-built reputations on the new site right away.

By allowing Web-site operators to inexpensively gather and distribute "insider speech," the present invention fills a demand which, though strong, has not been met by any other product. The invention is equally unique in the way that it allows licensees to precisely target users based on detailed information without invading their individual privacy.

The present invention provides several immediate benefits. It promotes the disclosure of superior information, then ranks and organizes that information in a way that allows it to be easily packaged and sold to different audiences at different price points. It makes sites stickier while at the same time allowing licensees to provide advertisers with far more narrowly targeted advertisements than they otherwise could, substantially increasing advertising revenues. And it allows companies to lessen (or eliminate) the cost of hiring moderators to monitor online discussion.

SUMMARY OF THE INVENTION

A user interface is provided herein for receiving a search query for a database stored in computer storage, the database having multiple records. Each record may contain information regarding one or more categories, each category having an assigned weight value. The search query may comprise a set of one or more search criteria of one or more categories for searching the database. The user interface may provide a category-weight slider tool associated with a category, the category-weight slider tool for receiving changes in a weight value of the associated category from a user. The user interface may also provide a search-results section for displaying one or more exact matching records and one or more non-exact matching records, each exact matching record comprising information that exactly matches received search criteria and each non-exact matching record comprising information that does not exactly match one or more received search criteria.

Each non-exact matching record may have a relevance value representing the relevance of the non-exact matching record to the search query, a relevance value for a record being based, in part, on weight values associated with the one or more categories. The non-exact matching records may be displayed in the search-results section in an ordering based on the relevance values. Upon the category-weight slider tool receiving a new weight value of a category from the user, a new ordering of the non-exact matching records is displayed based on the new weight value. The user interface may display the new orderings of the non-exact matching records dynamically and in real-time as new weight values are received from the category-weight slider tool without requiring the user to type in new weight values or to otherwise initiate displaying the new orderings.

The user interface may further provide a category-value slider tool associated with a category, the category-value slider tool for receiving changes in search criterion of the associated category from a user. Upon the category-value slider tool receiving a new search criterion of a category from the user, the search-results section displays (dynamically and in real-time) a new ordering of the non-exact matching records based on the new search criterion. The user interface may further provide a mapping tool for determining address information contained in the search results and displaying symbols representing the search results on a map. Upon the category-weight slider tool receiving a new weight value or new search criteria of a category from the user, symbols representing new search results are displayed based on the new weight value and/or new search criteria. The user interface may further provide a search-result selection function for receiving a user selection of a search result. Upon receiving a selection of a search result, the function uses the information of the selected search result as search criteria for a new search query, and displays search results based on the new search query.

In some embodiments, the user interface provides a category-value slider tool associated with a category and a drill down tool for an associated search criterion of an associated category. The drill down tool may display an exact-match number comprising the number of records comprising information that exactly matches the search criterion associated with the drill down tool and all received search criteria. Upon the category-value slider tool receiving a new search criterion of a category from the user, the drill down tool may display a new exact-match number based on the new search criterion. The drill down tool may display new exact-match numbers dynamically and in real-time as new search criteria are received from the category-value slider tool without requiring the user to type in new search criteria or to otherwise initiate displaying of the new exact-match numbers. The user interface may further provide a multi-select drill-down function for allowing simultaneous selection of two or more search criteria (associated with the two or more drill down tools) specified for the same category.

BRIEF DESCRIPTION OF THE DRAWINGS

The foregoing brief description, as well as further objects, features, and advantages of the present invention will be understood more completely from the following detailed description of a presently preferred, but nonetheless illustrative embodiment, with reference being had to the accompanying drawings, in which:

FIG. 19 illustrates key features of different levels of anonymity;

FIG. 23 is an exemplary partial screen shot presented to a searcher in the dating service database;

FIG. 24 is a screen shot representing the results of an exemplary search;

FIGS. 25a and 25b, together illustrate the results of an enhanced search;

FIGS. 26a and 26b are screen shots of a page of the online dating service which permits a searcher to review a candidate's long answers and a summary of the multiple choice answers;

FIG. 27 is a screen shot of a summary page for a user;

FIG. 30 is a tree diagram illustrating a process for determining relevance of a category having a hierarchical data structure;

FIG. 31 is a tree diagram illustrating a process for determining the relevance value of a category having a scalar structure;

FIGS. 33A-B show exemplary screen shots of user interfaces implementing category-weight slider tools;

FIGS. 36A-F show exemplary screen shots of user interfaces implementing drill down tools;

FIGS. 37A-B show exemplary screen shots of user interfaces implementing category-value slider tools for use in conjunction with drill down tools;

FIGS. 38A-B show exemplary screen shots of user interfaces providing the search-result selection function for selecting a particular search result as search criteria for a new search.

DETAILED DESCRIPTION OF THE PREFERRED EMBODIMENTS

The disclosure of United States Patent Application entitled "SEARCH METHOD AND SYSTEM AND SYSTEM USING THE SAME," having Ser. No. 10/534,627 filed on Jan. 3, 2006, is expressly incorporated herein by reference.

Figure 22:
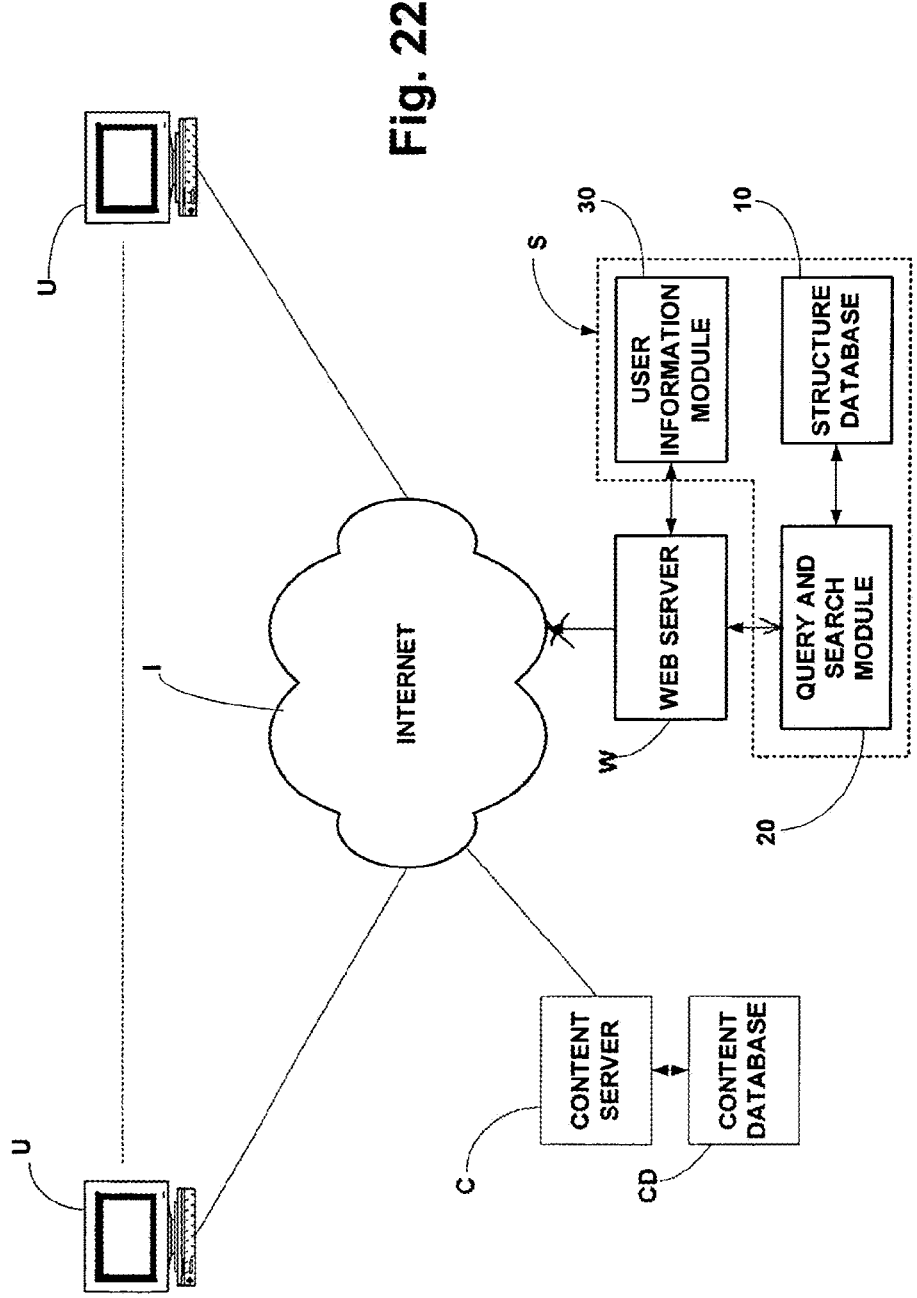
FIG. 22 is a functional block diagram illustrating the preferred environment for the present invention.

FIG. 22 is a functional block diagram illustrating the preferred environment for the present invention. A plurality of users' computers U access a content server C via a network I, preferably the Internet. Server C provides the users U access to a content database CD. Database CD may provide various types of information. For example, it may maintain the information used by an online dating service. Alternatively, it could provide the information for a restaurant survey service or wine survey service, or numerous other special interest services. Database CD could also include, in addition to surveys, product reviews and articles of interest on various subjects.

Also connected to the network I is a web server W which cooperates with a system S, in accordance with the present invention, to manage users' access to information in database CD. Within system S, a query and search module 20 in accordance with the present invention interfaces with users, permitting them to formulate requests for information from database CD. Module 20 creates, manages and maintains a structure database 10, which contains information describing the structural relationship between various pieces of information in database CD. Database 10 also contains information relating to the structural relationship between various portions of information in a query in a format comparable to the structural relationship of information in database CD.

In accordance with the present information, information in the database 10 is used to correlate the data structure of a query to the structure of database CD, in order to determine that information in database CD which needs to be provided to a user in response to a query. Server W then connects the user to server C, with instructions to server C regarding what information is to be provided to the user from database CD.

In some embodiments of the invention, system S also includes a user information module. This module is particularly useful in systems in which users access information in database CD which has been provided by other users. Module 30 could then, for example, include information about the reputation of various users with respect to the information which they have furnished. A user accessing information in database CD which has been provided by other users is then able to gauge the reliability of that information.

Those skilled in the art will appreciate that the functions of servers C and W could be combined in a single server. Alternatively, server W and system S could accommodate access to different, independent content databases CD relating to different subject matter. The user could thereby be offered access to information in a plurality of databases of different content through a single query generated via web server W.

The invention will best be understood through the detailed description of a number of preferred embodiments. In accordance with a first embodiment, a dating service is provided in which persons seeking potential mates (candidates) populate a database with information relating to themselves. Potential mates (searchers) can then access that database, providing various search criteria, in order to locate appropriate, potential mates. Those skilled in the art will appreciate that a similar model is applicable for numerous other services, such as, employment agency services.

FIG. 23 is an exemplary screen shot presented to a searcher in the dating service database. The searcher is presented with a plurality of multiple choice menus 40 from which he is to select desirable traits of a potential mate. For example, the top three menus on the left of FIG. 23 relate to the gender, height and weight of a potential mate, while the top three menus 40 on the right relate to the age, marital status and education of the potential mate. A searcher need not make a selection in every menu 40, but only those which he considers important. Upon making those selections, the searcher clicks on the search button 42, and the search commences. Although not shown specifically on this screen, the searcher may be offered an opportunity to assign a relative weight to the different menus prior to activating the search.

FIG. 24 is a screen shot representing the results of an exemplary search. In this case, the user has made selections in menus 40 relating to gender, age, height, martial status, weight, education, eye color, and hair color. That search has produced two candidates, Heidildtch and Bobou, both of which are exact matches to the selected criteria.

In this embodiment, a searcher is also able to click on the button 44 in order to obtain an enhanced search.

FIGS. 25a and 25b, together illustrate the results of an enhanced search. In addition to the two exact matches, there are a number of approximate matches. For example, "Landdecker" has a weight in excess of the selected category, but otherwise matches. Similarly, starting with "Helena", the weight is below the selected range. Similarly, the remaining entries in FIG. 25a all relates to weight which are in excess of the selection and FIG. 25b relates to candidates which are older. The present invention is therefore able to locate matches which are close, but are not exact. The candidates are listed in decreasing order of relevance as defined by the user's selected criteria. The listing of users with different weights above those which are older reflects a relative higher menu weighting imposed on the weight sub-category than on the age sub-category.

In accordance with the present embodiment, a candidate also provides long answers to preset questions. FIGS. 26a and 26b are screen shots of a page of the online dating service which permits a searcher to review a candidate's long answers (FIG. 26a) and a summary of the multiple choice answers (FIG. 26b). In the column 50 of FIG. 26a, the searcher is also offered a list of the candidates most similar to this one. At this point, the searcher may click on any of the other candidates in column 50, and he will be able to access the data for that candidate.

For example, should the user click "LubaO" in column 50, he would be transferred to a summary page for that user, illustrated by the screen shot of FIG. 27.

As explained above, the present invention is not limited to text searching, but can find relevant information even when text does not match. This is accomplished by establishing the relevance of data based upon correlating a searcher's selected data with the data structure of database 10. In order to achieve this, database 10 must contain information representing the structural relationship of information in database CD, and that information must be updated as the content of database CD is changed.

In creating database 10, it is first necessary to define categories of information in database CD. For example, in the database represented by the screen of FIG. 23, each of menus 40 could represent a separate category. In FIG. 23, each of the categories is "scalar", in that there are a set of unique selections without subcategories. It is also possible to have a "dual scalar" or two-dimensional scalar category. For example, a geographical database might have longitude and latitude. Triple or higher order scalar categories are also possible (e.g., a geographical database could include altitude).

Another structure for categories might be a "hierarchical" structure. This structure has the form of a tree. For example, the dating database could include a category for religion. That category could include a first level of subcategories, such as Christian, Jewish, and Moslem. Each of these religions would then be divided into further subcategories.

For example, the Christian category could be sub-divided into Catholic and Protestant, with each of those being further subdivided into different sects.

In accordance with the present invention, it has been found that better search results can be obtained by using a correlation procedure which is different for different types of data structures. In creating the structure database 10, each record (e.g., the information relating to a single candidate) would be parsed into categories, and the database 10 would retain information regarding the structure of each category. Thereafter, in determining the relevance of a particular record, the searcher's selections in each category would be correlated to the structure of that category in order to arrive at a value representing the relevance of that category. All of the categories in the record would then be processed, for example, by averaging, in order to arrive at a quantity representing the relevance of the record. In this manner, a relevance value is obtained for each record.

Figure 28:
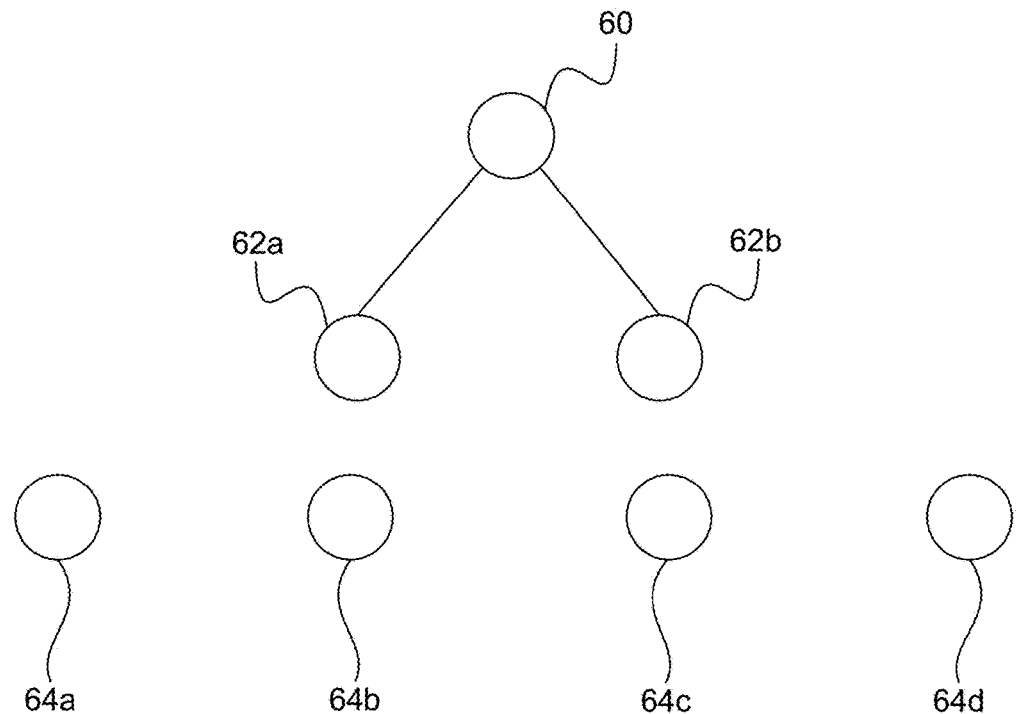
FIG. 28 is a multi-level tree representing a category with a hierarchical structure.
Figure 29:
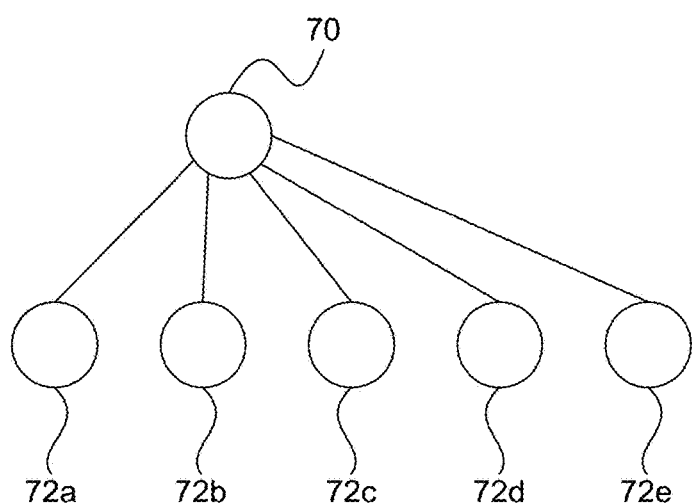
FIG. 29 illustrates a scalar category as represented by a tree with a single top node.

As an aid to understanding the relevance determination process, it is convenient to characterize categories in terms of a tree structure. For example, a character with a hierarchical structure could be represented as a multi-level tree as illustrated in FIG. 28. Here, the category is represented by the top node 60, while the sub-categories are represented by the nodes 62a-62b, and the level of information below that is represented by the nodes 64a-64d. Similarly, as illustrated in FIG. 29, a scalar category could be represented by a tree with a single top node, 70, representing the category and one secondary level of nodes 72a-72e representing the subcategories. Other forms of data structures are possible and could be similarly represented by a tree structure with nodes. However, those skilled in the art will appreciate that the invention is not limited to categories and sub-categories that can be represented by a tree structure. For example, the concepts of the invention are equally applicable to data structures that can be represented as a set of scalar values. In the dating site example, a searcher might designate his address by latitude and longitude (or street and avenue) in order to locate dating candidates within a certain distance. The structure of this date is a multi-dimensional vector.

FIG. 30 illustrates the process for determining relevance of a category having a hierarchical data structure. This involves generating a selection tree TS and a data structure tree TD. In each tree, corresponding nodes are similarly numbered. This is only necessary to assure consistent treatment of corresponding nodes so that the numbering may be somewhat arbitrary. In the selection tree TS each node has a binary weighting next to it. A node which is selected by the searcher is given a weight of 1 and a node which is not selected is given a weight of 0. In the data structure tree, node weights are assigned starting at the lowest level nodes, which are assigned a weight of 1.0, and decreasing weights are assigned to each successively higher level of nodes. It is presently preferred that each successively higher level of node be provided a weight which is 90% of the weight of the next lower level node. Thus, nodes at the second level from the bottom are assigned a weight of 0.9, nodes at the third level from the bottom, are assigned a weight of 0.81, and so forth. In order to obtain a relevance value for the category represented by these trees, corresponding nodes weight values are correlated to arrive at a category relevance value. It is presently preferred that for a hierarchical data structure, the well known cosine coefficient algorithm be used for relevancy determination. That algorithm could be represented by the equation 1:

$$R_A(S, D) = \frac{\sum_{i=1}^{N} D_i \cdot S_i}{\sqrt{\sum_{i=1}^{N} D_i^2 \cdot \sum_{i=1}^{N} S_i^2}} \qquad (1)$$

Where $R_A(S,D)$ is the relevance value of the category, Di and Si are the weighting categories assigned to the node i of the trees TD and TS, respectively (the nodes are simply processed pair-wise), and N is the total number of nodes.

FIG. 31 illustrates the preferred process for determining the relevance value of a category having a scalar structure. Once again, binary node weights are assigned to tree TS based upon whether a node is selected. In the Tree TD, a weight of 1.0 is assigned to the selected sub-node. Progressively lower weights are than assigned to the remaining sub-nodes, depending upon their distance from the selected sub-node. It is presently preferred that the weight of a sub-node be multiplied by 0.9 for each position that it is removed from the selected sub-node. By assigning weights in this manner, it is possible to attribute value to a sub-node in the database based upon how close it is to the selected value. Thus, a record in which the selected node does not correspond to the value in the record will still be given effect in the relevance determination, depending upon how close the value in that record is to that selected value. It has been found that the cosine algorithm is unreliable when used with scalar categories, because it eliminates the contribution of any unselected node to the relevance value. Accordingly, it is more desirable to use a relevance algorithm which does not do this. For example, the algorithm represented by equation 2 is presently preferred for scalar categories.

$$R_B(S, D) = 1 - \frac{\sum_{i=1}^{N} D_i - S_i}{N} \qquad (2)$$

Once a relevance value has been obtained for each category, these values can than be combined, for example by averaging, in order to arrive at a relevance value for the entire record. If such averaging is utilized, it is preferred to ignore all unselected categories in the evaluation process.

Figure 32:
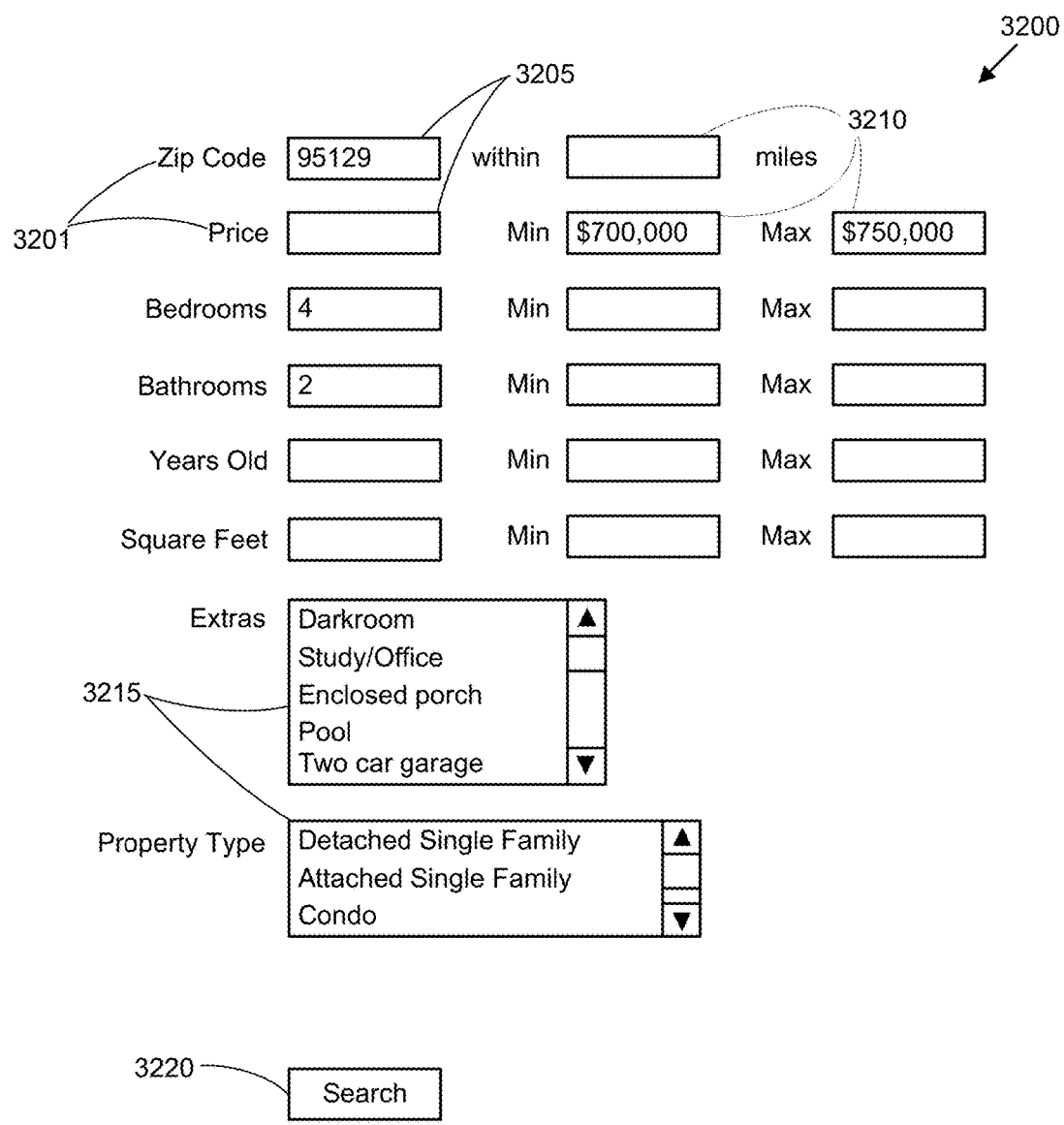
FIG. 32 shows an exemplary screen shot of a user interface for selecting initial search criteria in a real estate service.

The process for generating a relevance value for a record is summarized in the flow chart of FIG. 32. The process starts at block 100 and, at block 102, the first category in the record is selected. At block 104, the relevance algorithm utilized is determined, based upon the data structure of the category. In block 106, the weights of the respective nodes of the selection tree TS and the data structure tree TD are correlated using the selected relevance algorithm. Preferably, the algorithms discussed above are utilized.

At block 108 a test is made to determine whether all categories in the record have been processed and, if not, the next unprocessed category is selected at block 110 and control returns to block 104 to process the next category. If it is determined at block 108 that all categories have been processed, control transfers to block 112, where the relevance values of the categories are combined to produce the relevance value of the record. Preferably, this is done by averaging, as described above. At this point the process terminates, since the relevance value of the record has been determined.

Having a relevance value for each record, it is now possible to produce a report for the searcher, preferably in the order of relevance value.

Further aspects of the present invention will be described in the context of an alternate embodiment, which realizes an improved message board or user forum and also exemplifies the user reputation aspect of the invention.

In late 1998, a law firm "Firm 1" was losing associates faster than it could hire them. To stem the tide, "Firm 1" decided to give all associates a year-end "boom-year bonus" of $15,000.

At other firms, confusion reigned. Law firms had long made a point of paying associates the same amount from firm to firm. Should all firms now raise salaries to match "Firm 1"? Or could they get away with leaving things as they stood?

Firms responded inconsistently: some matched the "Firm 1" bonus, a few increased it, and others paid nothing. Associates who hadn't received bonuses were resentful, but there was little they could do.

The following year, an anonymous associate started a message board on Yahoo! called "Greedy Associates." Associates using this board hoped that by talking about their firms online, they could put pressure on law firm partners to match "Firm 1" if boom-year bonuses were given a second time.

The logic was that an online message board would create accountability. Firms that hadn't matched "Firm 1" in 1998 thought they could get away with it because nobody would know. Law students considering working at those firms would have no way of learning whether, or how much, those firms had paid. By creating an online message board to talk about salaries and bonuses publicly, lawyers could create a repository for this kind of information and force their firms to match market leaders. Firms that chose not to would be taken to task, and would have a harder time recruiting new attorneys.

The Greedy Associates board was wildly popular, receiving up to 80,000 hits per day. As soon as a firm decided to give (or not to give) a bonus, news went out immediately. Associates sometimes learned that they had received bonuses on Greedy Associates before receiving an official memo from their firms. Greedy Associates became the new grapevine, and before long associates at most firms were checking the board several times a day.

The board made the front page of the New York Times when gossip on Greedy Associates led New York law firms to pay large bonuses in order to match California firms. In the past, the California raises might have been ignored. But with Greedy Associates publicizing the buzz among lawyers, law firms felt they were under a microscope. They could no longer ignore what people were saying about them online without putting their reputation at risk.

For the first time lawyers had been given a conduit to exchange information, and the information they exchanged was not limited to salaries: firm culture, clients, layoffs, and general gossip were all discussed. Before the Internet, this would have been impossible. Now it was easy.

Greedy Associates was popular in spite the incredibly poor quality of its underlying technology. "This board sucks," was the message most commonly posted to Greedy Associates. And it did. The fact that Greedy Associates became so popular is a testament to the incredible demand for the service, not the quality of the site.

Three problems stood out:

Spam. Most messages weren't worth reading. They ranged from long rants to advertisements to messages like "Right on!" Users looking for specific information or good conversation were forced to wade through huge amounts of spam before finding what they wanted.

Static Boards. Although there was only one Greedy Associates board, all kinds of different people, with different interests, were reading it. California litigators were thrown in with New York corporate lawyers; ambulance chasers from Alaska were grouped with tax lawyers from Texas. As a result, most users were forced to read messages about subjects they weren't interested in. This was just as bad as making them read spam. If a message doesn't apply to you and you're not interested in it, it may as well be spam.

Because of the divergent interests of its users, the original Greedy Associates board eventually fractured into almost fifty separate boards with names like Greedy NY Associates, Greedy SF Associates and Greedy NY Tax Associates. Every variation on the theme was played. And of course, because they were far smaller than the original Greedy Associates board, each subsidiary board was far less useful.

No Real Anonymity. One of the chief reasons for the popularity of Greedy Associates was the anonymity it offered. By speaking under a pseudonym, people felt they could reveal more than if their identity were known.

But as many people realized, the anonymity offered by Greedy Associates was limited. As most sites do, Greedy Associates secretly recorded information about its users and would disclose this information if served with a court order or subpoena. As a result, people who might otherwise have contributed to the conversation remained silent for fear of revealing their identity.

The present inventor originally set out to solve the problems observed on Greedy Associates. Efforts were focused on four discrete issues:

Dynamic. Static boards are clearly problematic, yet no message board product provides a non-static solution. A dynamic product, in which the contours of a "board" can expand or contract as users desire, is required.

Self-Regulating. Spam and low-quality messages choke off meaningful conversation before it ever has a chance to start. A self-regulating board in which messages that users don't want to see vanish before others are forced to read them results in less spam and more high-quality dialogue.

Anonymous. Valuable information about the intimate details of specific firms attracted people to Greedy Associates, but the lack of true anonymity prevented the most interesting information from ever being posted. The option of posting information with true anonymity is necessary to give users the freedom to post the kind of information that others want to see.

Organic. Certain areas of message boards are heavily used and deserve to be expanded. Others are rarely used and fall into neglect. A good product should be organic: it should respond naturally to the demands that users place on it. Areas that are heavily used should automatically expand; areas that are rarely used should automatically contract (or even vanish).

Solutions have Wide Application.

It soon became apparent that the problems observed on Greedy Associates are endemic to message boards generally, and that the solutions have widespread application to virtually any kind of online community.

As a result, instead of designing a better version of Greedy Associates, the present invention created a process and system to allow Web sites of any kind to implement the solutions discovered.

A. Dynamic Model.

i. The Problems with Static Models.

Online speech is stored using static methods. A post might be found on a specific "board," an article in a "section" of a magazine, or a photograph as part of an "album." These storage models separate content into individual spaces with fixed boundaries. People know that messages about Honda Accords, for example, are found on the Accord bulletin board in the Honda section, or that messages about Cisco Systems are found on the Cisco bulletin board in the Companies section. The path to a specific item is always the same, and follows a simple categorization scheme.

This is a bad system. To understand why it is bad, it is useful to understand how a static system is structured. Consider Vault.com, a premier message board for job seekers. A simplified structural model of Vault.com's message boards relating to "Law" appears in FIG. 1.

Figure 1:
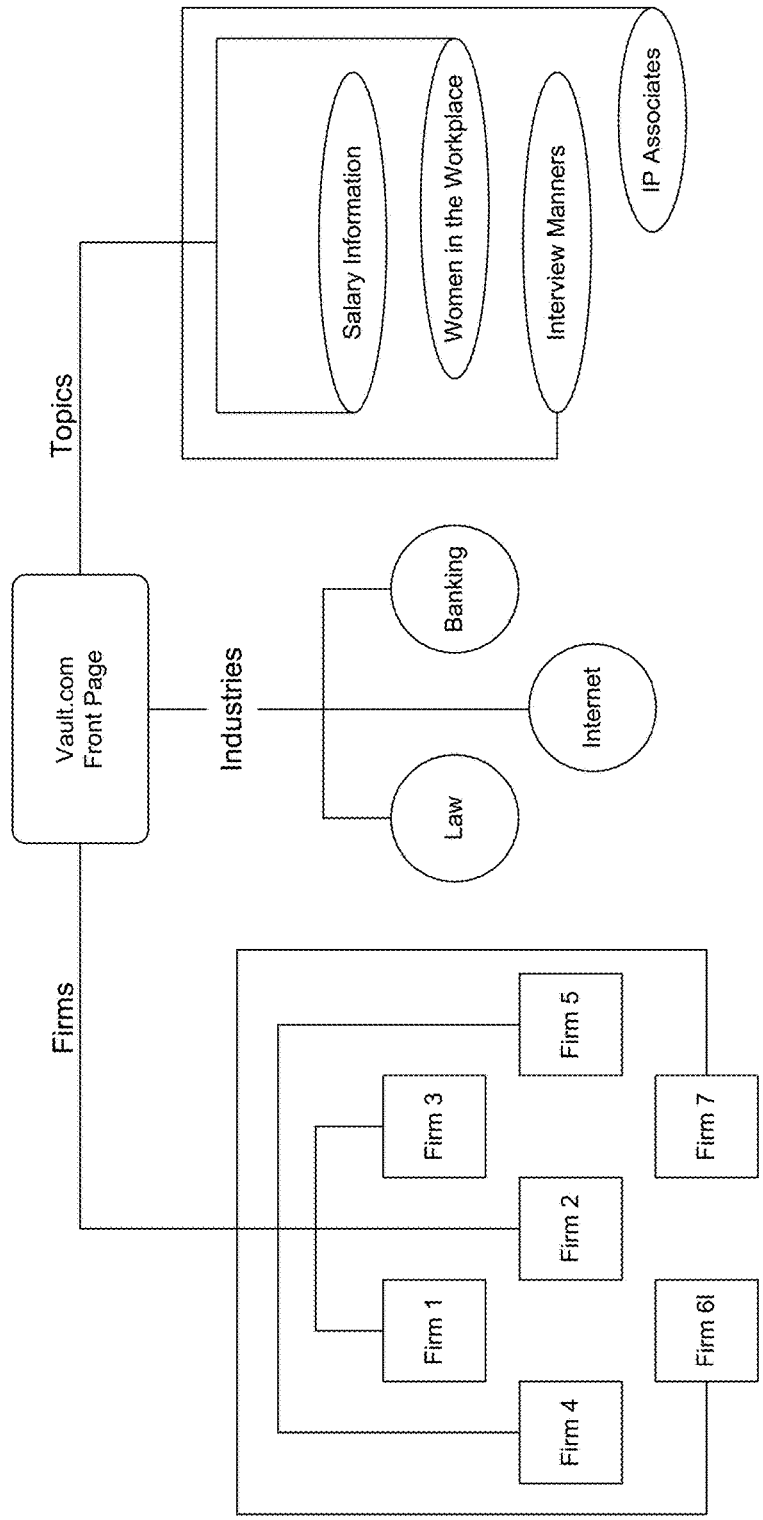
FIG. 1 illustrates an embodiment of a typical static system wherein boards are grouped by firms, industries and topics.

In the system of FIG. 1, boards are grouped into three categories: Firms, Industries and Topics. This appears logical and would seem to provide a clear framework for posting messages. But it doesn't.

a. Bonuses at "Firm 1": A Simple Example.

Suppose a user wants to post information about bonuses at "Firm 1". Where should he post the message so that others will find it? There are three possibilities: The ""Firm 1"" board, the "Law" board or the "Salary Information" board.

Few users would take the time to post their message to all three relevant boards, and if they did it would simply create another problem. People who read all three boards would find themselves reading the same message over and over again. Thus, there is no one logical place for a user of the above system to post a message about bonuses at "Firm 1", and no obvious solution to this problem.

The lack of a clear answer to the question of where a message on a specific subject should go creates difficulties for users. In the above example, users may read the "Firm 1" board without ever realizing that messages about "Firm 1" are also posted on both the "Law" board and the "Salary Information" board. For these users, the system is under-inclusive because it fails to show them all the messages that they want to see. But users who look for messages about "Firm 1" bonuses on the "Firm 1" board have the opposite problem. These users may be forced to read through numerous messages about "Firm 1" that don't deal with bonuses. For these users, the system is over-inclusive because it shows them many messages that they don't want to see.

b. Comparisons within Groups: A Complex Example.

Problems with static systems are even greater for users who want to post messages about several different subjects within the same group. Suppose, for instance, that a user wants to compare the bonus given at "Firm 1" with the bonuses given at another specific firm (Firm 2"). Where should he post this message?

There are five boards where this message could reasonably be posted, but none of them are precisely right. It could be posted to the "Firm 1" board, the ""Firm 2"" board, the "Firm 3" board, the "Law" board or the "Salary Information" board. Whichever board the information is posted to, however, it's virtually certain that many users who would find it interesting will never see it. In some embodiments, it would not be posted to the "Firm 3" board (or other boards resulting from the filter selection of other firms that are neither "Firm 1" nor "Firm 2"). In other embodiments, it would be posted to one or more other boards resulting from the filter selection of other firms that are neither "Firm 1" nor "Firm 2").

Even if the poster feels sure that he should post his message to one of the boards grouped under "Firms," there's no clear answer as to which is best. Since no answer is clearly correct, any selection is sure to confuse users to some extent. The only board which would be clearly correct would be one dedicated specifically to comparisons of "Firm 1", "Firm 2" and "Firm 3". And no such board exists. In some embodiments, it would not be posted to the "Firm 3" board (or other boards resulting from the filter selection of other firms that are neither "Firm 1" nor "Firm 2"). In other embodiments, it would be posted to one or more other boards resulting from the filter selection of other firms that are neither "Firm 1" nor "Firm 2").

ii. The Advantages of Dynamic Boards.

Figure 2:
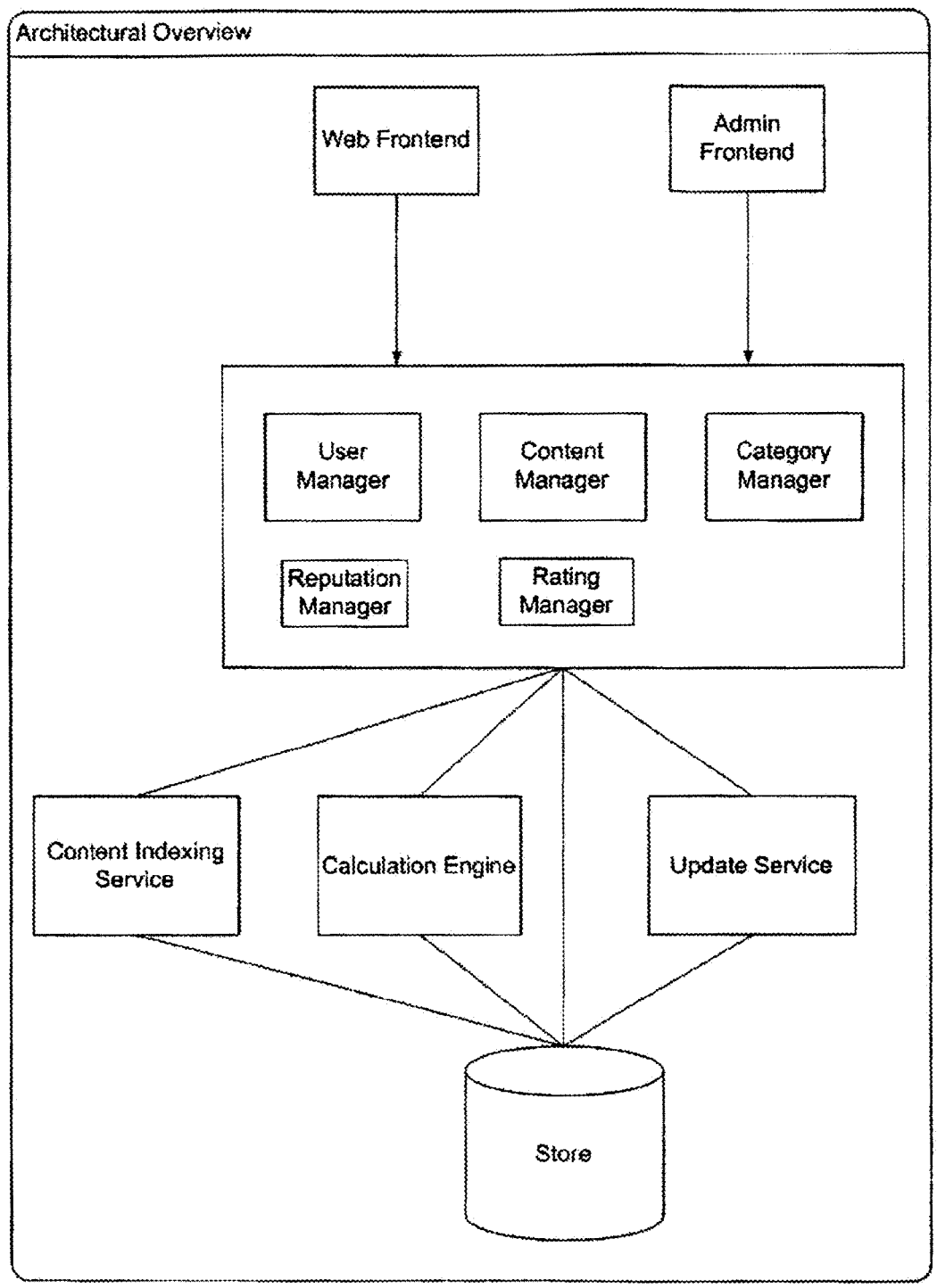
FIG. 2 illustrates one embodiment of a system running utilizing the reputation aspect of the present invention.

The present invention allows companies to create dynamic message boards. FIG. 2 shows one embodiment of a system utilizing the present invention. Other embodiments can remove, add to, change, and/or rearrange the shown components. In a dynamic system, messages are not situated in individual areas with clear boundaries. No clearly defined "boards" exist. Instead, the user selects filters which the system uses to generate "boards" from a message database. Consider how the two problems discussed in the previous section would be solved by a dynamic system.

a. Bonuses at "Firm 1": Solving the Simple Example.

If a company like Vault.com were using the present invention, it might use filter categories such as "Firms," "Industries," and "Topics." In some embodiments, the filter categories are "hardwired" into the system. In other embodiments, the filters are dynamically generated. A user interested in bonuses at "Firm 1" would select the following filters:

| Firms = | "Firm 1" |
| Topics = | Salary Information |

Figure 3:
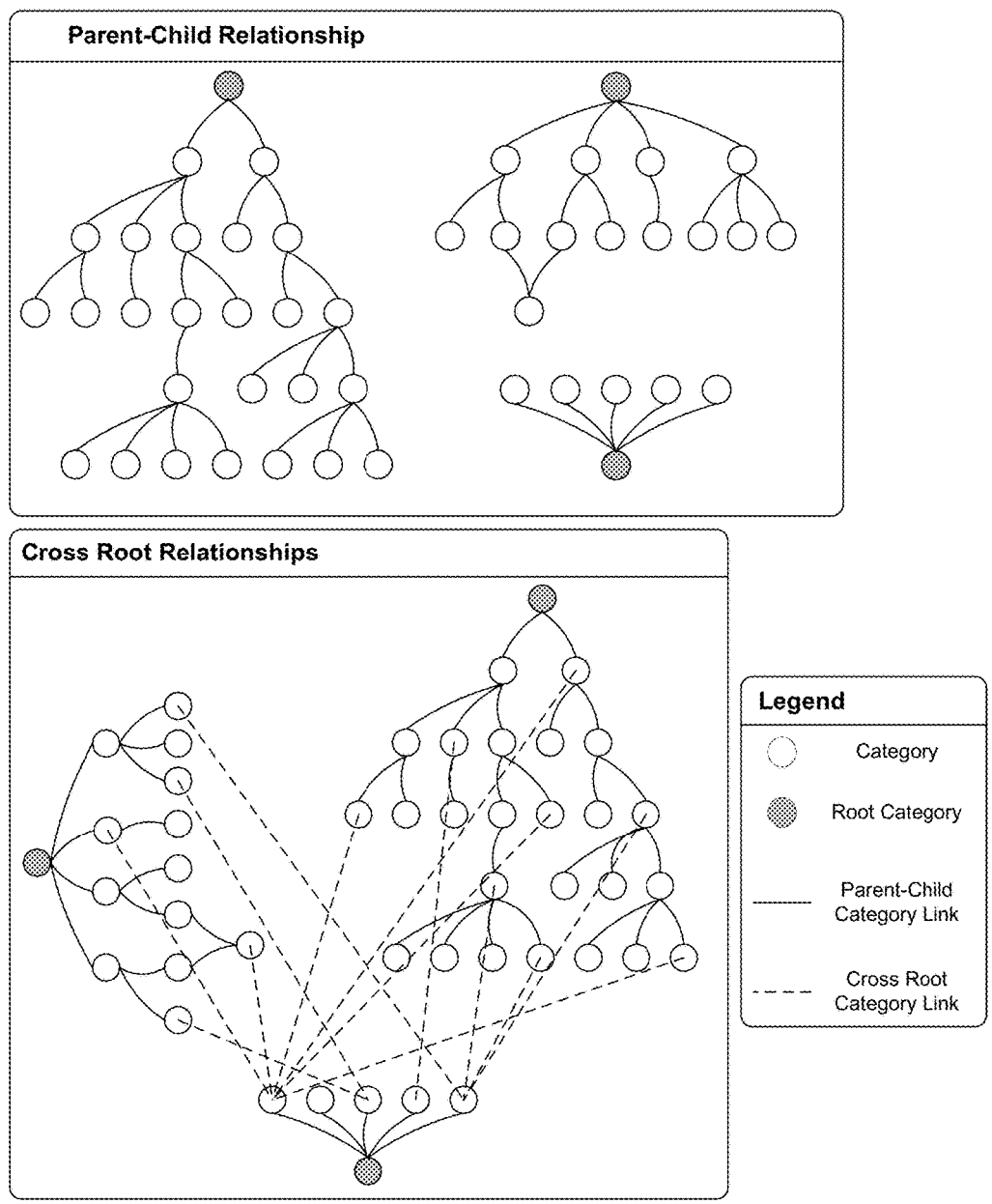
FIG. 3 illustrates examples of relationships.

Although the user has not selected a filter for Industries, this filter will automatically be set to "Law" because "Firm 1" is a law firm. If the user had selected a banking firm, the Industries filter would automatically have been set to "Banking." The database understands the relationships between filters and fills in unselected filter boxes with appropriate information. This understanding can be either "hardwired" into the system, or can be dynamically generated. Some examples of relationships generally are shown in FIG. 3. Thus, even though the user has left Industries blank:

| Industries = Law |

Figure 4:
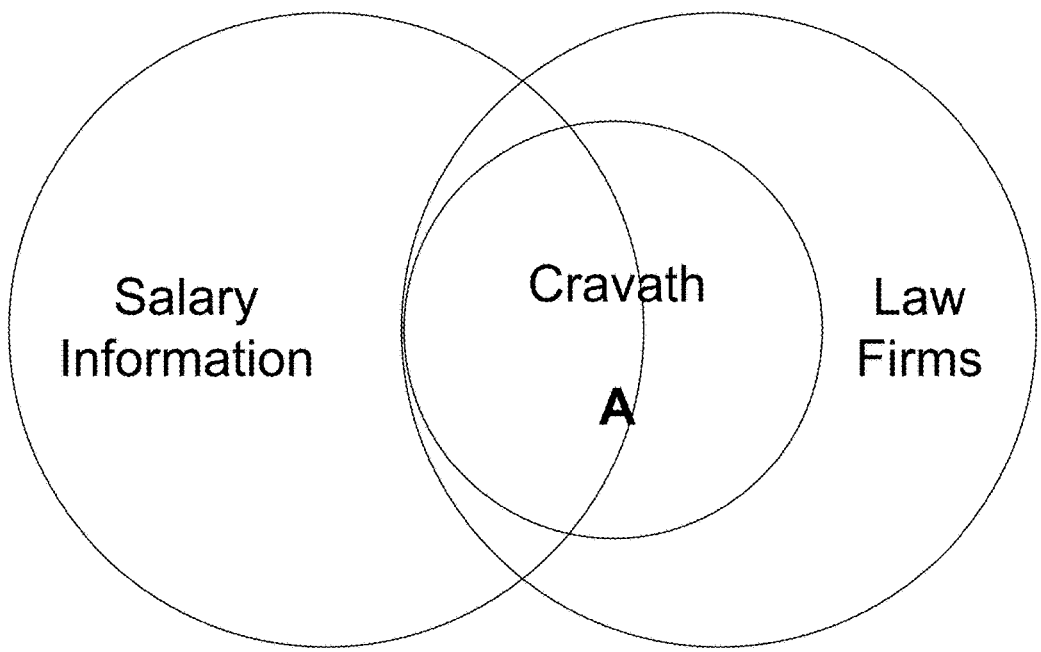
FIG. 4 illustrates an embodiment of a simple dynamic system.

Now that the filters have been set, the user clicks "Apply." The software sorts through the database and pulls out all messages, articles and other content related to both "Firm 1" and Salary Information (area A in FIG. 4). This information will be displayed first, in a format indistinguishable from an ordinary message board. The Present invention next pulls out all information related to Law Firms (other than "Firm 1") and Salary Information (Area B). This information will be displayed next.

b. Comparisons within Groups: Solving the Complex Example.

The advantages to this system become clearer if we reconsider the complex example, in which the user wanted to post a message comparing bonuses at "Firm 1", "Firm 2" and "Firm 3". In a dynamic system, the user would select the following filters:

| Firms = | "Firm 1" |
| | "Firm 2" |
| | "Firm 3" |
| Topics = | Salary Information |

As in the previous example, the Industries filter will automatically be set to "Law" because the firms selected are all law firms. Thus:

| Industries = Law |

Figure 5:
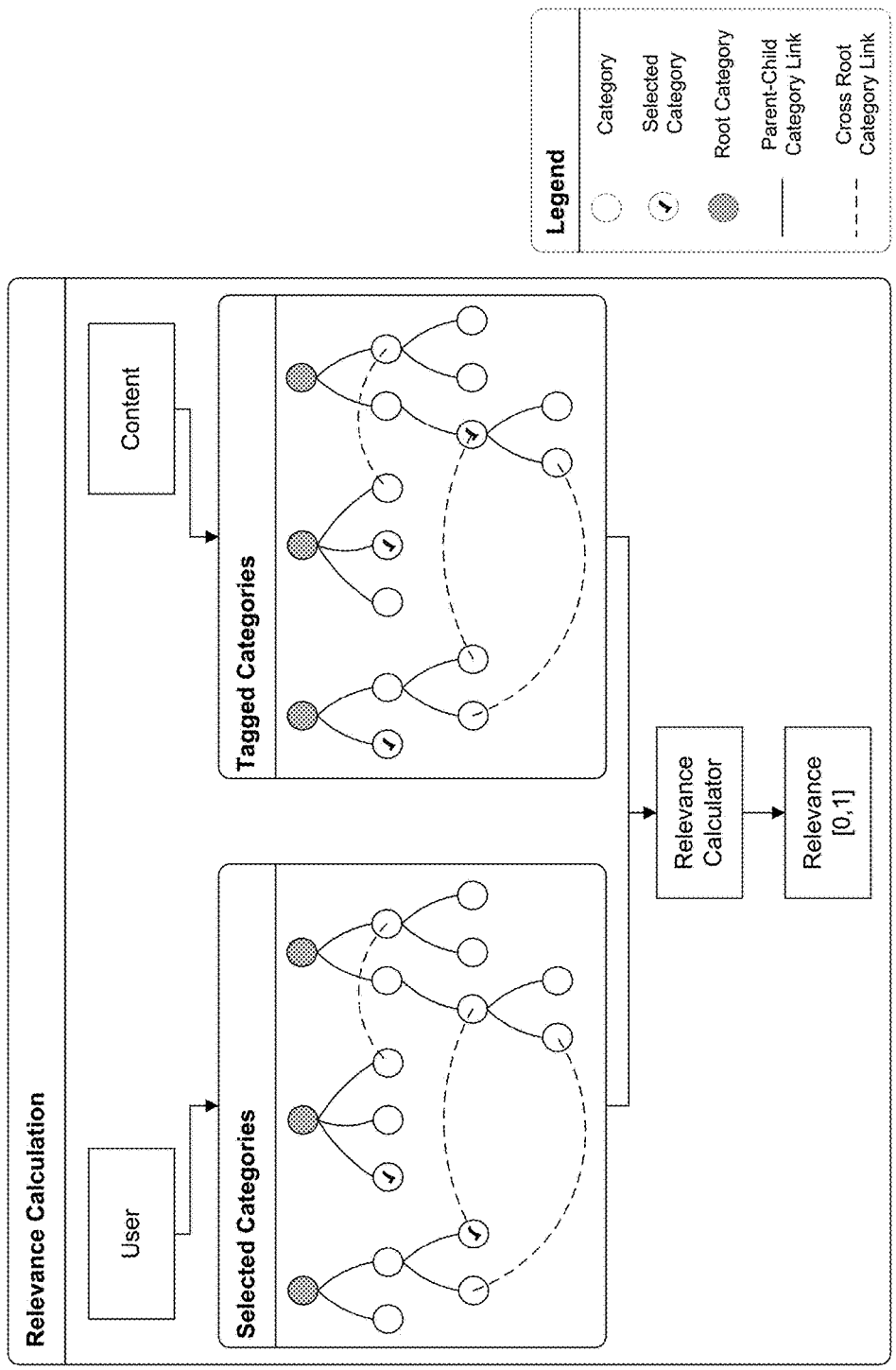
FIG. 5 illustrates an example of selected categories of content and user selected categories being used as inputs to generate relevances.

The Present invention will sort through the database and pull out all messages, articles and other content related to "Firm 1", "Firm 2", "Firm 3" or Salary Information. Some embodiments pull out content related to law firm information for law firms that are none of "Firm 1", "Firm 2", and "Firm 3". Some embodiments pull out content related to the law industry. It will then order the data so that the most relevant information will be displayed first. FIG. 5 shows an example of selected categories of content and user selected categories being used as inputs to generate relevances.

Figure 6:
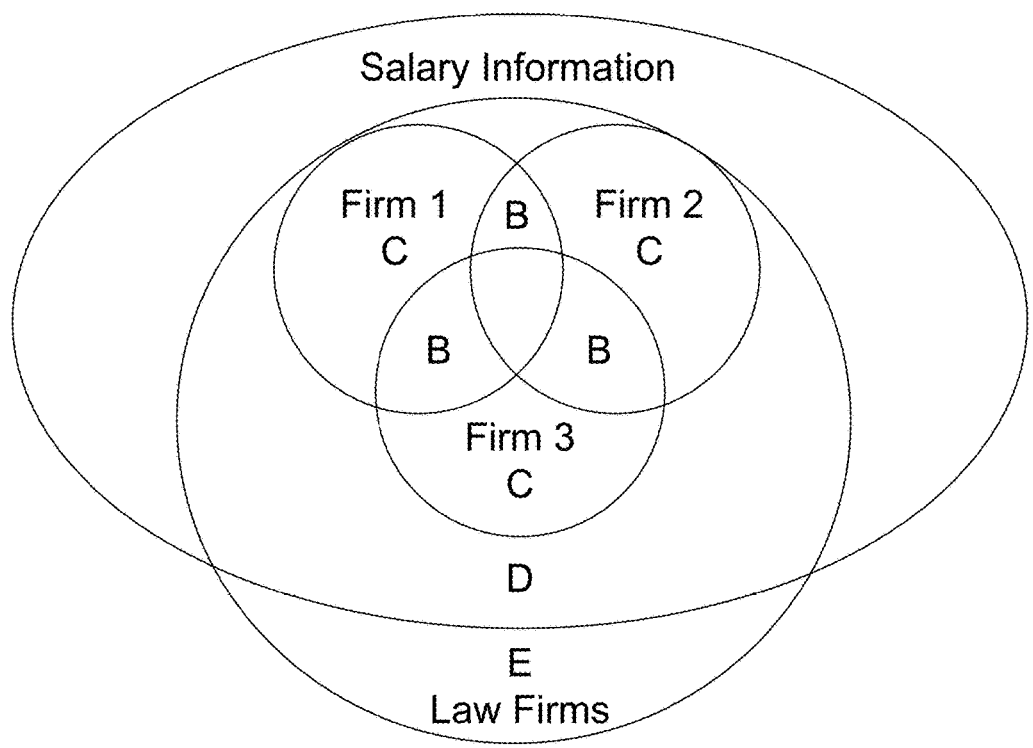
FIG. 6 illustrates an embodiment of a complex dynamic system.

The first messages to be displayed will be those tagged with "Firm 1", "Firm 2", "Firm 3" and Salary Information (labeled "A" in FIG. 6). These messages will be most likely to contain the content that the user is looking for. By selecting these filters the user has, in effect, created a custom "board" designed specifically for him on precisely the subject he is most interested in.

In one embodiment, a message relating to firm 1, firm 2, and salary is rated higher than a message relating to firm 1, firm 2, and firm 3. In another embodiment, a message relating to firm 1, firm 2, and salary is rated lower than a message relating to firm 1, firm 2, and firm 3.

The next messages to be displayed will be those labeled "B." The Present invention will combine messages about "Firm 1" & "Firm 2", "Firm 1" & "Firm 3" and "Firm 2" & "Firm 3" (all of which are also about Salary Information) and will sort them using a number of factors. In some embodiments, these factors can include a fuzzy math algorithm. In some embodiments, these factors can include an algorithm combining scalar values. After these messages have been displayed, the Present invention will display messages labeled "C," which deal solely with "Firm 1", "Firm 2" or "Firm 3" and the messages labeled "D," which deal with Salary Information and Law Firms, but not with "Firm 1", "Firm 2" or "Firm 3" specifically. In some embodiments, the above order can be changed; for example, including messages which do not deal with salary information.

Allowing users to display messages in this way solves the problem described in the last section. Users who wish to pull up information on "Firm 1", "Firm 2", "Firm 3" and Salary Information will see, first and foremost, the information most interesting to them. If, while looking at this "board," they choose to post a message, their message will automatically be tagged with "Firm 1", "Firm 2", "Firm 3" and "Salary Information." It will be among the messages likely to be displayed when another user performs a search using the same filters.

Unlike a search that uses only Boolean keyword searching, some embodiments of the invention allow searches to yield results which may not be 100% on point but still have relevance. For example, in an embodiment managing products, a customer can find products with varying degrees of relevance to the filters, and not just the 100% relevant products. If the merchant does not have one or more of the products sought by the customer, at least the merchant can present related products of interest to the customer.

In embodiments such as the discussed embodiment, a user can find information which may not be 100% on point but still have relevance.

In order to match data in a database with a given query, we take advantage of relationships (also known as "links") that we establish between the data and the query. These relationships are often, but not always, segmented across several different categories (such as age, height, weight, location, price, etc.).

Every piece of content in a TRANSPARENSEE™ system is tagged with a set of weighted categories. Any query made to the system is also translated into a set of weighted categories. Our system assigns a numerical value to the degree of similarity (or difference) between these two sets of weighted categories through the use of our "Similarity Algorithm".

The steps of the Similarity Algorithm are as follows:
1) Determine the weights of an element of content's tagged categories.
2) Determine the weights of the categories used in the selection (or query).
3) For each piece of tagged content:
   3a) For each category (such as age, height, weight, location, price, etc.).
   3aa) Find the similarity of the content's category weights to selection's category weights.
   3b) Aggregate the similarities across all root categories for this piece of content.

The output of this calculation is a mapping of content object to relevance value.

The Similarity Algorithm can be customized in several ways:

Step 2) When a selection is passed into the algorithm, the weight on each category is either 1 or 0: 1 if the category has been explicitly selected and 0 if it has not. The Similarity Algorithm uses the relationships (links) between categories to assign weights to categories that are related to the explicitly selected categories. These relationships (links) could be sibling relationships, parent/child relationships, cross-linked relationships (links to categories under other root categories) or any other type of relationship. Weights assigned to categories as links are traversed based on the weight of the originating category in the link. The modifier used to assign weights to linked-to categories is adjustable.

Step 3a) If desired, certain root categories can be ignored.

Step 3aa) The method of comparison between the category weights in the selection and the category weights in the content is customizable. One method of comparison that can be used is a Cosine Coefficient algorithm.

Another method of comparison that can be used is the "Smithgate Algorithm", which we developed ourselves. Any other algorithm can be used to determine the degree of similarity between two pieces of tagged content.

Step 3b) The aggregation algorithm can take into account weights or rankings of the root categories, since certain root categories may be more important than other root categories.

B. Rating Messages

The dynamic model described in Section A provides a powerful tool for organizing content. Used in conjunction with a sophisticated rating system, it is capable of far more.

A dynamic system automatically captures "metadata" each time a user posts a message. Examples of metadata are the filters set when a message is posted and ratings information. Because we know which filters are set when a message is posted, we know (in broad terms) what the message is about. As users rate messages, the system therefore develops a sophisticated profile on which subjects users are experts on.

This profile allows the system to do two things that can't be done on static systems: users can screen content so that people with poor reputations on this subject are ignored; and ratings given to specific messages can be weighted by the user's knowledge of the subject.

From a user's perspective things are simple: just point and click to give a message a rating between one and seven. Other rating systems use other scales. Some embodiments can have discrete and/or continuous rating systems. But the Present invention manages to do subtle and complex things with this simple rating.

i. Reputation System

Figure 7:
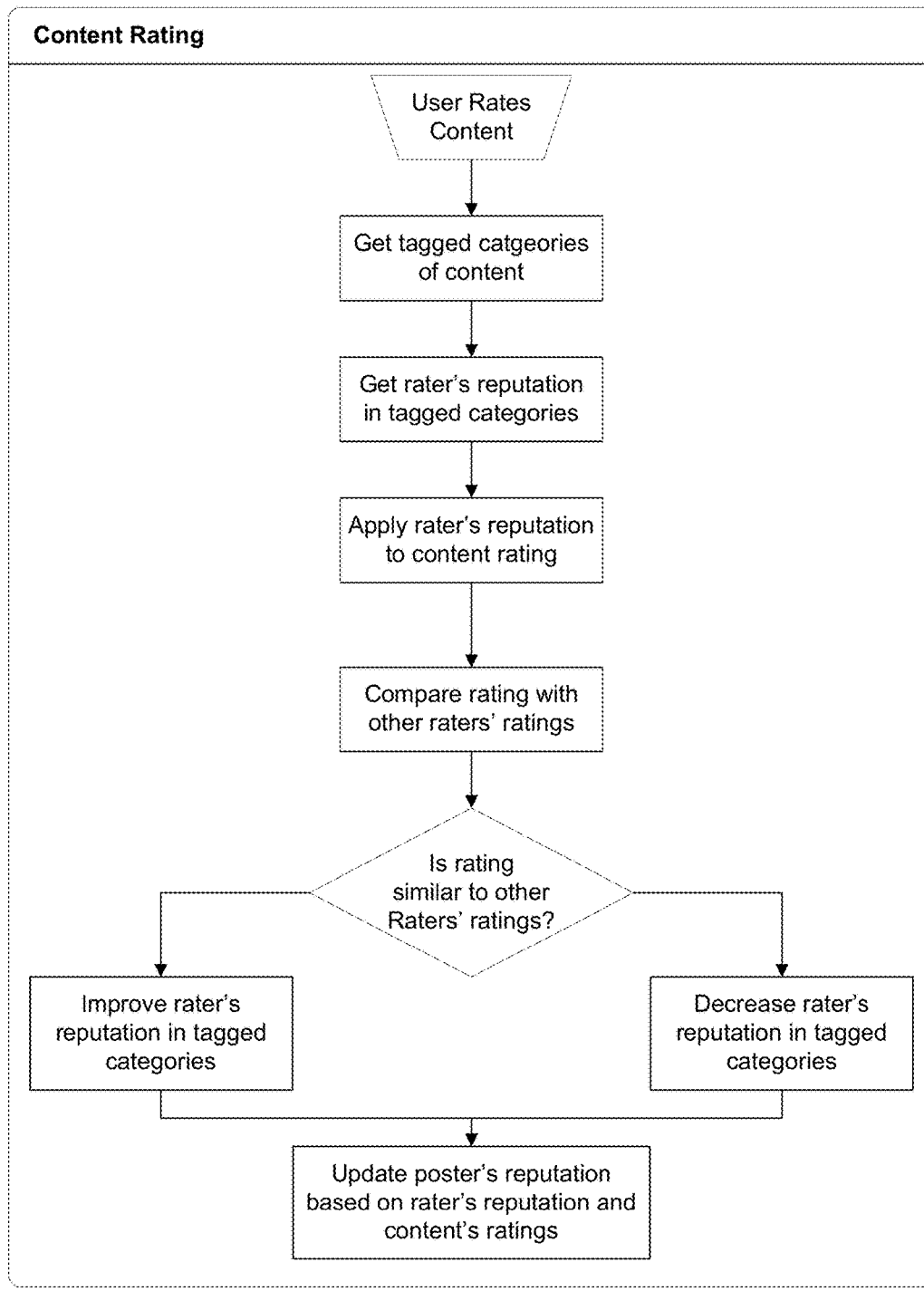
FIG. 7 illustrates an example flow chart for updating a user's rating.

Each user builds a reputation over time. This reputation is not a single number, but a profile made up of many numbers. Users build reputation ratings for each filter value of every message they've ever posted or rated on the system. FIG. 7 shows an example flow chart for updating a user's rating. Steps can be added, removed, changed, and/or rearranged.

There are two ways of building a reputation: posting messages and rating messages. Posting a message gives the system substantial data to evaluate. Reputations gained through posting are therefore difficult to influence once established. In contrast, rating a message gives the system limited data to evaluate. Reputations gained by rating are therefore easier to influence. Thus, posting allows users to build "strong" reputations which can't easily be changed while rating messages allows users to build "weak" reputations which can be changed quite easily.

a. Building a Reputation by Posting: Strong Form.

Consider an example in which a poster posts a message comparing "Firm 1", "Firm 2" and "Firm 3". For the moment, let's contemplate only the "Firms" filter, which is set as follows:

| Firms = | Firm 1 |
|         | Firm 2 |
|         | Firm 3 |

In this case our rater, thinking the poster's message brilliant, gives it a 7. Our rater has already built a reputation, and his reputation for the selected firms is:

| "Firm 1" = | 7 | (high) |
| "Firm 2" = | 4 | (medium) |
| "Firm 3" = | 1 | (low) |

The situation now looks like this:

| Filter Value | Rating | Rater's Reputation |
|---|---|---|
| "Firm 1" | 7 | 7 |
| "Firm 2" | | 4 |
| "Firm 3" | | 1 |

For each filter the rating of seven will be weighted by the rater's reputation and then averaged into the poster's reputation. Let's go through this example to see how this would work.

The rater has a reputation of seven for "Firm 1". He is an expert on the subject. Since an expert on "Firm 1" gave a message involving "Firm 1" a top score, the poster's reputation on "Firm 1" will go up substantially. The rating of seven will be averaged into the poster's reputation on "Firm 1" and will be heavily weighted.

The rater has a reputation of four for "Firm 2". This means that, while not entirely ignorant, he isn't an expert. Although he gave the message a seven, we shouldn't trust his opinion on "Firm 2" as much as we did his opinion on "Firm 1". The rating of seven will be averaged into the poster's reputation for "Firm 2", but will not be weighted as heavily as his rating of "Firm 1". The poster's reputation for "Firm 2" will rise, but not as much as his reputation for "Firm 1".

As for "Firm 3", the rater has a reputation of one. He knows nothing about "Firm 3", so we shouldn't trust his opinion at all. Even though the rater gave this message a seven, the rating will have no weight and will not affect the poster's reputation. In other embodiments, the weight has nonzero but low weight.

b. Building a Reputation by Rating: Weak Form.

Not all users are comfortable posting messages. For this reason, a weak form of building reputation that does not depend upon posting is also available.

All that is required of users to build this type of reputation is that they rate messages. Each time a user rates a message, the system performs a "cluster analysis" on the rating. In alternative embodiments, the reputation of the user is adjusted less frequently than every time the user posts a message.

This involves comparing the user's rating with ratings given that message by people with high reputations. If, over time, a user's ratings on a particular subject tend to correlate with the ratings of high reputation people on the same subject, we can assume that the user is trying to rate messages honestly and fairly and that he knows something about the subject. His reputation in this area will rise. But if the user's ratings tend to disagree with the ratings of people with high reputations, his reputation will fall.

A reputation built in this way is "weak" in the sense that it may rapidly be changed by the strong form of reputation-building. For example, a user may build up a reputation for ""Firm 1"" over time using the weak method. Eventually this user may decide to post a message about "Firm 1". If the message receives a good rating from high-reputation users, the user's reputation for knowing about "Firm 1" will be reinforced. But if the message receives a bad rating, the user's reputation for knowing about "Firm 1" will quickly be eroded. One or two bad "strong" ratings of posted messages are enough to destroy a "weak" reputation built up over a period of months. In other embodiments, more than two such messages are enough to destroy the reputation.

ii. Message Ratings.

Just as users have reputations, messages have ratings. Message ratings are determined by the scores users give them, weighted by the relevant reputation of the raters.

Let us go back to our example of the previous section. The situation was as follows:

| Filter Value | Rating | Rater's Reputation |
|---|---|---|
| "Firm 1" | 7 | 7 |
| "Firm 2" | | 4 |
| "Firm 3" | | 1 |

The rater has given this message a seven. But the rater does not have a perfect reputation for all the relevant filters. He knows quite a bit about "Firm 1", but only a little about "Firm 2" and nothing at all about "Firm 3".

Figure 8:
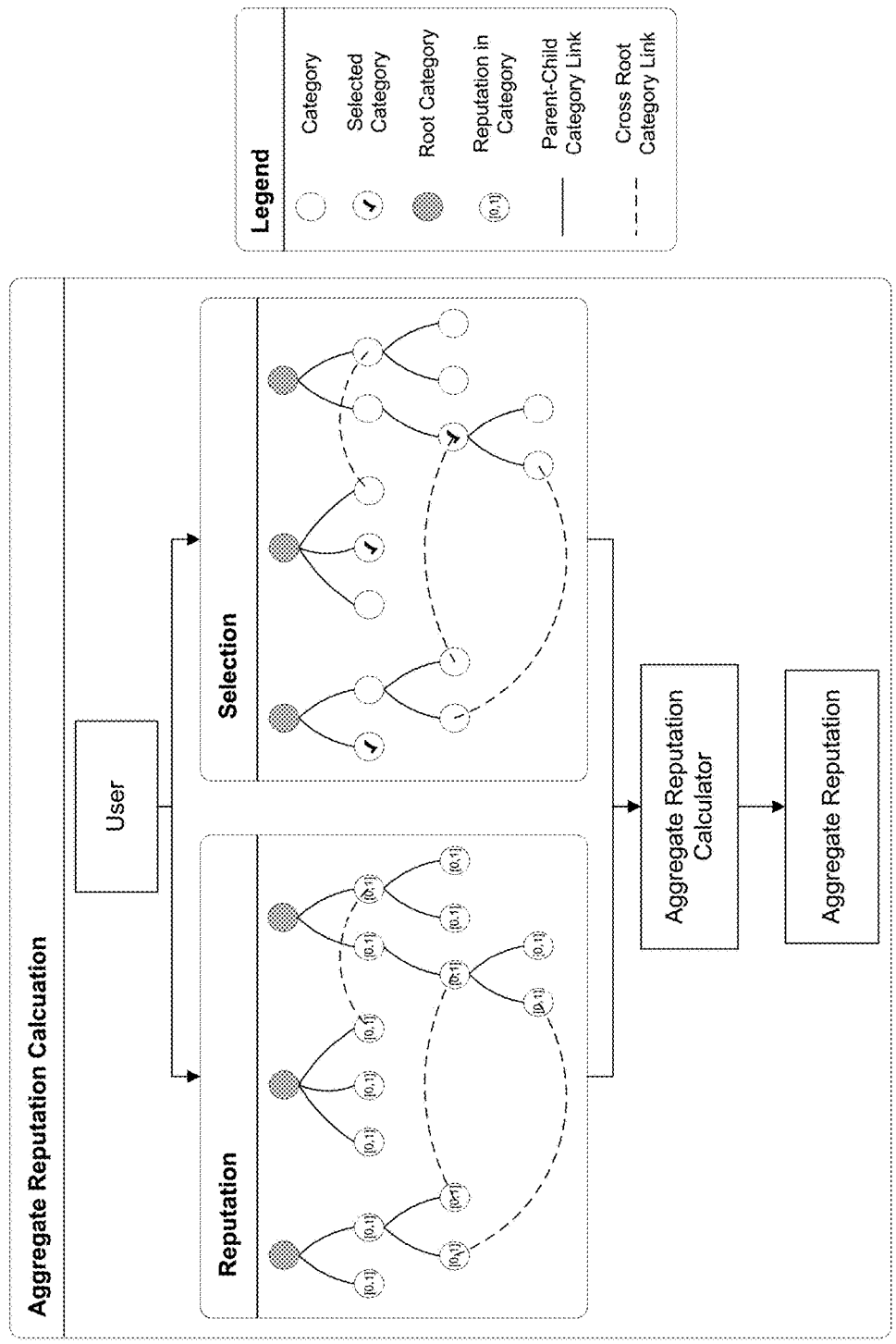
FIG. 8 shows an example of calculating an aggregate reputation.

The system aggregates the rater's reputation in these fields using a mathematical formula. In this case, the rater's aggregate reputation for "Firm 1", "Firm 2" and "Firm 3" is four. The system will average the rating of seven into the message's rating, giving it a weighting of four. FIG. 8 shows an example of calculating an aggregate reputation. In other embodiments, nonuniform weights are given to the multiple rater's reputations. In one embodiment, the scale of 1-7 is rescaled to 0-1. Other embodiments rescale ratings to different continuous or discrete ranges.

If the user had had a perfect reputation for knowing about "Firm 1", "Firm 2" and "Firm 3", the weighting would have been a seven. In that case the user's rating of seven would have been averaged into the message rating with a weighting of seven. The message rating would count twice as much as it did in the prior example. In some embodiments, the weight of a message has a linear relationship with the rating of the message. In other embodiments, the weight of a message has a nonlinear relationship with the rating of the message.

In some embodiments, a message has one rating. In other embodiments, a message has multiple ratings, for example different ratings for different filters or sets of filters.

C. Threshold Filtering.

The rating system works hand in hand with a system to filter rated messages. The filtering system allows users to select a rating threshold and view only those messages with ratings above that threshold. Other messages are not seen.

i. Method of Threshold Filtering.

Figure 9:
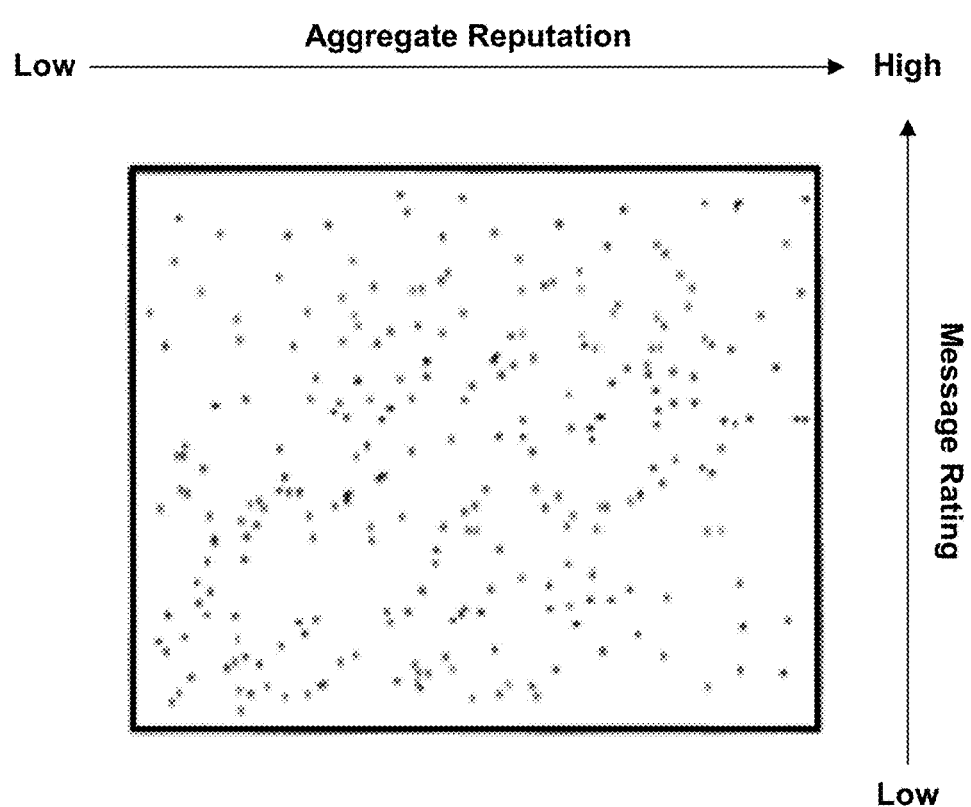
FIG. 9 illustrates an embodiment of threshold filtering wherein a palette contains a scatterplot. And each dot represents s message.
Figure 10:
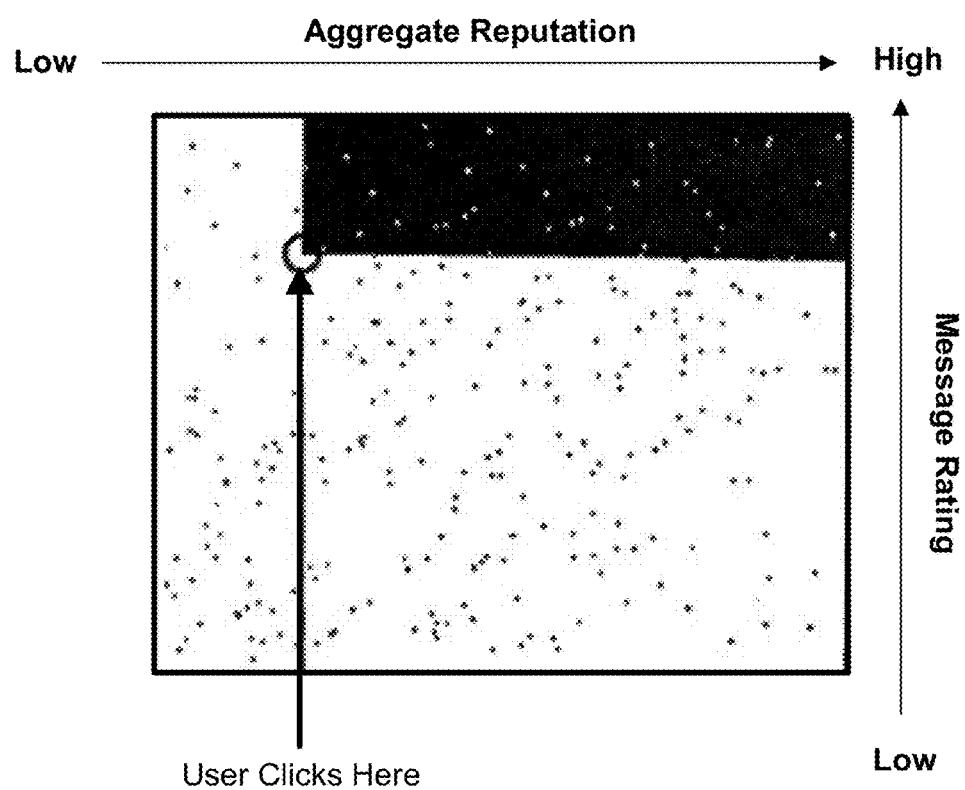
FIG. 10 illustrates an embodiment of a scatterplot wherein the user has chosen to view messages of high message quality without much regard to the reputation of the poster.

To set a threshold, users click the "threshold" button. A palette appears, containing a scatterplot as in FIG. 9. Other embodiments use an interface other than a scatterplot, such as one or more selectors of reputation and/or message rating. Each dot represents a message. In other embodiments, dots represent approximations of messages and do not have a one-to-one correspondence. By selecting a point on the scatterplot, users can choose any combination of message quality and reputation quality. In some embodiments where messages have multiple ratings, such as for different filters, a user can select ratings directly or indirectly. Other embodiments permit selection of just reputation or just message rating. Suppose, for example, that a user selects the point on the scatterplot as in FIG. 10.

By selecting this point the user has chosen to view messages of high message quality without much regard to the reputation of the poster.

Figure 11:
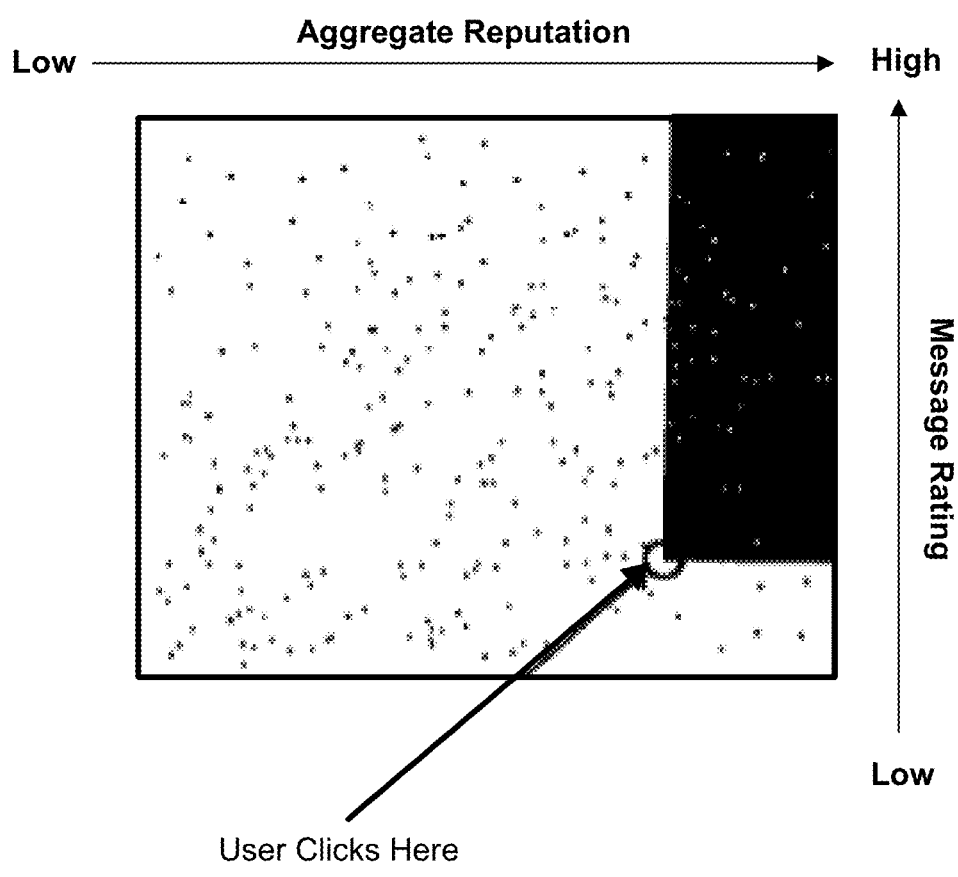
FIG. 11 illustrates an embodiment of a scatterplot wherein the user has chosen to view messages posted by users with high reputations without much regard to message quality.

A different user might have selected the point on the scatterplot as in FIG. 11.

Figure 12:
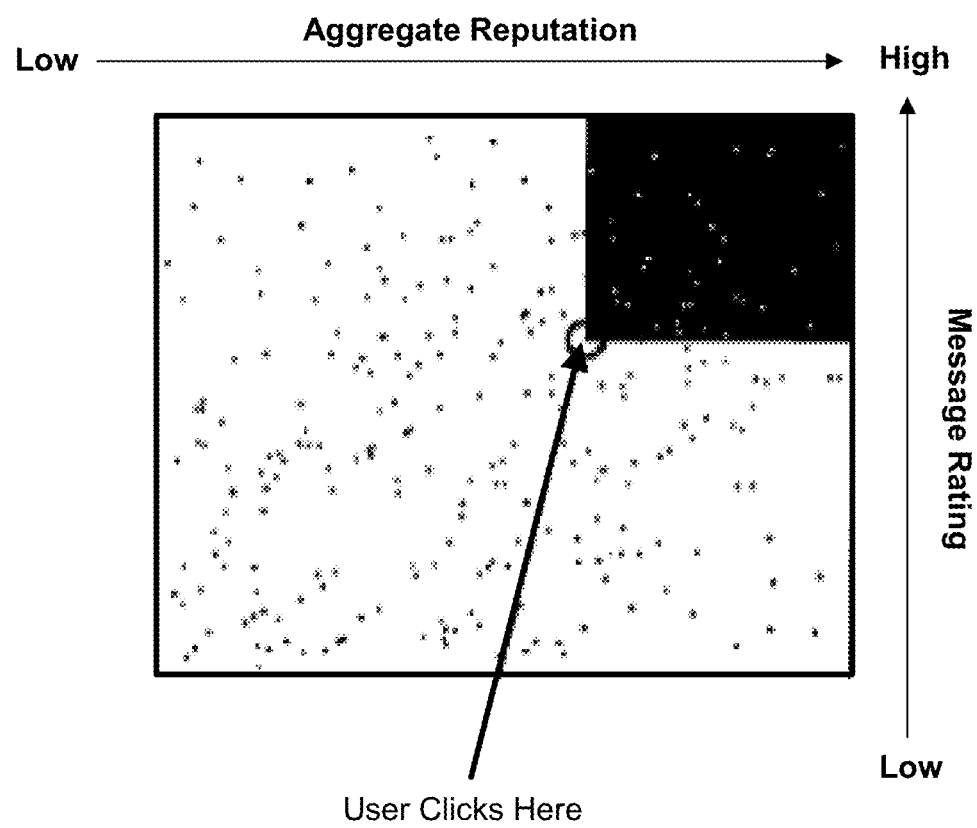
FIG. 12 illustrates an embodiment of a scatterplot wherein the user has chosen to view messages of high quality written by people with high reputations.

This user has chosen to view messages posted by users with high reputations without much regard to message quality. Many users will, of course, select a point like in FIG. 12:

This user wants to see only those messages of high-quality which were written by people with high reputations. By selecting this threshold, this user will likely see only the very best messages that have been posted.

ii. Results of Threshold Filtering.

In combination with the reputation system, this method of threshold filtering allows people to build communities of self-validating experts. These experts are encouraged to post good content and to rate content they see accurately.

By posting good content or rating content accurately, users build high reputations. People with high reputations become community leaders because their voices are heard by others. People without high reputations are excluded from the community because their voices cannot be heard.

Figure 13:
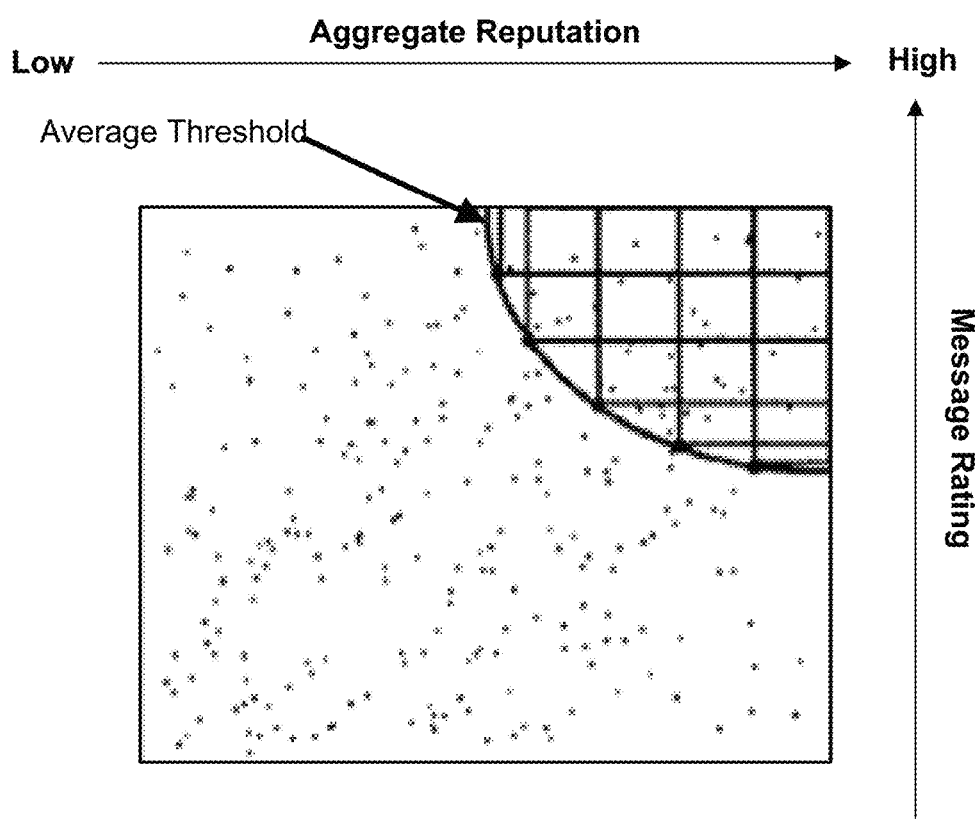
FIG. 13 illustrates an embodiment of a scatterplot wherein the average combination of reputation and message rating is selected by users of a certain filter set.

In the diagram of FIG. 13, "Average Threshold" represents the average combination of reputation and message rating selected by users of a certain filter-set (such as ""Firm 1"" and "Salary Information").

Other embodiments use an interface other than a scatter-plot, such as one or more selectors of reputation and/or message rating.

Users whose quality of speech places them above the average threshold will be heard. In this way, the Present invention formalizes a process that takes place informally all the time: people who speak intelligently and often become recognized as authorities.

But the system does something more. Users whose quality of speech places them below the average threshold will, on average, not be heard. Their speech is never seen by the average user.

People who say foolish things or post spam will find it difficult to post messages which fall above the Average Threshold. They will quickly establish a poor reputation. Thus, in addition to providing incentives to post good content, the system provides disincentives for posting bad information. People are encouraged to say good things and discouraged from speaking if they have nothing good to say.

D. Implicit Reputation.

Filters often have clear relationships between them. ""Firm 1"," for instance, is a law firm. Thus, as described in Section III(A)(ii), when ""Firm 1"" is selected (for "Firms") "Law" is automatically selected (for "Industries").

Figure 14:
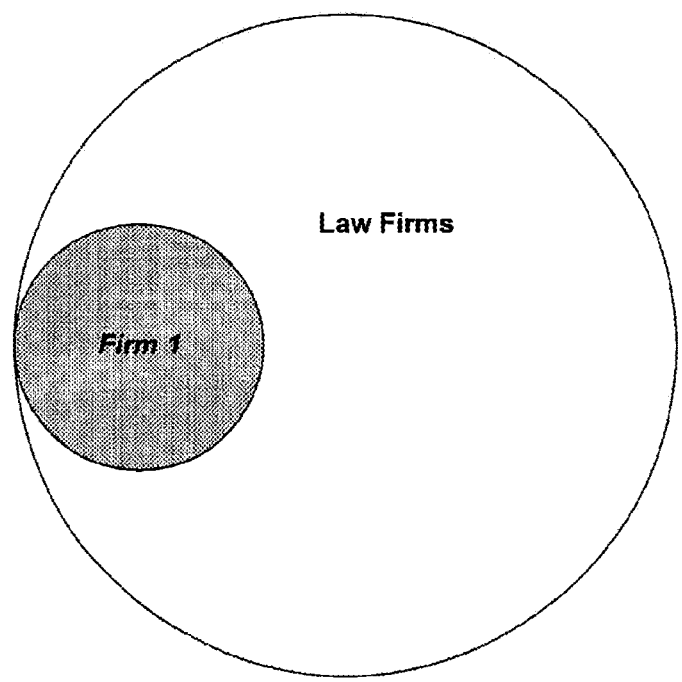
FIG. 14 illustrates an embodiment of related filters.

This means that as people build reputations in specific categories, they automatically build reputations in other related categories. The relationships between related categories can be "hardwired" and/or dynamically determined. A person who builds a reputation for "Firm 1" simultaneously builds a reputation for Law. See FIG. 14.

If, after speaking well about Salaries at "Firm 1" a person decides to speak about Salaries at Law Firms generally, they will already have established a reputation for both "Law" and "Salaries." Their advice on Law Firms will be trusted because, by demonstrating that they know about "Firm 1", they've shown that they know about Law Firms generally.

If they say bad things about Law Firms, their reputation for Law Firms will decline but their reputation for "Firm 1" will be unaffected. In other embodiments, their reputation is affected poorly. In other embodiments, good messages raise their reputation for "Firm 1". After all, they've already established that they know about "Firm 1". The fact that they don't know about other firms doesn't diminish that.

E. Annotation System

Figure 15:
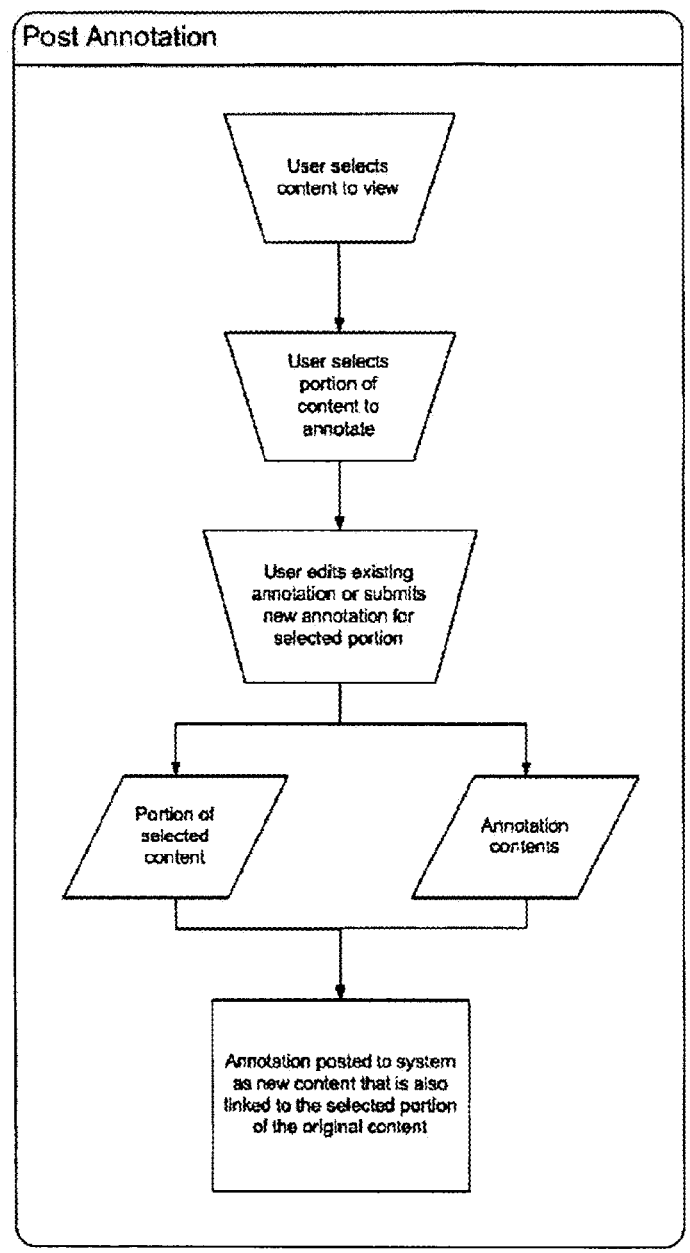
FIG. 15 illustrates an example flow chart of annotation posting.

The use of filters as described permits a unique annotation system. This system lets users annotate content with their comments, which are appropriately tagged and filed by the Present invention. In this way proprietary content becomes the seed from which thousands of related messages sprout, filling the database with interesting, pre-sorted messages. FIG. 15 shows an example flow chart of annotation posting. Steps can be added, removed, changed, and/or rearranged.

i. Creating Annotations.

Proprietary content is first tagged, sentence by sentence, with appropriate filters by the site operator. In other embodiments, tagging occurs more frequently, for example word by word, or group of words. In other embodiments, tagging occurs less frequently, such as in multi-sentence blocks or paragraphs.

Figure 16:
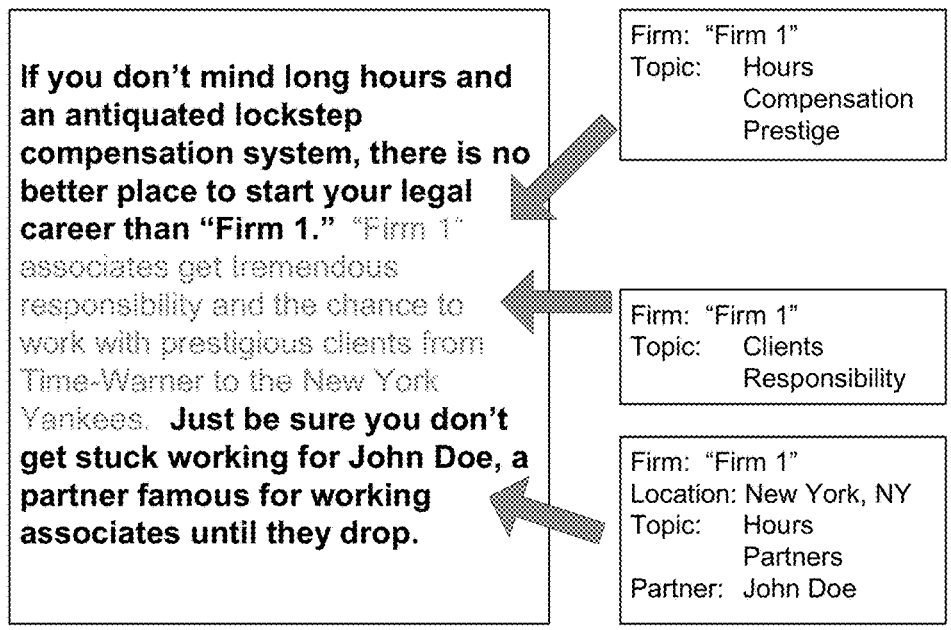
FIG. 16 illustrates an embodiment of tagged content.

As shown in the paragraph of FIG. 16, the user cannot see the filter values attached to each sentence. These are invisible. All he can see are the sentences about "Firm 1". In other embodiments, the user can see one or more filters.

Figure 17:
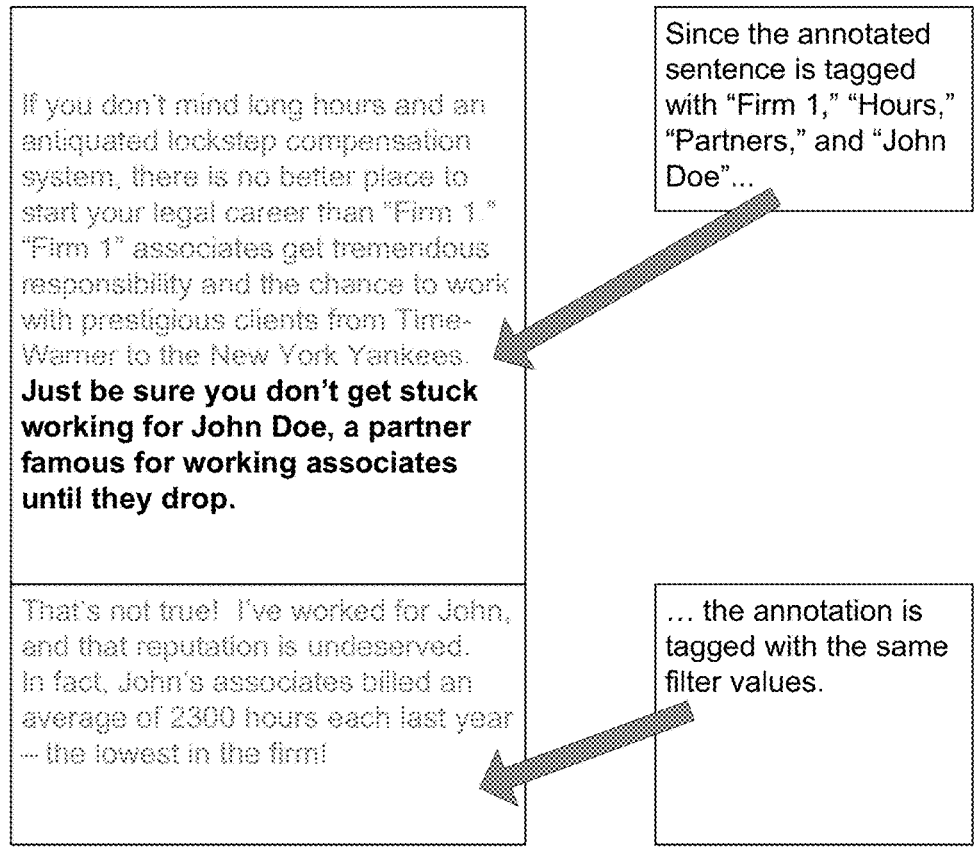
FIG. 17 illustrates an embodiment of annotated tagged content.

The filter values come into play when the user decides to annotate a sentence. Suppose that the user decides to comment on the third sentence in the above paragraph. They select the sentence to annotate, then enter their comments, as in FIG. 17.

Since we know that the sentence being annotated is about John Doe, a partner at "Firm 1", we can feel reasonably sure that the annotation is about the same subject. The system therefore automatically tags the annotation with the same filters as the original sentence and files the annotation in the database using those filters. In other embodiments, filters can be added, changed, and/or subtracted, automatically or by selection.

ii. Viewing Annotations.

There are two ways to view annotations: annotation format and message format.

a. Annotation Format.

When viewing annotated text, users can select a sentence to view its annotations. Thus, a user reading a description of "Firm 1" would simply select any sentence for more detail.

Like messages, annotations are rated and filtered. Annotations that fall above a user's threshold are displayed. Annotations below the threshold are not seen.

Thus by selecting any sentence in a description, a user can immediately read the best comments on that sentence. Comments by users with reputations for knowing the subject matter are more likely to be seen than comments by less knowledgeable users, and good messages are more likely to be seen than bad.

Since annotations are filed in the message database, they can also be pulled up as messages.

The annotation in diagram seven, for instance, is tagged with the following filters:

| | |
|---|---|
| Firms = | "Firm 1" |
| Topics = | Hours |
| | Partners |
| Partners = | John Doe |

This annotation will therefore come up as a message whenever a user sets their filters in a way that substantially overlaps with these filters. Thus, if a user sets their filters to ""Firm 1"" and "Hours," this message is likely to be displayed. It would also be displayed during a search for ""Firm 1"" and "Partners" or "Law Firms" and "Partners." And it's almost certain to be displayed in a search for "John Doe."

For both annotations and other messages, the order in which they are displayed can be influenced by relevance and/or rating.

F. Since annotations can also be viewed as messages, persuading users to annotate content will seed the system with initial messages and get conversations started. As long as the site starts with content users want to respond to, discussions will be started and placed into the system with enough filters attached so that appropriate messages appear during any related search. Because each message will have many filters attached, users will perceive the boards on the system to be full even though only a few messages may have been posted.

Anonymity provides a powerful incentive to speak about sensitive subjects online Indeed, the mere perception of anonymity felt by online speakers has contributed to an enormous outpouring of gossip on the Web. But as Time Magazine reports:

> Although the sites give their posters—who generally use pseudonyms—a feeling of anonymity, they're usually not anonymous at all. Faced with a subpoena, most sites will readily divulge a poster's name to the authorities.

Although a lack of anonymity can create a chilling effect on speech, giving users anonymity causes other problems. Anonymous speakers are not accountable for their speech and feel free to post spam and low-quality messages because speech can't be traced back to them.

The Present invention's rating and filtering systems solve these problems by creating accountability for anonymous speech. Users who speak poorly or spam the system will receive low ratings. Their messages will not be seen and they will discover that their speech has become invisible to others. On the other hand, users with good reputations will be able to speak anonymously with the knowledge that their speech will be heard, although their names remain unknown.

The Present invention protects people's identity in two ways: its four levels of anonymity and its use of onion routing.

i. Four Levels of Anonymity.

Figure 18:
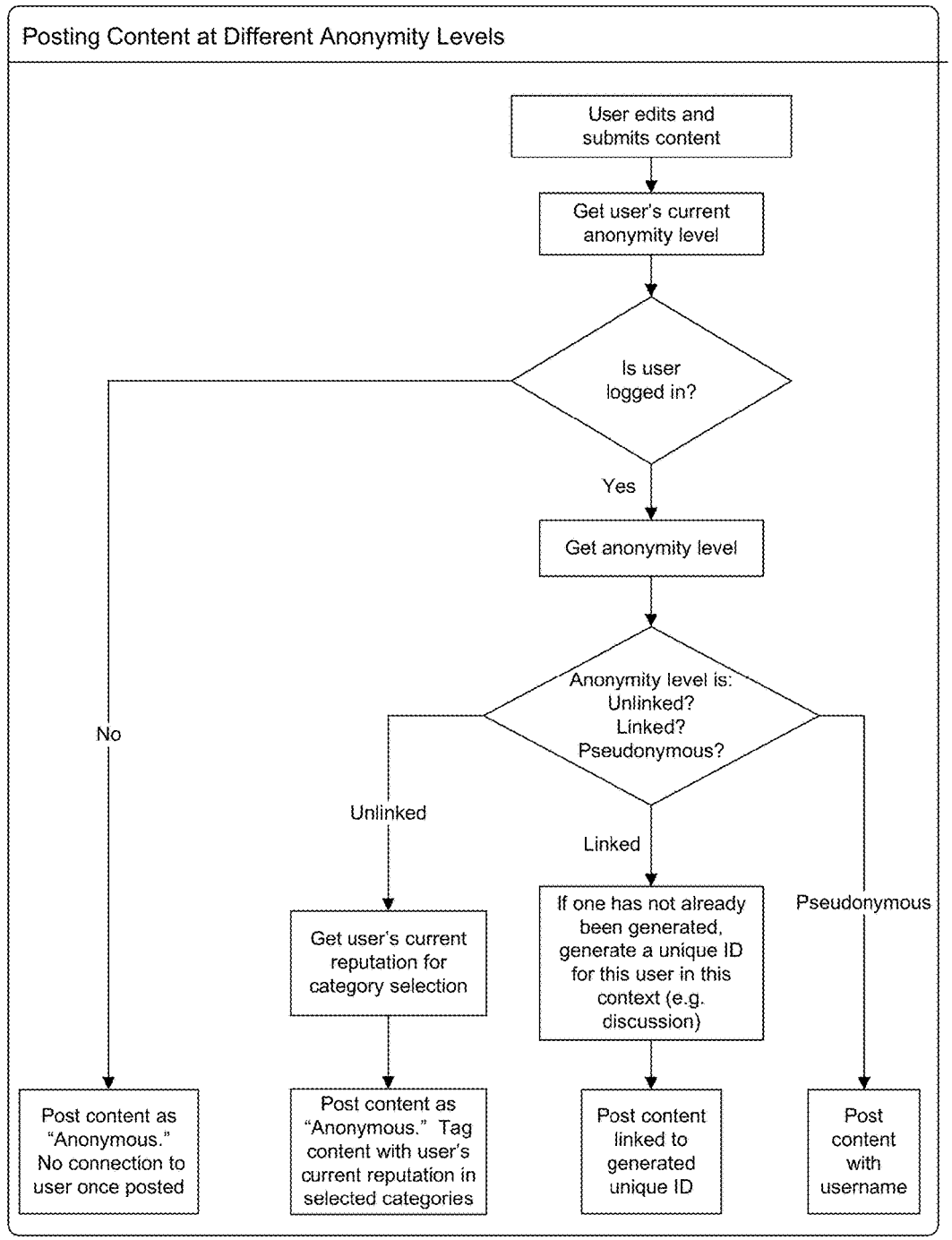
FIG. 18 illustrates an example flow chart of posting at different levels of anonymity.

The Present invention provides four different levels of anonymity. Users can change their anonymity level before posting messages in order to ensure that sensitive messages receive as much protection as they deserve. FIG. 18 shows an example flow chart of posting at different levels of anonymity. Steps can be added, changed, removed, and/or rearranged. FIG. 19 summarizes key features of different levels of anonymity. Levels can be added, removed, or changed.

a. Level One: Use of Pseudonyms.

First level anonymity allows users to post messages using a pseudonym. Unlike other message boards, the software does not ask for information about the user that could link the message to their true identity. No e-mail address, credit card information or other information that could connect a user to the site is recorded. Information about a user's Internet service provider or IP address is not logged. All that the system requests from a user—and all it knows about a user—is their username and password.

This means that if a site using the Present invention is subpoenaed to turn over the identity of someone who posted a particular message, it can't. Even if site operators cooperate to the best of their ability, the limited information they have will be useless. Asked who posted a particular message, the most they will be able to say is, "that message was posted by a person calling themselves 'Daffodil.' It was read by other users because Daffodil has a good reputation for knowing about the subject."

b. Level Two: Anonymous Linked.

Second level anonymity allows users to post messages as "Anonymous." Although other users cannot tell who posted an anonymous message, the Present invention keeps track and continues to link a user's reputation to the messages they post. Anonymous messages may therefore benefit from a poster's high reputation, and ratings given to anonymously posted messages affect the poster's reputation.

Messages posted using level-two anonymity are sometimes called "anonymous linked" messages because although the identity of the poster is hidden to other users, the Present invention keeps track of links between messages and their authors. The software "knows" who wrote which message, although other users don't.

This makes the "private reply" possible. Suppose Daffodil decides to post a message critical of 'Mr. Big,' a partner at "Firm 1". Daffodil has posted messages about "Firm 1" before, and has a high reputation for knowing about the firm. She realizes, however, that readers will be able to determine her identity if they read this message in the context of other messages she's written.

For this reason Daffodil decides to post her message anonymously. Her high reputation for knowing about "Firm 1" is linked to the message, so many people will read it. And if they give it a high rating, her reputation for "Firm 1" will go up even further.

Suppose Mr. Big reads the message. He disagrees with Daffodil, but doesn't want to speak out publicly. He can click a button on the message marked "private reply" and send a private reply to Daffodil's internal mailbox on the system. He can send this reply to Daffodil even though he doesn't know that "Daffodil" is the person he's writing to. And if Daffodil replies to him, she can choose to do so anonymously. If this correspondence continues a private, detailed e-mail conversation can take place between these two without ever risking Daffodil's identity. And if she eventually becomes convinced that she wronged Mr. Big in her original message, she may decide to retract it.

What if Daffodil decides not to retract her message? Mr. Big may become upset enough to serve the site with a subpoena demanding Daffodil's true identity.

The most the site could give Mr. Big would be Daffodil's username. But even this might be enough to unmask Daffodil. By putting her message together with other messages posted by Daffodil in the past, Mr. Big may be able to determine Daffodil's true identity.

c. Level Three: Anonymous Unlinked.

For this reason, the Present invention offers a third level of anonymity. Level three messages are also referred to as "anonymous unlinked." Like level two messages, they are posted under the username "Anonymous." But unlike level two, the system does not keep track of links between messages and their authors. When a message is posted, the system immediately stamps the message with a user's relevant reputation scores; it then severs the link between the user and the message and "forgets" the poster's identity. After a level three message has been posted, even the site operator is unable to determine who the author was.

Because the message has been stamped with the reputation values of the poster, it can be filtered like any other. Messages posted by high reputation users will be seen and those posted by low reputation users will not. But users feel secure posting level three messages because they know that although their messages can benefit from their reputation scores, their identities are completely protected—even from the site operators themselves.

d. Level Four: Complete Anonymity.

For each of levels one, two and three, users are required to log on with a username and password before posting messages. Although their identities are protected, some users may feel uncomfortable providing even this limited information just prior to posting particularly sensitive messages. For this reason level four anonymity allows users to post messages without even logging in. Users are not required to give any information at all. Since they have not given any information to the system, and since the Present invention does not record IP addresses, information about ISPs or place cookies on a user's machine, users can be assured of complete anonymity when using level four anonymity.

A disadvantage to level four anonymity is that since the system doesn't know who the user is, they are unable to take advantage of their reputation. As a result, few people are likely to see messages posted using level four anonymity. This problem is not insurmountable, however. A user who posts a particularly interesting message using level four anonymity can simply log in at a later date, find their message, and give it a high rating (or, if they're to scared to risk themselves this way, they can tell a friend about the message they "read" and give them enough information to easily locate it). One good rating will not be sufficient to ensure that the message is widely read. But it will give the message enough of a boost that a few more people will see it. If the message is truly interesting and deserves to be read, it's rating will quickly soar and it will be injected into the mainstream of conversation.

Employers sometimes keep track of the sites their employees have been to. As a result, people are often afraid to access particular sites from work.

Figure 20:
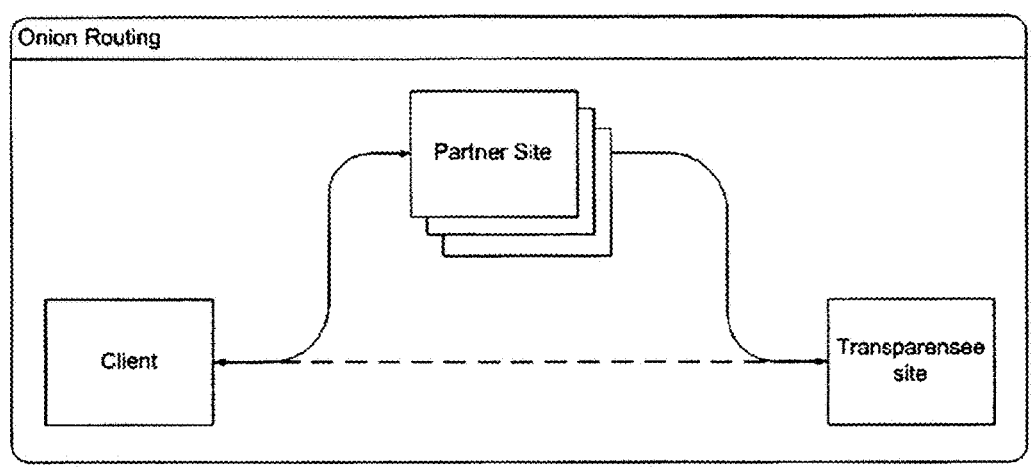
FIG. 20 illustrates an example of onion routing.

FIG. 20 shows an example of onion routing. The present invention avoids this problem through the use of packet wrapping. By using another site as a proxy server and "wrapping" our IP packets with theirs, we can disguise the source of our packets. If we have a partnership with Yahoo!, for instance, we could route our signal through Yahoo!, which would cause employers to believe that their employees are using that site, not ours.

Since filters are used to organize TRANSPARENSEE™ sites, it is important to ensure that sites have complete and current filter-sets. But it is difficult and expensive for sites to keep their filters up to date in real-time. This would require sites about law firms to know the name of every new law firm, and sites about restaurants to know the name of every new restaurant, as soon as they come into existence.

An easier way is to give users the ability to add new filters. If the user of a job site doesn't see their firm listed, or the user of a restaurant site doesn't see a new bistro, they can add it to the filter set. Allowing users who know a subject best to find and repair weak spots in the system is the best and most cost-effective way to keep filters current.

The potential disadvantage is that some users may insert incorrect filters into the filter-set. This can be prevented with TRANSPARENSEE™'s reputation system.

Suppose a user notices that their law firm, "Firm 4" is not listed on a TRANSPARENSEE™ job site. The user would request that Firm 4 be added to the filter set and would fill out a form containing basic information about the firm.

Since the user claims that Firm 4 is a New York law firm, it stands to reason that users with high reputations for "New York" and "Law Firm" will be in a position to know whether Firm 4 is real or not. The next time such users log into the system, they will see a poll in the corner of their screen asking:

| Which of these is a New York law firm? |
|---|
| ☒ Simpson, Thatcher & Bartlett<br>☐ Dewey Cheatem & Howe<br>☐ Bwahahahahaha :-) |

Users with high reputations for "New York" and "law firms" might be expected to answer this question correctly. But some may not. A malicious minority of users may check the wrong box.

These users can be caught through cluster analysis. A simple algorithm allows us to determine what answers the majority of users gave and highlights those users whose answers differed substantially. Their entries can be disregarded and their reputations diminished. If their reputations go down enough, they will no longer be asked to answer polls of this type. In this way the filter-set can grow in response to the needs of users.

It can also shrink. If users fail to use certain filters over a period of time, those filters are removed from the filter-set.

Figure 21:
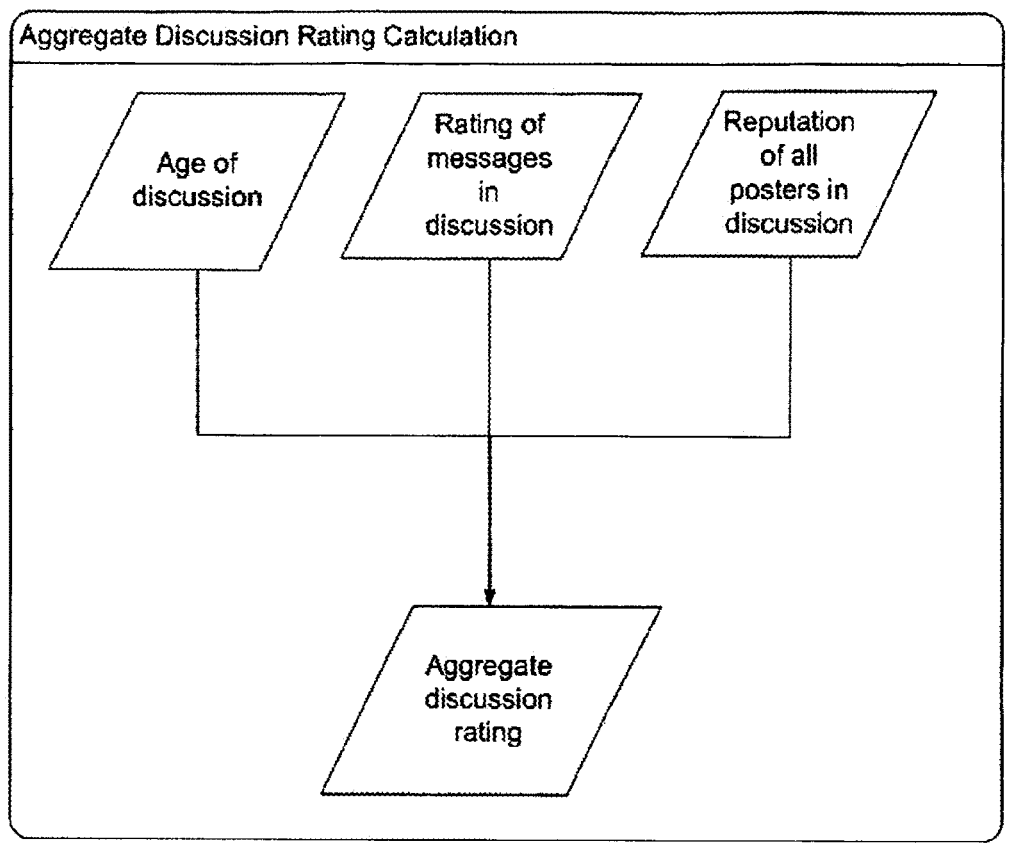
FIG. 21 illustrates an example of determining a discussion rating based on multiple factors.

We term the ability to grow and shrink in response to user demand an "organic" element. The present invention makes a system highly organic. The filter-set, and thus the board itself, responds to the demands of high-reputation users. By responding to users in real-time and shaping itself to their needs, the system collects and verifies information more rapidly and accurately than even a large staff could. FIG. 21 shows an example of determining a discussion rating based on multiple factors. Fewer, more, and/or different factors can be used. Such factors can also be used to rate filters and other features of the software.

In addition to messages, the Present invention supports polls, articles, transcripts, faxes, Word files, photos, audio and video clips and any other type of data. These types of content can be posted to the system, indexed, searched for, filtered and rated, just like messages.

Posting an interesting fax, photo or Word file would result in a substantial boost to a user's reputation. Indeed, certain types of content are more likely to result in a reputation boost than others. If a user posts an internal memo about bonuses at "Firm 1" to the ""Firm 1"" and "Salary Information" board, his reputation in those areas will skyrocket. It will be clear to everyone using the board that this person works at "Firm 1" and is doing his best to feed good information to others. This effect creates a strong incentive for people to post information proving that they are "insiders."

Polls can only be posted to the system by high-reputation users. At the discretion of the poster, they may be seen only by other high-reputation users.

Thus, a user with a high reputation for ""Firm 1"" could create a poll asking other "Firm 1" people questions about the firm. After all, who better to know the best questions to ask than someone who works there? People with high reputations for "Firm 1" might see the following poll the next time they login:

| Daffodil asks: "What's the worst thing about Firm 1's new offices? |
|---|
| ☐ not enough closet space<br>☐ horrible shag carpeting<br>☐ other_____ |

When enough people have answered this poll, Daffodil will have the option of allowing others to see poll results.

Allowing only users with high reputations to post and answer polls gives people a substantial incentive to try to obtain a high reputation. Giving them the discretion to send such polls only to other high reputation users provides a way for high reputation users to communicate only among themselves, thus enhancing the prestige—and reward—of having a high reputation.

Users who achieve a high reputation may also publish articles. An article is more complex than a message, and can contain images (such as graphs) and other complex attachments. More importantly, an article is posted in a prominent and fixed position on a page, making users more likely to read articles than messages.

As with polls, allowing only users with high reputations to write articles enhances people's desire to obtain a high reputation. Since people raise their reputation by posting good content to the site, this encourages the posting of interesting content.

The Present invention has a "chat" option, but with a difference. Any user party to a chat can choose to push the "record" button at any time. If a chat is being recorded, a red light appears in a corner of the chat window. Recorded chats can be posted to the system just like messages.

Chats may be restricted to only high reputation users. Other users won't even be aware that a chat is taking place. Furthermore, when a chat is posted, it may take on the average reputation values of the users party to the chat. This encourages users to invite only high reputation people to chat with them if they want their transcripts to be widely seen.

Pending consideration of copyright-related concerns, the software can easily be modified to accept faxes. If this function is implemented, users will be able to fax documents to TRANSPARENSEE™ sites from any location. After the fax goes through, the user's fax machine will print a slip containing a confirmation number.

The next time the user goes to the site they can receive the fax that they sent by clicking the "Receive Fax" button and entering the confirmation number. The fax will then appear on the user's screen and can be posted to the system. It is not necessary to login to receive a fax, and faxes can be posted to the system using any level of anonymity.

Again, pending consideration of copyright-related concerns, the software can be modified to accept Word files, photos, and video clips. Just as posting a fax can demonstrate one's insider status and raise one's reputation, so can posting an interesting file, photo, or clip.

One of the greatest advantages of the Present invention lies in the filter selection mechanism. It feeds information to users as they make choices, allowing them to extract information from the database on areas they may know little about.

Consider a law student trying to decide which firms to interview with. The student knows nothing about law firms, but knows that he would like to work at a firm with offices in New York, Palo Alto and London.

To obtain information, the student would set his filters as follows:

| | |
|---|---|
| Industries = | Law |
| Locations = | New York |
| | Palo Alto |
| | London |

If he now selects the "Firms" filter, the system will show him a list of law firms with offices in New York, Palo Alto and London. The list might look like this:

| | |
|---|---|
| Firms = | Brobeck, Phleger |
| | Coudert Brothers |
| | Davis Polk |
| | Gibson Dunn |
| | Morrison & Foerster |
| | Shearman & Sterling |
| | Skadden Arps |
| | White & Case |

These are all law firms with offices in New York, Palo Alto and London. On a conventional bulletin-board system the user would have had to determine for himself which firms have offices in all three locations. This could take hours, but only after doing this research would he know which boards are of interest to him. On a TRANSPARENSEE™ system, the relevant firms are pre-selected.

J. Wireless Clients Supported

The Present invention has been built to accommodate multiple front-ends. Thus, as wireless PDAs (such as Palm Pilots and Blackberries) become more commonly available, a front-end can be provided to make TRANSPARENSEE™ sites accessible from such devices.

The present invention will be particularly useful for PDA users, since the small screen and low bandwidth of PDAs places a premium on the ability to retrieve high quality information quickly. Discussion boards, 7 in their current form, will be virtually inaccessible from PDAs due to the amount of time it takes to find worthwhile information on them, even when using a high bandwidth client. By eliminating low quality information from such boards, the Present invention will make PDAs a viable device for the exchange of information between large numbers of online users.

User Interfaces for Performing Search Queries

As discussed above in relation to FIG. 22, a plurality of users' computers U access a content server C via a network I (e.g., the Internet). Server C provides the users U access to a content database CD. Database CD may provide various types of information in a plurality of records, each record containing information and able to be parsed into one or more categories of information. For example, the database CD may provide information used by an online real estate or social networking service (each record containing information regarding a particular real estate or particular product item). Also connected to the network I is a web server W which cooperates with a system S to manage users' access to information in database CD.

Within system S, a query and search module 20 interfaces with users, permitting them to formulate requests for information from database CD. Module 20 creates, manages and maintains a structure database 10, which contains information describing the structural relationship between various pieces of information in the various records of the database CD. The structure database 10 may retain information regarding the structure of each category of a record. Database 10 also contains information relating to the structural relationship between various portions of information in a received search query in a format comparable to the structural relationship of information in database CD.

User inputs defining a search query may be received through a user interface. In some embodiments, user input comprises search criteria (for various categories) specified by a user (e.g., as specified through selected filter criteria, selected categories, selected multiple-choice menus, selected values, selected ranges, etc.). The search criteria specified by a user may be used as inputs to the query and search module 20 to determine relevant records in content database CD. Server W then connects the user to server C, with instructions to server C regarding what information is to be provided to the user from database CD.

In some embodiments, the search query (comprising a set of one or more search criteria of one or more categories) may be used to produce and display (in the user interface) search results comprising zero or more "exact matches" and/or zero or more "non-exact matches" in content database CD. An "exact match" in content database CD may comprise an "exact matching" record having information that exactly matches all search criteria specified in the search query. For example, in a real estate search service, if the search query specifies a price range of X, a zip code of Y, and a property type of Z, an exact matching record would contain a price in the range of X, a zip code of Y, and a property type of Z. Note, however, that an exact matching record may also contain categories (such as a number of bedrooms, number of bathrooms, etc.) that have not been selected by the user (whereby the user has not specified search criteria for the category) and still be considered an exact matching record, as long as the categories that are selected by the user (e.g., price range, zip code, property type) have specified criteria that exactly match the information in the record.

A "non-exact match" in content database CD may comprise a "non-exact matching" record not having information that exactly matches all the search criteria specified in the search query. In some embodiments, a non-exact match may comprise a "non-exact matching" record not exactly matching one or more search criteria (including not exactly matching any of the search criteria) of the search query. For example, if the search criteria specifies a price range of X, a zip code of Y, and a property type of Z, a non-exact matching record may contain a price above or below the range of X, a zip code above or below Y, and/or a property type that is not Z. As such, non-exact matches may comprise records that are close/approximate matches, but are not exact matches, to all the search criteria, but still have some relevance to the search query. For example, a non-exact match may comprise a real estate record having a zip code of Y, a property type of Z, but have a price just above the range of X. A user interface may show non-exact matching records listed in an order (e.g., decreasing order) based on the relevance of the non-exact match to the search query. In some embodiments, search methods discussed herein may be used to determine a relevance value for each record in a database, the relevance value representing the relevance/closeness of the record to the search criteria.

Search results comprising exact and non-exact matches may be produced using methods and algorithms described above. For example, search results may be produced by maintaining information (in structure database 10) regarding the structure of information in content database CD and using the structure database 10 to correlate the structure of a search query to the structure of the information in the content database CD. As a further example, search results may be produced by the "Similarity Algorithm."

A user interface may be provided for receiving user input for performing a search query on the content database CD, the search query comprising a set of one or more search criteria of one or more categories. The user interface (such as, a graphical user interface) may be provided by the web server W or content server C to receive user input from users (e.g., through users' computers U). In some embodiments, the user interface provides one or more user interface tools and/or user interface functions relating to the performance of search queries on the content database CD. In some embodiments, a user input tool includes a "slider" tool associated with a particular category, the "slider" tool being used for changing the search criterion (category value) or the weight value of the associated category. In response to receiving any changes (through the slider tool) in the search criterion or weight value of an associated category, the user interface displays new search results comprising exact and/or non-exact matches based on the changed/new search criterion or weight value.

In some embodiments, a user interface tool includes a "drill down" tool for an associated search criterion of a particular category, the drill down tool being used to show (upon user selection of the drill down tool) records having the associated search criterion, and/or to select (upon user selection of the drill down tool) the associated search criterion. In response to receiving a selection of a search criterion through a drill down tool, the user interface displays new search results comprising exact and/or non-exact matches based on the new search criterion. In some embodiments, a drill down tool may also be used to display an "exact-match number" comprising the number of records (in content database CD) exactly matching the search criterion associated with the drill down tool as well as other user specified search criteria (which, in some embodiments, is changed using a slider tool). In response to receiving any changes (through a slider tool) in a search criterion, the drill down tool displays a new exact-match number based on the changed/new search criterion. The user interface may further provide a multi-select drill-down function for allowing simultaneous selection of two or more search criteria (associated with the two or more drill down tools) specified for the same category.

In some embodiments, a user interface tool includes a mapping tool for determining address information contained in search results for the search query and displaying symbols representing the addresses on a map. The search results may comprise exact and/or non-exact matches that are represented on the map. In some embodiments, a user interface function may comprise a "search-result selection" function for selecting a search result to provide information to produce new search criteria for a new search query to the database CD. The new search results may comprise exact and/or non-exact matches based on the information of the selected search result.

Some embodiments of a user interface are described below in relation to a real estate service or a product shopping service. These services are described for illustrative purposes only and the user interface embodiments may be used for any other type of service (such as any online service, any network based service, or any non-network based service). Other examples include a social networking service, online dating service, restaurant or food survey service, news or article service, or any other type of special interest service.

User Interface for Selecting Search Criteria

FIG. 32 shows an exemplary screen shot of a user interface 3200 for selecting initial search criteria in a real estate service. The user interface 3200 may be used to receive initial search criteria from the user to search a real estate database (e.g., stored in content database CD). The real estate database may comprise a plurality of real estate records, each record containing information regarding a particular piece of real estate. Potential users/buyers can access the database, providing various search criteria through user interfaces described herein, to locate potential real estate for purchase.

As shown in the example of FIG. 32, the initial user interface 3200 provides a plurality of user selectable categories 3201 in which to specify search criteria (including selectable values 3205, selectable value ranges 3210, and/or selectable multiple-choice menus 3215). For example, the initial user interface 3200 may provide the user selectable categories 3201 of "Zip Code," "Price," "Bedrooms," etc. Note that a user need not select each category 3201 for specifying search criteria. In the example of FIG. 32, the "Years Old," "Square Feet," "Extras," and "Property Type" categories are not selected (whereby the user has not specified search criteria in these categories). Rather, the user may make a selection in only those categories that he/she considers important. After specifying search criteria in the user interface 3200, the user may select/click on the search button 3220 to begin searching the real estate records stored in the real estate database based on the search criteria.

Category-Weight Slider Tool

Figure 33A:
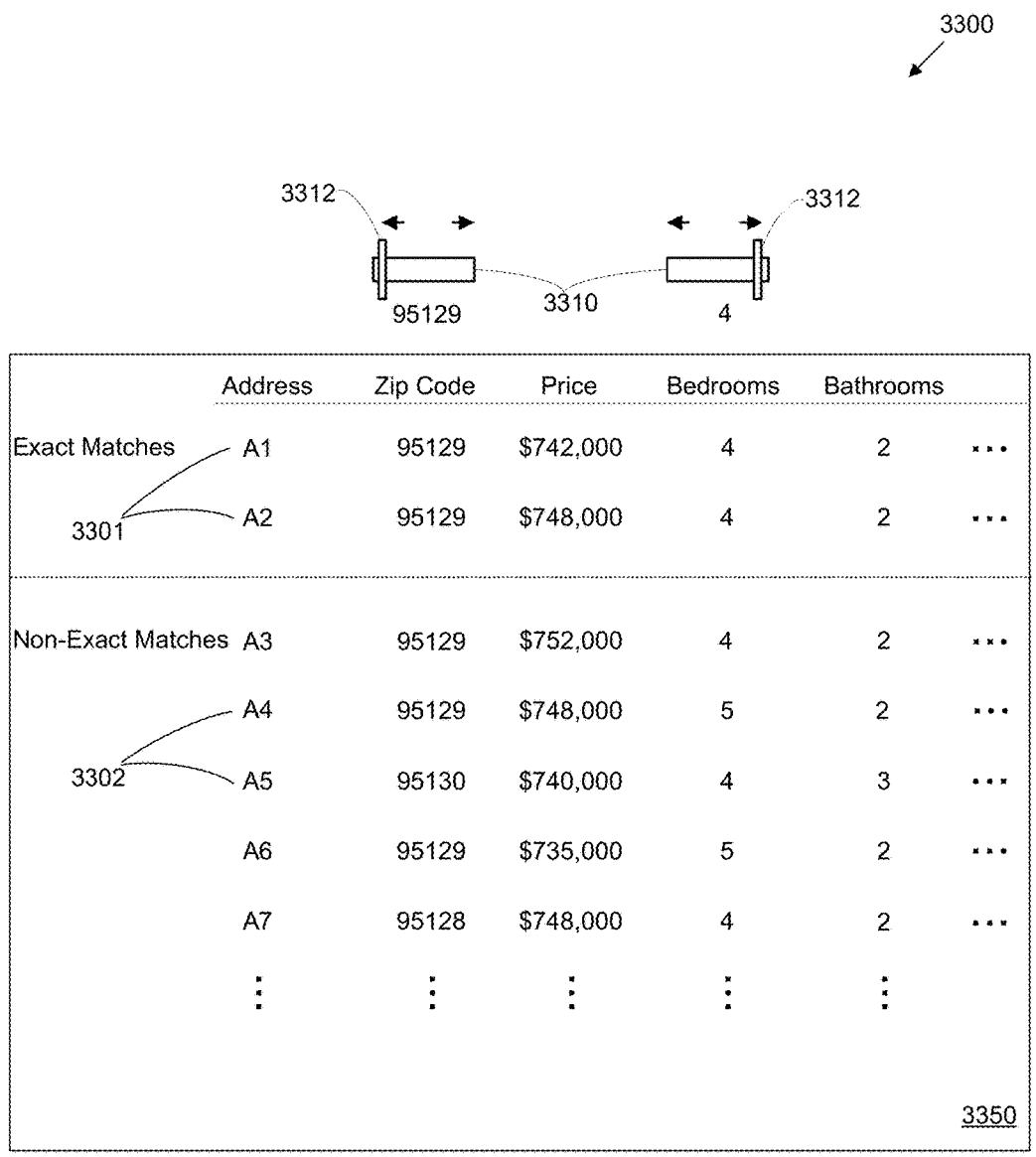

FIGS. 33A-B show exemplary screen shots of user interfaces 3300 implementing category-weight slider tools. FIG. 33A shows a user interface 3300 showing search results based on the search criteria shown in FIG. 32. In some embodiments, the user interface 3300 comprises a search-results section 3350 for displaying search results comprising zero or more exact matches 3301 and/or zero or more non-exact matches 3302. An exact match 3301 may comprise a real estate record containing information that exactly matches all specified search criteria (e.g., has zip code 95129, has a price within the range of $700,000 to $750,000, has 4 bedrooms, and has 2 bathrooms). Note, however, that an exact matching record may also contain categories (e.g., "Years Old," "Square Feet," "Extras," and "Property Type") that are not selected or specified in the search criteria.

A non-exact match 3302 may comprise a real estate record containing information that does not exactly match one or more specified search criteria (including not matching all specified search criteria). For example, a non-exact match 3302 may have a price just above the specified range of $700,000 to $750,000, but may otherwise match the other search criteria. As a further example, a non-exact match 3302 may have more bedrooms than the specified 4 bedrooms, but may otherwise match the other search criteria. As another example, a non-exact match 3302 may have a different zip code than the specified 95129 zip code and have more bathrooms than the specified 2 bathrooms, but may otherwise match the other search criteria. As such, the non-exact matches 3302 may comprise real estate records that do not exactly match the search query, but are close/approximate matches to the search query and still have some relevance to the search query.

A user interface may show non-exact matches 3302 that are listed in an order (in the search-results section 3350) based on the relevance of the non-exact match 3302 to the search criteria. In some embodiments, a user interface shows non-exact matches 3302 listed in decreasing order of relevance to the search criteria. In some embodiments, search methods discussed herein may be used to determine a relevance value for each record in a database, the relevance value representing the relevance/closeness of the record to the search criteria. As discussed above, the various categories of search criteria may each have an associated weight value indicating the importance of a particular category. The relevance value determined for a record may be based, in part, on the weights associated with the various categories of search criteria.

In some embodiments, a user interface may provide a user selectable category-weight slider tool (associated with a particular category) for receiving changes of the weight value of the associated category from a user. The weight of a category may indicate the importance of the category to the user. Changing the weight of category may change the relevance values determined for the records and, thus, may cause a change in the list ordering of the non-exact matches 3302 shown in the user interface.

In some embodiments, increasing the weight/importance value of an associated category increases the importance (in determining the relevance value for the record) of whether or not the record contains information that matches the search criterion specified for the associated category. For example, increasing the weight of a category may increase the relevance value of a record (from its previous relevance value) if the record contains information that matches the search criterion specified for the associated category (since the fact that the record matches the search criterion has increased in importance). In contrast, increasing the weight of a category may decrease the relevance value of a record (from its previous relevance value) if the record contains information that does not match the search criterion specified for the associated category (since the fact that the record does not match the search criterion has increased in importance).

In some embodiments, decreasing the weight/importance of an associated category decreases the importance (in determining the relevance value for the record) of whether or not the record contains information that matches the search criterion specified for the associated category. For example, decreasing the weight of a category may decrease the relevance value of a record (from its previous relevance value) if the record contains information that matches the search criterion specified for the associated category (since the fact that the record matches the search criterion has decreased in importance). In contrast, decreasing the weight of a category may increase the relevance value of a record (from its previous relevance value) if the record contains information that does not match the search criterion specified for the associated category (since the fact that the record does not match the search criterion has decreased in importance).

FIG. 33A shows an example of category-weight slider tools 3310 used to receive changes in weight values for an associated category. A category-weight slider tool 3310 may receive changes in weight values from a user without the user having to manually type in new weight values. A user may change the weight of an associated category using the category-weight slider tool 3310, for example, by selecting and dragging a weight adjuster element 3312 on the category-weight slider tool 3310, or by selecting/clicking the category-weight slider tool 3310 to the left or right of the weight adjuster element 3312 to decrease or increase the weight value. In the example of FIG. 33A, a first category-weight slider tool is used to change the weight of the "Zip Code" category and a second category-weight slider tool is used to change the weight of the "Bedrooms" category. The search criterion/value of the associated category specified by the user may also be shown near the category-weight slider tool 3310 (e.g., the search criterion/value of "95129" is shown under the first category-weight slider tool and the criterion/value of "4" is shown under the second category-weight slider tool). In the example of FIG. 33A, the first category-weight slider tool has been used to decrease the weight (e.g., to a minimum weight) of the "Zip Code" category and the second category-weight slider tool has been used to increase the weight (e.g., to a maximum weight) of the "Bedrooms" category.

As such, for a real estate record having a "4" value that matches the "4" search criterion specified for the "Bedroom" category, increasing the weight of the "Bedroom" category may increase the relevance value of the real estate record from its previous relevance value. For a real estate record having a "4" value that does not match the "4" search criteria specified for the "Bedroom" category, increasing the weight of the "Bedroom" category may decrease the relevance value of the real estate record from its previous relevance value. For a real estate record having a "95129" value that matches the "95129" search criteria specified for the "Zip Code" category, decreasing the weight of the "Zip Code" category may decrease the relevance value of the real estate record from its previous relevance value. For a real estate record having a "95129" value that does not match the "95129" search criteria specified for the "Zip Code" category, decreasing the weight of the "Zip Code" category may increase the relevance value of the real estate record (from its previous relevance value).

FIG. 33A shows examples of category-weight slider tools used to change the weight of an associated category having a user specified value (such as "95129" or "4"). However, in other embodiments, the category-weight slider tools may be used to change the weight of an associated category having any other type of user specified search criterion (e.g., as specified through selected filter criteria, selected multiple-choice menus, selected ranges, etc.). For example, the user interface may provide a category-weight slider tool to change the weight of the "Price" category having a selected value range, or provide a category-weight slider tool to change the weight of the "Extras" category having selected multiple-choice menus, etc.

Changing one or more weights of one or more categories may change the relevance values determined for records of the database (since the relevance values are determined, in part, based on the weights of the categories). As such, upon the user interface receiving (through a category-weight slider tool) a change of a weight of a category specifying a new weight, the list ordering of the non-exact matches 3302 shown in the user interface may also change based the new relevance values determined for the non-exact matches 3302 using the new weight value. In some embodiments, the non-exact matching records 3302 are listed in decreasing order of relevance so that a non-exact matching record 3302 having the highest determined relevance value is displayed on top of the search-results section 3350 and a non-exact matching record 3302 having the lowest determined relevant value is displayed on bottom of the search-results section 3350. In other embodiments, the non-exact matching records 3302 are listed in a different order of relevance.

FIG. 33B shows a user interface 3300 showing exemplary search results based on the changed/new category weights shown in FIG. 33A. Note in the example of FIG. 33A, the first category-weight slider tool has been used to decrease the weight (e.g., to a minimum weight) of the associated "Zip Code" category and the second category-weight slider tool has been used to increase the weight (e.g., to a maximum weight) of the "Bedrooms" category. As such, the non-exact matching records 3302 having a "4" Bedroom value (that matches the "4" search criterion specified for the Bedroom category) have increased relevance values. Therefore, in response to the new category weights, the user interface 3300 displays these non-exact matching records 3302 in higher ordered positions in the list of the non-exact matches 3302 (as shown in the search-results section 3350). Also, the non-exact matching records 3302 having a "95129" Zip Code value (that matches the "95129" search criterion specified for the Zip Code category) have decreased relevance values. Therefore, in response to the new category weights, the user interface 3300 displays these non-exact matching records 3302 in lower ordered positions in the list of the non-exact matches 3302 (as shown in the search-results section 3350). As the example of FIG. 33B shows, a record (e.g., "A7") having a matching Bedroom value and a non-matching Zip Code value will have a higher determined relevance value (and thus be displayed in a higher position in the user interface) than a record (e.g., "A4") having a non-matching Bedroom value and a matching Zip Code value (since the weight of the Bedroom category is set higher than the weight of the Zip Code category).

In some embodiments, the user interface dynamically shows new list orderings of the non-exact matches 3302 in the search-results section 3350 in real-time based on one or more new weights of one or more categories (received through one or more category-weight slider tools 3310). In these embodiments, changes in the list ordering of the non-exact matches 3302 may also be shown dynamically and in real-time as category weights are changed by the user (using the category-weight slider tools 3310). The new list orderings of the non-exact matches 3302 may be shown dynamically and in real-time as category weights are changed, without requiring the user to type in new category weights or to otherwise initiate displaying the new list orderings (e.g., by selecting/clicking the search button 3220 again to begin a new search). As such, category weights can be continually revised using the category-weight slider tools 3310 as new list orderings of non-exact matches 3302 are shown in the user interface. For example, as a user decreases the weight of the Zip Code category and increases the weight of the Bedroom category in FIG. 33A, the list ordering shown in FIG. 33B may be dynamically and in real-time produced based on the changed category weight(s) and displayed by the user interface 3300.

Category-Value Slider Tool

Figure 34A:
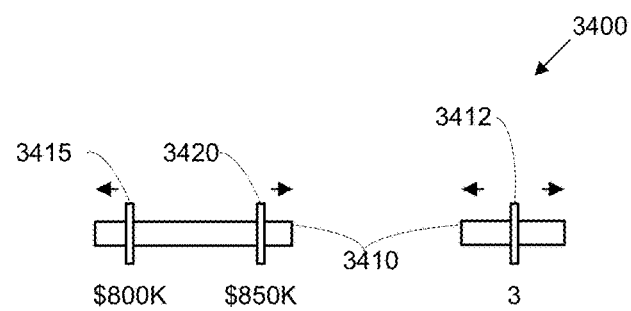
FIGS. 34A-B show exemplary screen shots of user interfaces implementing user selectable category-value slider tools.
Figure 34B:
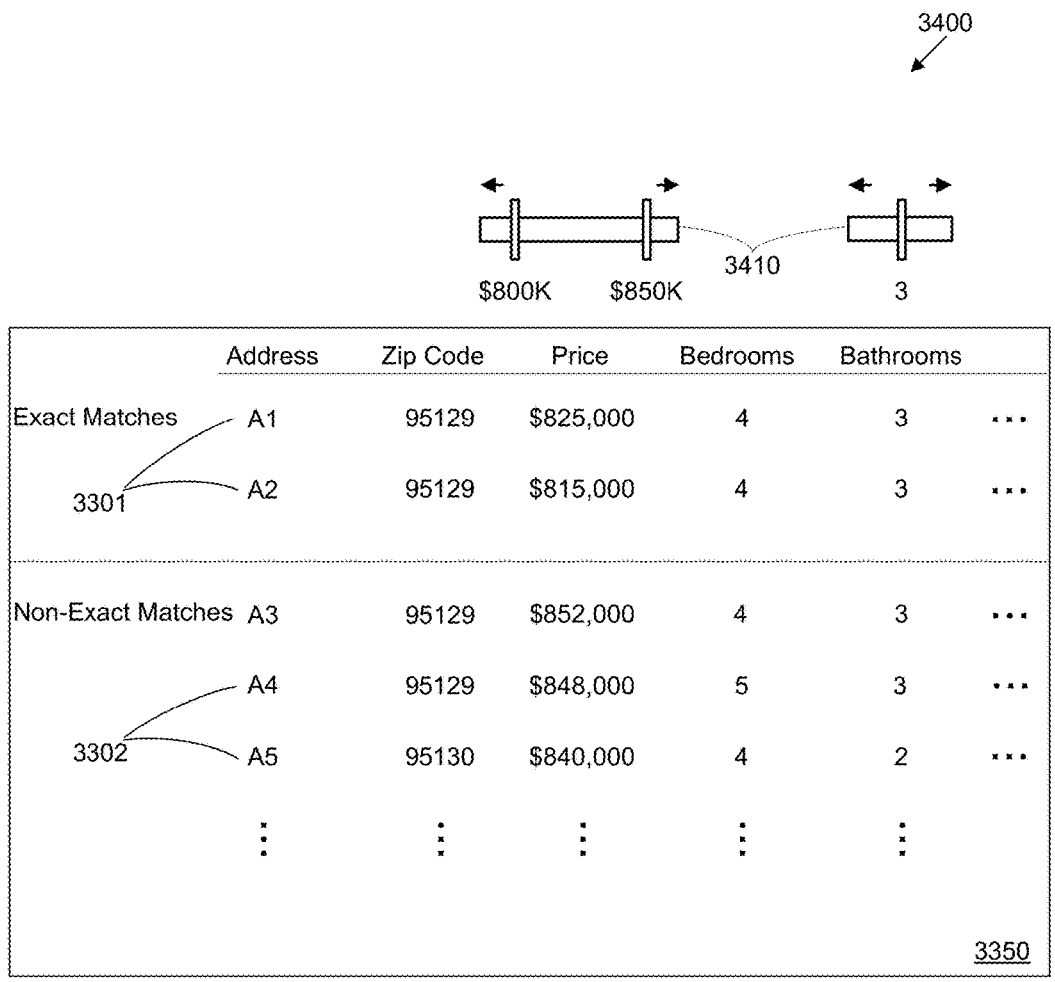

FIGS. 34A-B show exemplary screen shots of user interfaces 3400 implementing user selectable category-value slider tools. FIG. 34A shows a user interface 3400 showing search results (in a search-results section 3350) based on the search criteria shown in FIG. 32. The user interface 3400 displays search results that may include zero or more exact matches 3301 and/or zero or more non-exact matches 3302. In some embodiments, a user interface may provide a category-value slider tool that is associated with a particular selected category. The category-value slider tool may be used for receiving changes in the search criterion of the associated selected category from a user. Changing the search criterion may change the search results (including exact matching records 3301 and non-exact matching records 3302), as well as the list ordering of the non-exact matching records 3302 shown in the user interface (as the relevance values determined for the records may change). Upon receiving a new search criterion of a category from the user (through a category-value slider tool), the user interface 3400 may display one or more new exact matching records 3301 and/or a new list ordering of the non-exact matching records 3302 based on the new search criterion.

FIG. 34A shows an example of category-value slider tools 3410 used for receiving changes in search criteria of an associated category. A user may change a search criterion comprising a category value (e.g., a number of Bathrooms) using the category-value slider tool 3410, for example, by selecting and dragging a value adjuster element 3412 on the category-value slider tool 3410, or by selecting/clicking the category-value slider tool 3410 to the left or right of the value adjuster element 3412 to decrease or increase the value. A category-value slider tool 3410 may also be used to change a search criterion comprising a selected range of values (e.g., a price range), for example, by selecting and dragging a minimum value adjuster element 3415 or a maximum value adjuster element 3420 on the category-value slider tool 3410 to change the minimum and maximum range of values.

In the example of FIG. 34A, a first category-value slider tool is used to change a search criterion comprising a range of values for the "Price" category and a second category-value slider tool is used to change a search criterion comprising a value for the "Bathrooms" category. As such, FIG. 34A shows examples of category-value slider tools used to change a search criterion comprising a value or a range of values. However, in other embodiments, a category-value slider tool may be used to change any other type of specified search criterion (e.g., as specified through selected filter criteria, selected multiple-choice menus, etc.). Note in the example of FIG. 34A, the first category-value slider tool has been used to change the search criterion to "800 k to 850 k" in the "Price" category and the second category-value slider tool has been used to change the search criterion to "3" in the "Bathrooms" category. As the user changes the search criterion, the new search criterion may be shown near the category-value slider tool 3410 (e.g., the new range of "800 k to 850 k" is shown under the first category-value slider tool and the new value of "3" shown under the second category-value slider tool).

FIG. 34B shows a user interface 3400 showing exemplary search results based on the change of search criteria shown in FIG. 34A. In some embodiments, the user interface dynamically shows one or more new exact matches 3301 in real-time as a user changes one or more search criteria of one or more categories (using one or more category-value slider tools 3410). In some embodiments, the user interface dynamically shows new search results as the user changes search criteria of only a sub-set of categories. The new exact matches 3301 may be shown dynamically and in real-time as search criteria are changed, without requiring the user to type in new search criteria or to otherwise initiate displaying of new search results (e.g., by selecting/clicking the search button 3220 again to begin a new search). In some embodiments, new list orderings of the non-exact matches 3302 are also displayed by the user interface dynamically and in real-time as search criteria are changed (using the category-value slider tools 3410), without requiring the user to type in new search criteria or to otherwise initiate displaying of new list orderings (e.g., by selecting/clicking the search button 3220 again to begin a new search). As such, search criteria can be continually revised using the category-value slider tools 3410 as new exact matches 3301 and new orderings of non-exact matches 3302 may be dynamically and in real-time shown in the user interface.

Mapping Tool

Figure 35A:
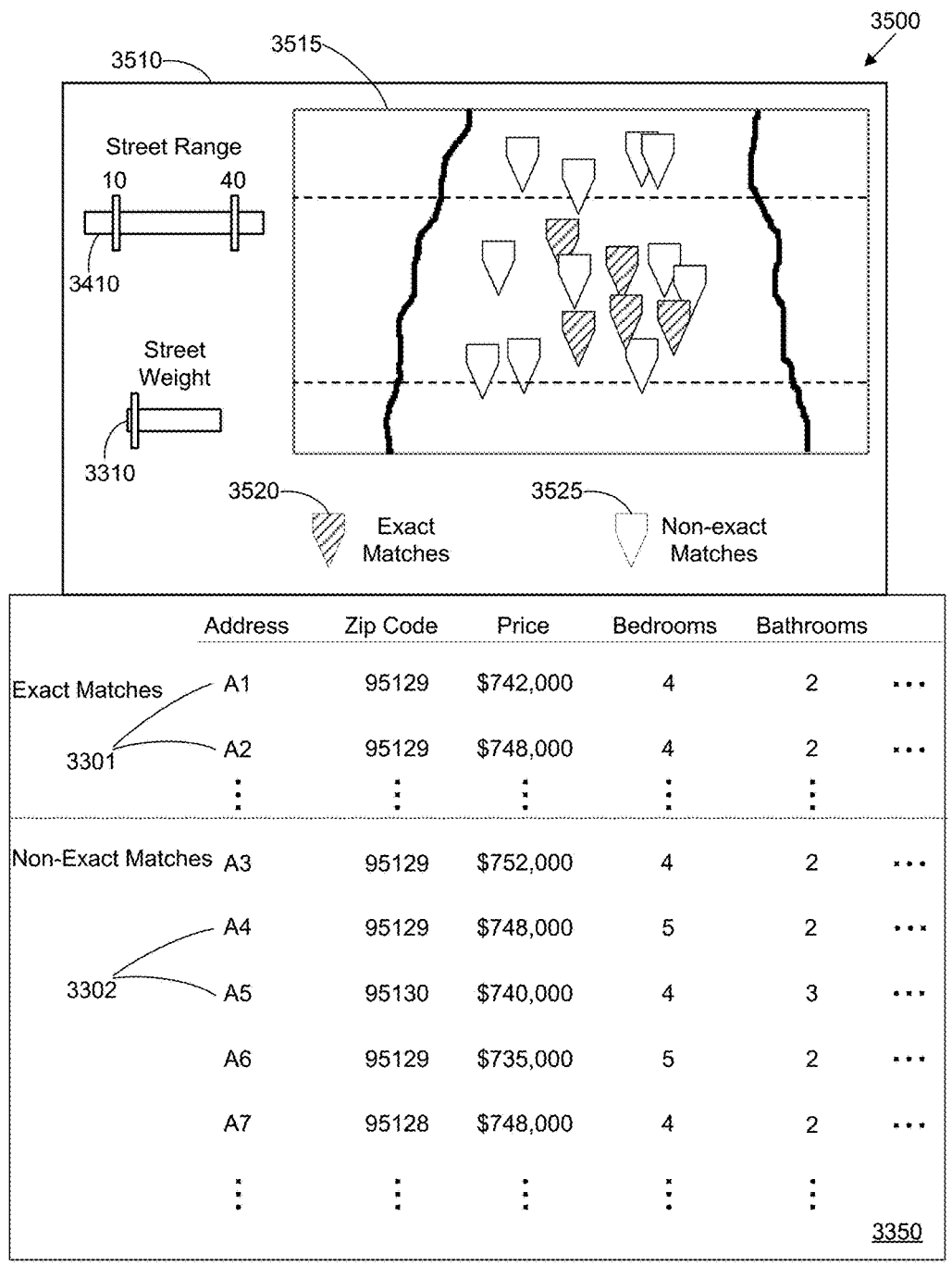
FIGS. 35A-B show exemplary screen shots of user interfaces implementing a mapping tool.
Figure 35B:
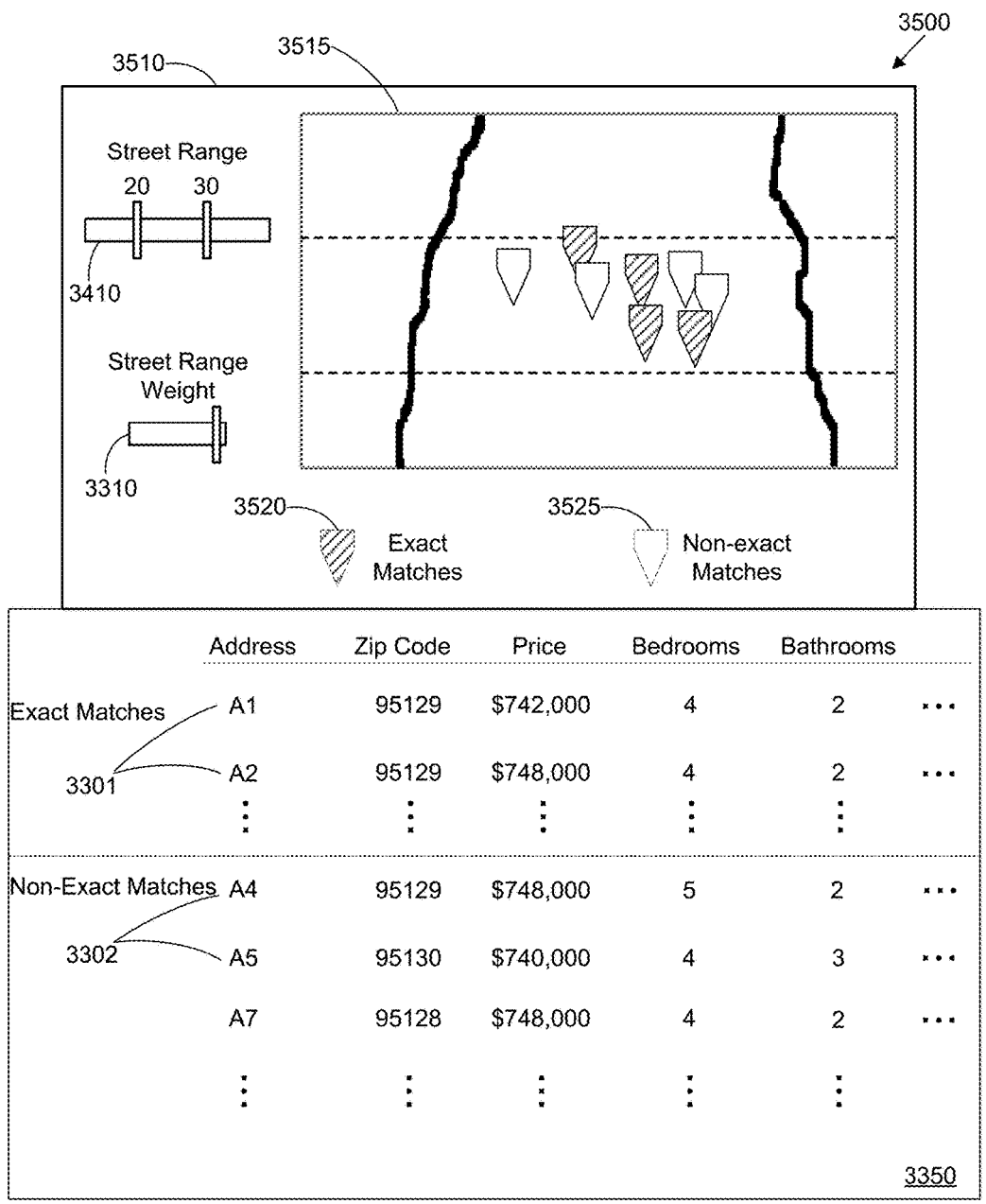

FIGS. 35A-B show exemplary screen shots of user interfaces 3500 implementing a mapping tool. FIG. 35A shows a user interface 3500 showing exemplary search results (in a search-results section 3350) based on the search criteria shown in FIG. 32. The search-results user interface 3500 displays search results that may include zero or more exact matches 3301 and/or zero or more non-exact matches 3302. In some embodiments, a user interface may provide a mapping tool 3510 that determines address/location information contained in the exact matching records 3301 and/or non-exact matching records 3302 and displays symbols representing the records (using the address/location information) on a map 3515. The map 3515 may display a first symbol 3520 (e.g., a shaded symbol) representing exact matches 3301 and a second symbol 3525 (e.g., a non-shaded symbol) representing non-exact matches 3302, the first and second symbols being different in appearance.

The mapping tool 3510 may provide one or more category-weight slider tools 3310 used to change weights of one or more categories and/or one or more category-value slider tools 3410 used to change search criteria of one or more categories. FIG. 35A shows an example of a category-weight slider tool 3310 used to change the weight of a "Street" category and a category-value slider tool 3410 used to change search criterion (comprising a range value) of the "Street" category. In the example of FIG. 35A, the weight of the "Street" category is initially set to a relatively low value and the range value of the "Street" category is initially set to "10 to 40" (indicated by the dashed lines in the map 3515). The search results shown in FIG. 35A are produced based on these initial settings (as well as based on the initial search criteria shown in FIG. 32). The map 3515 displays symbols representing the exact matches 3301 and non-exact matches 3302 of the search results. As shown in the map 3515, since the weight of the "Street" category is initially set to a relatively low value, the search results include several non-exact matches 3302 that are outside the specified range of streets "10 to 40" (indicated by the dashed lines in the map 3515).

FIG. 35B shows an example of where the category-weight slider tool 3310 is used to change the weight of a "Street" category to a relatively high value and the category-value slider tool 3410 is used to change the range value of the "Street" category to "20 to 30" (indicated by the dashed lines in the map 3515). FIG. 35B also shows the new search results that are produced based, in part, on these new settings and the map 3515 displays symbols representing the exact matches 3301 and non-exact matches 3302 of the new search results. As shown in the map 3515, since the weight of the "Street" category is changed to a relatively high value, the search results do not include non-exact matches 3302 that are outside the new specified range of streets "20 to 30" (indicated by the dashed lines in the map 3515).

In some embodiments, the mapping tool 3510 shows symbol representations for a predetermined number of non-exact matches 3302 having the highest relevance values. For example, the mapping tool 3510 may show symbol representations for only the top five non-exact matches 3302 having the five highest relevance values. As new weight values of a category are received (through a category-weight slider tool 3310) and/or new search criteria of a category are received (through a category-value slider tool 3410) from a user, the non-exact matches 3302 having the highest relevance values may also change. As such, the mapping tool 3510 may show symbol representations for new non-exact matches 3302 having the highest relevance values based on the new category weights and/or new search criteria.

In some embodiments, the user interface 3500 dynamically shows new search results (comprising exact matches 3301 and/or non-exact matches 3302) as well as new symbol representations of the search results on a map 3515 in real-time as it receives new weight values of a category (through a category-weight slider tool 3310) and/or new search criteria of a category (through a category-value slider tool 3410) from a user. As such, the user interface 3500 displays changing search results and changing symbol representations of the search results on a map 3515 dynamically and in real-time as a user continually changes one or more category weights and/or continually changes search criteria of one or more categories, without requiring the user to type in new category weights and/or new search criteria or to otherwise initiate display of the new search results and new symbol representations.

Drill Down Tools

In some embodiments, a user interface may provide a user input tool comprising a "drill down" tool for an associated search criterion of a particular category. The drill down tool may be used to show (upon user selection of the drill down tool) records having the associated search criterion, and/or to select (upon user selection of the drill down tool) the associated search criterion. In response to receiving a selection of a search criterion through a drill down tool, the user interface displays new search results comprising exact and/or non-exact matches based on the new search criterion. In some embodiments, a drill down tool may also be used to display a "exact-match number" comprising the number of records (in content database CD) exactly matching the search criterion associated with the drill down tool as well as other user specified search criteria (which, in some embodiments, is changed using a category-value slider tool). In some embodiments, in response to receiving any changes (through a category-value slider tool 3410) in a search criterion, the drill down tool displays a new exact-match number based on the changed/new search criterion. As discussed below, in some embodiments, a drill down tool comprises a text component, matching number component, and/or a criterion selection component.

Figure 36A:
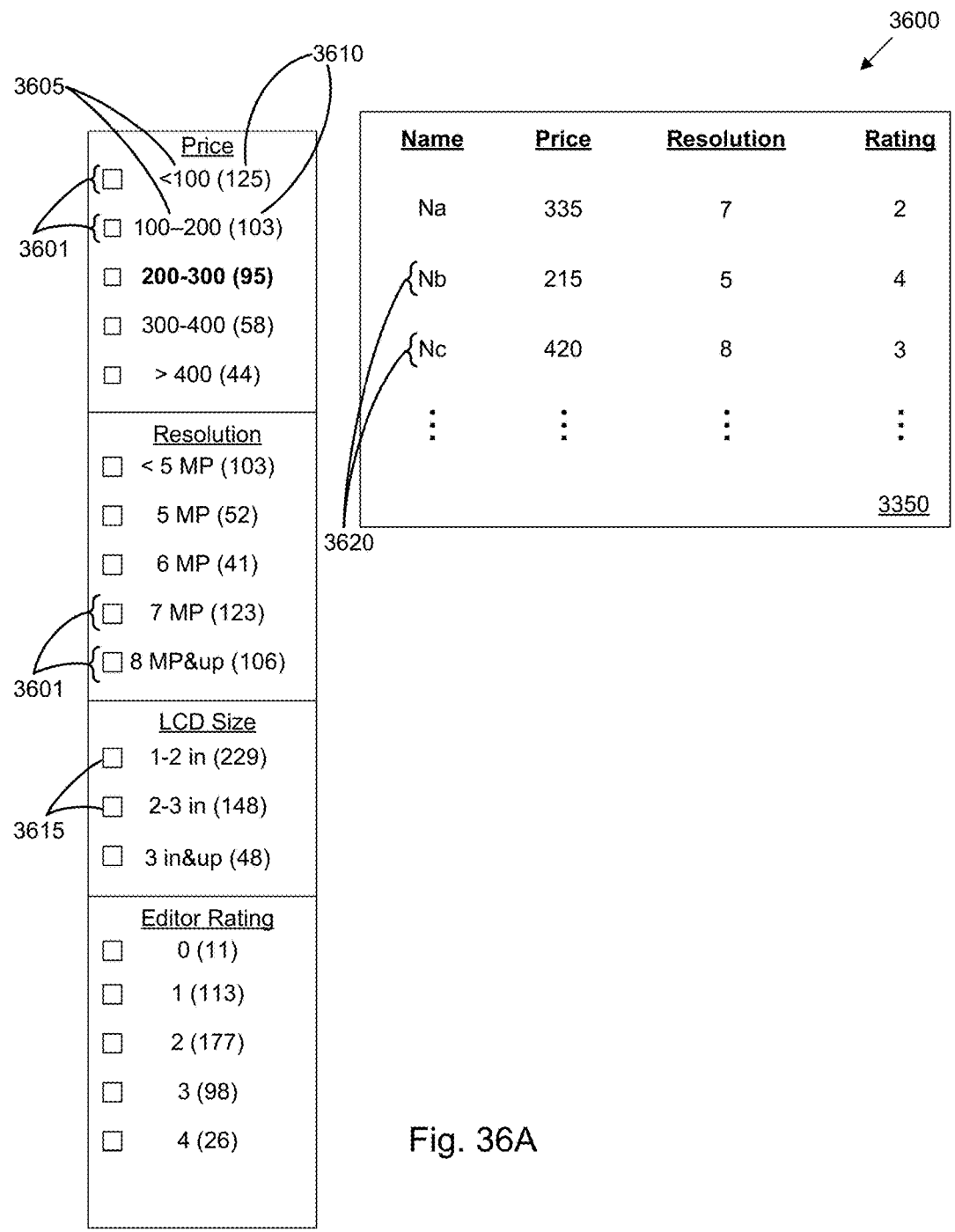

FIGS. 36A-D show exemplary screen shots of user interfaces 3600 implementing drill down tools. FIG. 36A shows an exemplary screen shot of a user interface 3600 for selecting initial search criteria in a product shopping service for digital cameras. In the example of FIG. 36A, the user interface 3600 may be used to receive initial search criteria from the user to search a product database (e.g., stored in content database CD). The product database may comprise a plurality of product records of digital cameras, each record containing information regarding a particular digital camera. Potential users/buyers can access the database, providing various search criteria through user interfaces described herein, to locate potential digital cameras for purchase. Although some embodiments below relate to a product shopping service and digital camera products, other embodiments may relate to any other type of service and/or product.

As shown in the example of FIG. 36A, the user interface 3600 provides a plurality of user selectable drill down tools 3601. Each drill down tool may be associated with a particular search criterion of a particular category. A drill down tool 3601 may comprise a text component 3605, a matching number component 3610, and/or a criterion selection component 3615. The text component 3605 may comprise text (e.g., "100-200," "6MP," etc.) showing the particular search criterion of the particular category (e.g., "Price," "Resolution," etc.) associated with the drill down tool. The matching number component 3610 may comprise text showing the "exact-match number" comprising the number of records (in content database CD) having the associated search criterion as well as any other user specified search criteria (i.e., the number of records exactly matching the associated search criterion and any other specified search criteria). To illustrate, in the example of FIG. 36A, the text "103" (displayed between parentheses) indicates there are 103 digital-camera records in the database having the search criterion "100-200" for the "Price" category. The user interface 3600 may also show information regarding a plurality of records 3620 for a plurality of digital camera products. Information displayed for a record may include a Product Name (e.g., Na, Nb, Nc, etc.) and values for particular categories (such as "Price," "Resolution," etc.).

The text component 3605 and the matching number component 3610 of a drill down tool 3601 may be user selectable. Upon receiving a user selection of either the text component 3605 or the matching number component 3610, the particular search criterion associated with the drill down tool 3601 is selected and search results may be produced comprising exact matching records having the particular search criterion. The user interface 3600 may show the search results (in a search-results section 3350) by clearing from display any previously shown records (by no longer displaying the previously shown records) and displaying only search results comprising exact matching records having the associated search criterion.

Figure 36B:

FIG. 36B shows an exemplary screen shot of the user interface 3600 after a user selects the text component 3605 or the matching number component 3610 of the drill down tool 3601 (shown in boldface) for the associated search criterion "200-300" for the "Price" category. As shown in the example of FIG. 36B, the user interface 3600 no longer displays the previously shown records (as shown in FIG. 36A) and displays only search results comprising exact matching records having the associated search criterion "200-300" for the "Price" category (e.g., comprising 95 records in the database). The user interface 3600 may also display drill down tools 3601 for search criteria of only non-selected categories (e.g., categories other than "Price," such as "Resolution," "LCD," etc.). The user interface 3600 may also comprise a current search-criteria area 3625 displaying current search criteria specified by the user thus far.

In some embodiments, selection of a drill down tool 3601 is used to specify the search criterion associated with the drill down tool 3601 to produce and display new search results based on the associated search criterion. In these embodiments, upon receiving a selection of the drill down tool, the user interface displays (in the search-results section 3350) exact and/or non-exact matching records based on the associated search criterion and all other search criteria received thus far. FIG. 36C shows an exemplary screen shot of the user interface 3600 of FIG. 36B after a user selects the text component 3605 or the matching number component 3610 of the drill down tool 3601 (shown in boldface) for the associated search criterion "3" for the "Rating" category.

As shown in the example of FIG. 36C, the current search-criteria area 3625 of the user interface displays the current search criteria specified thus far by the user (e.g., "Price: 200-300 Rating: 3"). As shown in the example of FIG. 36C, the user interface 3600 displays search results based on the current search criteria, the search results comprising exact matching records 3301 and/or non-exact matching records 3302. The exact matching records 3301 may comprise records matching the current search criteria "200-300" for the "Price" category and "3" for the "Rating" category (comprising 15 records in the database). The non-exact matching records 3302 may comprise records not matching one or more of the current search criteria (e.g., having a "3" for the "Rating" category but not having "200-300" for the "Price" category, etc.). The user interface 3600 may also display drill down tools 3601 for search criteria of non-selected categories (e.g., categories other than "Price" and "Rating," such as "Resolution," "LCD," etc.).

Criterion Selection Component of a Drill Down Tool

In some embodiments, a drill down tool 3601 further comprises a criterion selection component 3615. The criterion selection component 3615 may comprise a user-selectable area (e.g., box) for selecting the particular search criterion associated with the drill down tool. Upon selecting the criterion selection component 3615, the user interface 3600 may display exact matching records having the associated search criterion and other specified search criteria while also continuing to display any previously shown exact matching records. In some embodiments, the user interface 3600 displays these exact matching records as the first listings of the exact matching records (at the top of the "Exact Matches" section of the user interface 3600).

FIG. 36D shows an exemplary screen shot of the user interface 3600 of FIG. 36C after a user selects the criterion selection component 3615 of the drill down tool 3601 (shown in boldface) for the associated search criterion "8&up" for the "Resolution" category. As shown in the example of FIG. 36D, the current search-criteria area 3625 of the user interface displays the current search criteria specified thus far by the user through the drill down tools 3601 (e.g., "Price: 200-300 Rating: 3 Resolution: 8"). As shown in the example of FIG. 36D, the user interface 3600 may display the two exact matching records having the new search criterion ("8&up" in the "Resolution" category) and all other specified search criteria as the first listings of the exact matching records (at the top of the "Exact Matches" section of the user interface 3600). The user interface 3600 may also continue to display any previously shown exact matching records (i.e., records exactly matching all previous search criteria specified prior to the new search criterion selected using the criterion selection component 3615). As shown in the example of FIG. 36D, the user interface 3600 may also display new non-exact matches 3302 based on the new search criterion ("8&up" in the "Resolution" category) and all other specified search criteria. The non-exact matching records 3302 may comprise records not having one or more of the current search criteria (e.g., having an "8&up" in the "Resolution" category, a "3" for the "Rating" category, but not having "200-300" for the "Price" category, etc.).

In some embodiments, upon selection of a criterion selection component 3615 of a drill down tool 3601 for an associated search criterion of an associated category, the user interface 3600 may continue to display drill down tools 3601 for search criteria of the particular category. For example, as shown in FIG. 36D, the user interface 3600 continues to display drill down tools 3601 for search criteria of the "Resolution" category. The user interface 3600 may also update the matching number components 3610 of the drill down tools 3601 to display text showing the "exact-match number" of records having the current search criteria specified thus far. As shown in the example of FIG. 36D, the matching number components 3610 of the drill down tools 3601 display the number of records having the current search criteria "200-300" for the "Price" category, "3" for the "Rating" category, and "8&up" for the "Resolution" category.

The user may also de-select the criterion selection component 3615 of a drill down tool 3601 to deselect the associated search criterion. Upon de-selection of the criterion selection component 3615, the user interface 3600 may no longer display exact matching records having the associated search criterion while also continuing to display any previously shown exact matching records. In some embodiments, the user interface 3600 removes the de-selected records from the first listings of the exact matching records (at the top of the "Exact Matches" section of the user interface 3600). FIG. 36C shows an exemplary screen shot of the user interface 3600 of FIG. 36D after a user de-selects the criterion selection component 3615 of the drill down tool 3601 (shown in boldface) for the associated search criterion "8&up" for the "Resolution" category.

As shown in the example of FIG. 36C, the current search-criteria area 3625 shows that the search criterion "8&up" for the "Resolution" category has been de-selected. Also, the user interface 3600 no longer displays the two exact matching records having the search criterion "8&up" in the "Resolution" category as the first listings of the exact matching records (at the top of the "Exact Matches" section of the user interface 3600). The user interface 3600 does so while continuing to display any previously shown exact matching records. The user interface 3600 may also display non-exact matches 3302 based on previous search criteria (and no longer based on the de-selected search criterion "8&up" in the "Resolution" category).

Multi-Select Drill-Down Function

Figure 36E:
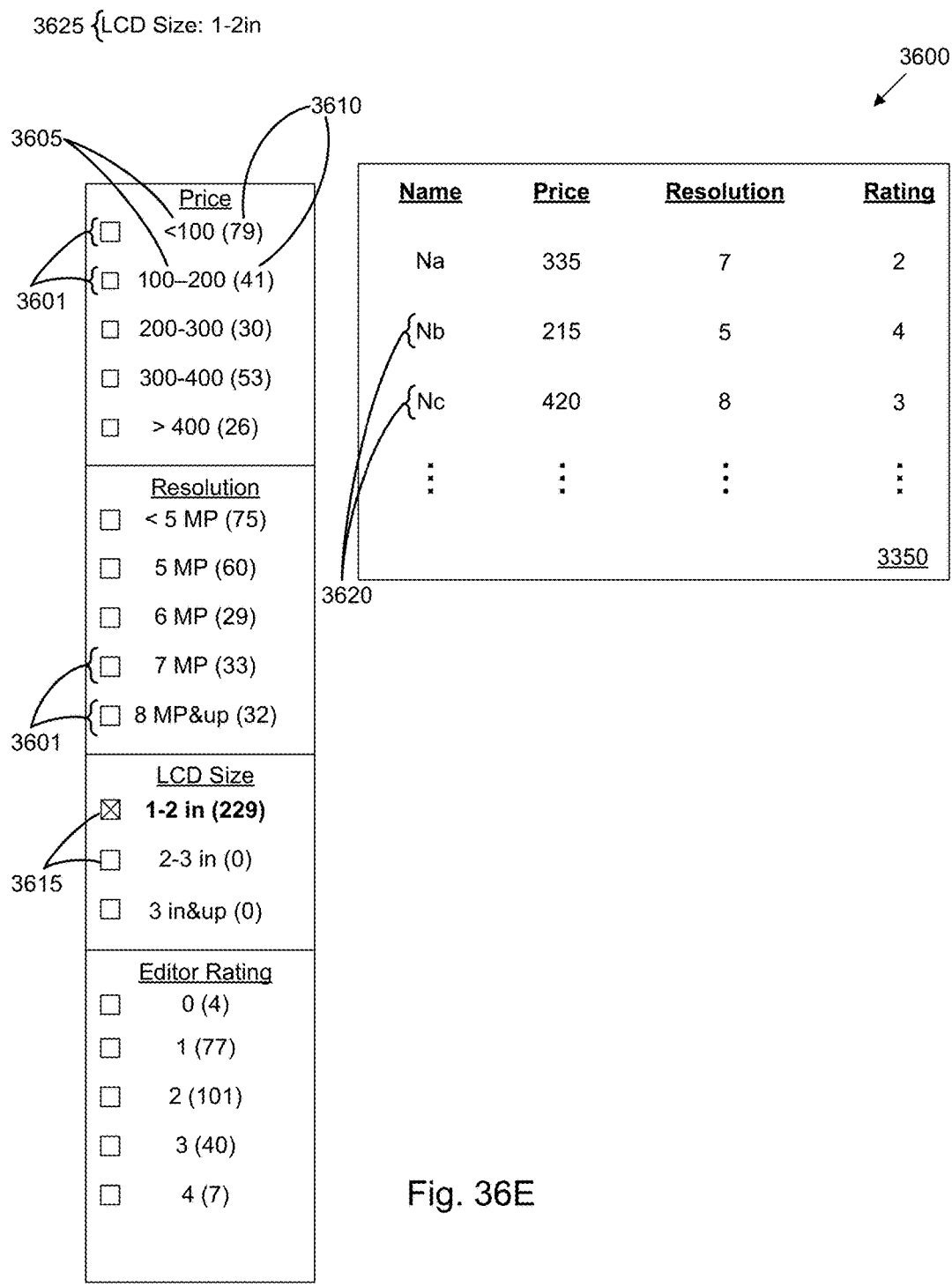

In some embodiments, the user interface may further provide a "multi-select drill-down" function for receiving two or more user-selections of two or more drill down tools 3601 (using two or more criterion selection components 3615) on a single instance of a user interface 3600 (e.g., on a single screenshot/page). In these embodiments, two or more search criteria (associated with the two or more drill down tools 3601) for a same category may be simultaneously selected/specified by a user (through the two or more criterion selection components 3615). FIGS. 36E-F show exemplary screen shots of user interfaces 3800 providing the multi-select drill-down function.

FIG. 36E shows an exemplary screen shot of the user interface 3600 of FIG. 36A after a user selects the criterion selection component 3615 of the drill down tool 3601 (shown in boldface) for the associated search criterion "1-2 in" for the "LCD Size" category. As shown in the example of FIG. 36E, the current search-criteria area 3625 of the user interface displays the current search criteria specified thus far by the user through the drill down tools 3601 (e.g., "LCD Size: 1-2 in"). Upon selection of a criterion selection component 3615 of a drill down tool 3601 for an associated search criterion of an associated category, the user interface 3600 may continue to display drill down tools 3601 for search criteria of the selected category. For example, as shown in FIG. 36E, the user interface 3600 continues to display drill down tools 3601 for search criteria of the "LCD Size" category, even though a selection of the drill down tool 3601 for the search criterion "1-2 in" has already been received for the "LCD Size" category. The user interface 3600 may also update the matching number components 3610 of each drill down tool 3601 to display text showing the "exact-match number" of records comprising the number of records having the search criterion associated with the drill down tool 3601 as well as the current search criteria. As shown in the example of FIG. 36E, the matching number components 3610 of the drill down tools 3601 display the number of records having the current search criteria "1-2 in" for the "LCD Size" category.

In some embodiments, the multi-select drill-down function allows the user to simultaneously select one or more additional search criteria (associated with one or more additional drill down tools 3601) of the previously selected "LCD Size" category. In these embodiments, when two or more search criteria of the same category are simultaneously selected by a user (through the two or more drill down tools 3601), the matching number component 3610 of a drill down tool 3601 may display an "any-match" number comprising the number of records having the search criterion associated with the drill down tool 3601 as well any of the two or more search criteria specified for the same category. The "any-match" number may be displayed rather than the "exact-match number" which, as discussed above, comprises the number of records having the search criterion associated with the drill down tool 3601 and each of the current search criteria (which in this case may result in zero matching records).

FIG. 36F shows an exemplary screen shot of the user interface 3600 of FIG. 36E after a user further selects the criterion selection component 3615 of the drill down tool 3601 (shown in boldface) for the associated search criterion "2-3 in" for the previously selected "LCD Size" category. As shown in the example of FIG. 36F, the current search-criteria area 3625 of the user interface displays the current search criteria specified thus far by the user through the drill down tools 3601 (e.g., "LCD Size: 1-2 in" and "LCD Size: 2-3 in"), wherein two or more of the current search criteria are specified for the same category. In some embodiments, the user interface 3600 may also update the matching number components 3610 of each drill down tool 3601 to display text showing the "any-match number" of records having the search criterion associated with the drill down tool 3601 as well any of the two or more search criteria specified for the same category.

As shown in the example of FIG. 36F, the matching number components 3610 of the drill down tools 3601 display the number of records having its associated search criterion and also having either the search criterion "1-2 in" or the search criterion "2-3 in" for the "LCD Size" category. As such, in comparison to FIG. 36E, each drill down tool 3601 now displays the number of records having its associated search criterion and the search criterion "1-2 in" for the "LCD Size" category plus the number of records having its associated search criterion and the search criterion "2-3 in" for the "LCD Size" category. In other words, first and second search criteria for the same category may be simultaneously selected using the drill down tools, where the any-match number comprises the number of records comprising information that matches the associated search criterion and the first search criterion selected for a first category plus the number of records comprising information that matches the associated search criterion and the second search criterion selected for the first category. Thus, as further search criteria for the same category are selected (through drill down tools 3601), each drill down tool 3601 is continually updated to display the total sum of records having its associated search criterion and any of the search criteria selected for the same category.

Category-Value Slider Tools Used with Drill Down Tools

In some embodiments, a user interface may provide one or more category-value slider tools 3410 for use in conjunction with one or more drill down tools 3601. As discussed above, a category-value slider tool 3410 may be associated with a particular category and is used by a user to change search criterion of the associated category. As discussed above, a drill down tool 3601 may be associated with a particular search criterion of a particular category and may comprise a matching number component 3610 showing an "exact-match number" comprising the number of records (in a database) having information that exactly matches the associated search criterion and any other specified search criteria.

In these embodiments, upon a category-value slider tool 3410 receiving a new search criterion for the associated category from the user, each matching number component 3610 of each drill down tool 3601 may be updated to show (dynamically and in real-time) the "exact-match" number of records exactly matching the search criterion of the category associated with the drill down tool 3601 and the new search criterion of the category associated with the category-value slider tool 3410 (as well as any other user specified search criteria). As such, as the user inputs new search criterion of a category using a category-value slider tool 3410, the matching number components 3610 of the drill down tools 3601 may display new exact-match numbers based on the new search criterion received through the category-value slider tool 3410. The matching number components 3610 may be updated dynamically and in real-time as search criteria are changed (via the category-value slider tool 3410), without requiring the user to type in new search criteria or to otherwise initiate the display of the new exact-match numbers.

FIGS. 37A-B show exemplary screen shots of user interfaces 3700 implementing category-value slider tools for use in conjunction with drill down tools. FIG. 37A shows the user interface 3700 of FIG. 36C but further providing a category-value slider tool 3410. In the example of FIG. 37A, a category-value slider tool 3410 is provided to change a search criterion comprising a range of values for the "Price" category. In FIG. 37A, the category-value slider tool 3410 has been used to change the previous search criterion of "200 to 300" in the "Price" category to the new search criterion of "300 to 400" in the "Price" category. As the user changes the search criterion, the new search criterion may be shown near the category-value slider tool 3410.

FIG. 37B shows an exemplary user interface 3700 based on the change of search criterion shown in FIG. 37A. As shown in FIG. 37B, the current search-criteria area 3625 of the user interface 3700 displays the current search criteria specified thus far by the user through the drill down tools 3601 and the category-value slider tool 3410 (e.g., "Price: 300-400 Rating: 3"). When the user uses the category-value slider tool 3410 to specify a new search criterion for the "Price" category, each matching number component 3610 of each drill down tool 3601 is updated to show (dynamically and in real-time) the number of records exactly matching the search criterion of the category associated with the drill down tool 3601 and the new search criterion of the category associated with the category-value slider tool 3410 (as well as any other user specified search criteria).

For example, for the drill down tool 3601 with associated search criterion "7" in the "Resolution" category, the matching number component 3610 is updated to show (dynamically and in real-time) that eleven records exactly match the search criterion of "7" in the "Resolution" category, the category associated with the drill down tool 3601, the new search criterion of "300 to 400" in the "Price" category, and the user specified search criterion of "3" in the "Rating" category. As such, the matching number components 3610 in FIG. 37B have been updated/changed (dynamically and in real-time) based on the new search criterion for the "Price" category inputted via the category-value slider tool 3410, without requiring the user to type in the new search criterion or to otherwise initiate the updating of the matching number components 3610.

Note that when the user uses the one or more category-value slider tools 3410 to specify one or more new search criteria for one or more categories (e.g., for the "Price" category), the user interface 3700 also dynamically and in real-time shows new search results based on the one or more new search criteria, the search results comprising exact matching records 3751 and/or non-exact matching records 3752. In some embodiments, the user interface 3700 may further provide one or more category-weight slider tools 3310. As discussed above, a category-weight slider tool 3310 may be associated with a particular category and is used by a user to change the weight of the associated category. As the user changes the weight of one or more categories using the one or more category-weight slider tools 3310, the user interface 3700 also dynamically and in real-time shows search results based on the one or more new category weights, the search results comprising exact matching records 3751 and/or non-exact matching records 3752.

Using a Search Result to Specify Search Criteria

In some embodiments, a user interface may provide a "search-result selection" function for selecting a particular search result as search criteria for a new search query to a database. In these embodiments, in any of the user interfaces discussed above, each search result/record may be made user selectable. Upon selection of a search result/record (comprising an exact or non-exact matching record), the user interface may retrieve information of the selected search result/record from the content database CD. As discussed above, a record may contain various pieces of information (e.g., relating to a particular real estate, product, candidate, etc.). The information in the record may be parsed into a plurality of categories and a plurality of values, each value relating to a particular category.

The user interface may then use the information of the selected search result/record (comprising a plurality of values for the plurality of categories) as new search criteria for a new search query to the database. Using the new search criteria (based on the information of the selected search result/record), the user interface may produce and show search results comprising exact and/or non-exact matching records. As such, the user interface may show other records in the database CD that exactly match the selected search result/record and/or show other records in the database CD that are similar to the selected search result/record.

Figure 38A:
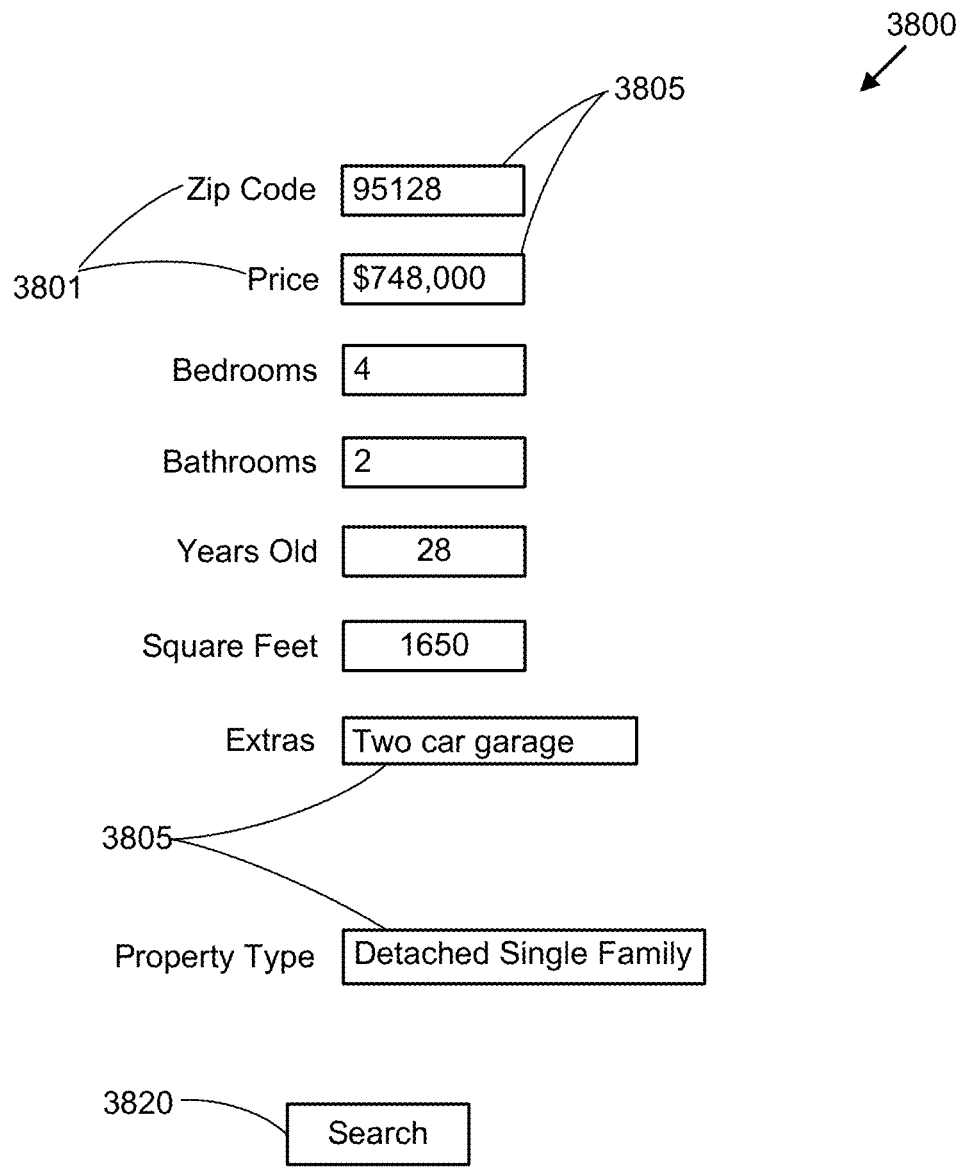

FIGS. 38A-B show exemplary screen shots of user interfaces 3800 providing the search-result selection function for selecting a particular search result as search criteria for a new search query to a database. FIG. 38A shows an exemplary user interface 3700 based on selecting the search result/record having address "A7" from the search results shown in FIG. 33A. Upon selection, the user interface 3800 has retrieved the information for the selected "A7" search result/record from the content database CD and the information has been parsed into a plurality of categories 3801 and a plurality of values 3805, each value 3805 relating to a particular category 3801. The user may then select the search button 3820 to initiate a new search query on the database CD using the plurality of values 3805 for the plurality of categories 3801 as new search criteria for the new search query.

FIG. 38B shows an exemplary user interface 3700 showing search results based on the information of the selected search result/record shown in FIG. 38A. Using the new search criteria based on the selected search result/record, the user interface 3800 may produce and show search results comprising one or more exact matching records 3301 and/or one or more non-exact matching records 3302. As such, the user interface 3800 may show other records in the database CD that exactly match the selected search result/record and/or show other records in the database CD that are similar to the selected search result/record. In some embodiments, the user interface may produce and show the search results (based on the information of the selected search result/record) directly upon receiving a selection of the search result, and without first showing the information of the selected search result/record. For example, in these embodiments, the user interface 3800 may not show the information of the selected search result shown in FIG. 38A and produce and show the search results shown in FIG. 38B directly upon receiving the user selection of the "A7" search result/record.

In some embodiments, the search-result selection function may be used in any of the user interfaces (providing exact and/or non-exact matches) discussed herein and in conjunction with any of the user interface tools described herein (such as the category-weight slider tool 3310, category-value slider tool 3410, mapping tool 3510, and/or drill down tool 3601). In some embodiments, any of the user interface tools or functions described herein may be used in any combination, and be implemented in a user interface providing exact and/or non-exact matches. For example, one or more category-weight slider tools, one or more category-value slider tools, one or more mapping tools, one or more drill down tools, the multi-select drill-down function, the search-result selection function, or any combination thereof, may be provided in a same user interface, the user interface showing search results comprising exact and/or non-exact matches.

Figure 39:
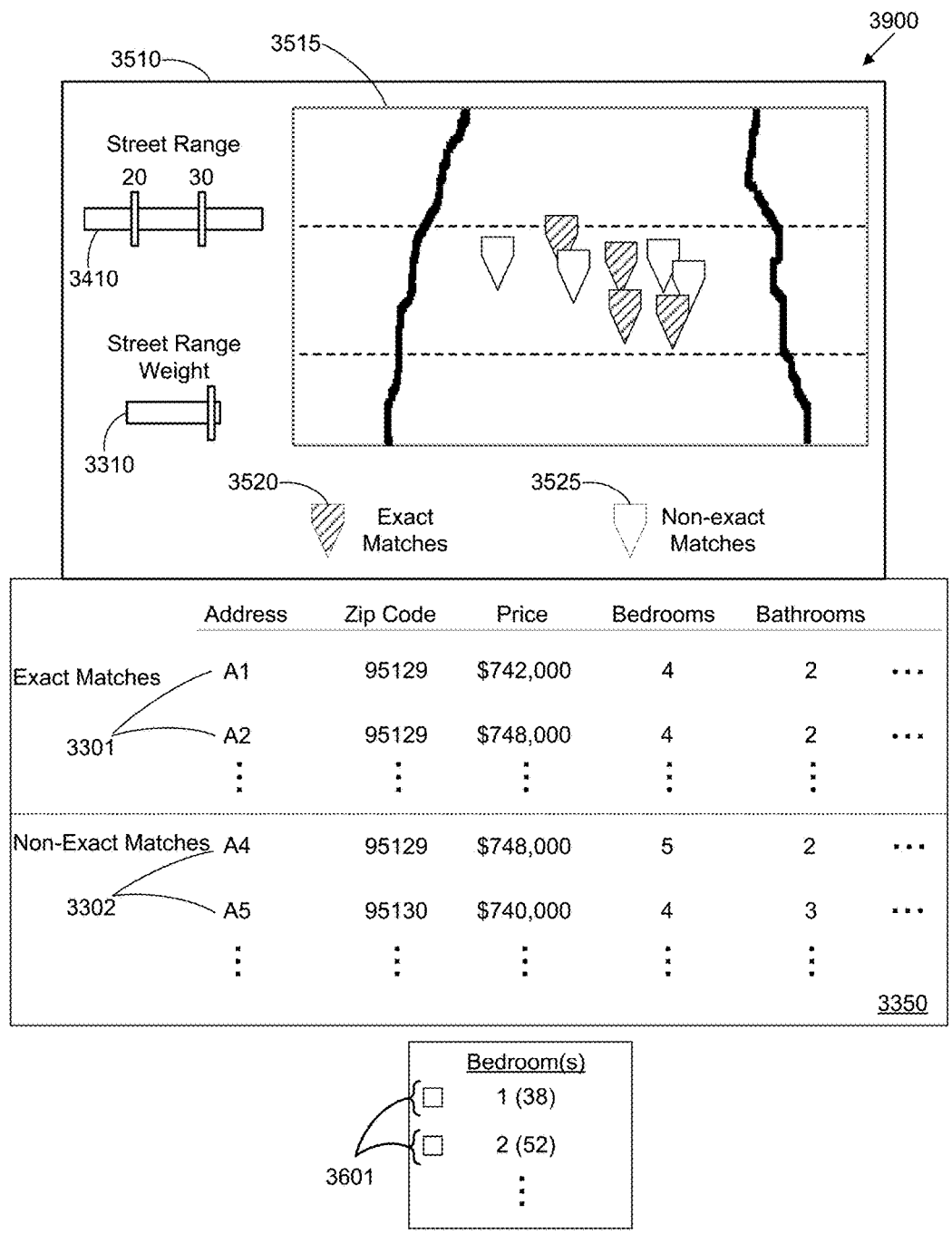
FIG. 39 shows an exemplary screen shot of a user interface implementing various user interface tools and functions described herein.

FIG. 39 shows an exemplary screen shot of a user interface 3900 implementing various user interface tools and functions described herein. As shown in the example of FIG. 39, the user interface 3900 provides a category-weight slider tool 3310, a category-value slider tool 3410, a mapping tool 3510, drill down tools 3601, and a search-result selection function. The user interface 3900 also shows search results comprising exact matches 3301 and/or non-exact matches 3302.

Although preferred embodiments of the invention have been disclosed for illustrative purposes, those skilled in the art will appreciate that many additions, modifications and substitutions are possible without departing from the scope and spirit of the invention as defined by the accompanying claims.

I claim:

1. A method of handling a search query, comprising:
   displaying, on a user interface of a computer, a plurality of search criteria fields for a plurality of categories, wherein each search criteria field corresponds to one of the categories;
   displaying, on the user interface, an input mechanism to input a plurality of weight values, one for each category, to designate an importance of the category to the user relative to other categories;
   receiving, through the user interface, a search query comprising a plurality of search criteria values for the categories entered through the search criteria fields;
   receiving, through the user interface, the weight values for the categories;
   searching, in response to the search query, a database, stored in computer storage, comprising a plurality of records that comprise information regarding the categories;
   computing a relevance value for a non-exact matching record, such that:

the relevance value of a non-exact matching record increases when the weight value of an associated category increases and when the record contains information that matches the search criterion specified for the associated category;

the relevance value of a non-exact matching record decreases when the weight value of an associated category increases and when the record contains information that does not match the search criterion specified for the associated category;

the relevance value of a non-exact matching record decreases when the weight value of an associated category decreases and when the record contains information that matches the search criterion specified for the associated category; and the relevance value of a non-exact matching record increases when the weight value of an associated category decreases and when the record contains information that does not match the search criterion specified for the associated category;

displaying, in response to the searching, an indication for one or more exact matching records on the user interface, wherein an exact matching record comprises information that exactly matches all search criteria values of the received search query; and displaying, in response to the searching, an indication for one or more non-exact matching records on the user interface, wherein a non-exact matching record comprises information that does not exactly match one or more of the search criteria values of the received search query, based on the relevance values for the non-exact matching records.

2. The method as set forth in claim 1, wherein receiving, through the user interface, the weight values for the categories comprises:

receiving the weight values for the categories through a plurality of weight slider tools, one associated with each category.

3. The method as set forth in claim 2, wherein receiving, through a plurality of weight slider tools, the weight values comprises:

receiving the weight values through a weight adjuster element on the weight slider tools, wherein the user may change the weight value of an associated category by selecting and dragging the weight adjuster element to decrease or increase the weight value.

4. The method as set forth in claim 1, wherein receiving, through the user interface, a search query comprises:

receiving the search query through a plurality of criterion slider tools.

5. The method as set forth in claim 1, further comprising:
receiving, through the user interface, a new weight value for at least one category; and
displaying, on the user interface, a new ordering of the non-exact matching records based on the new weight value.

6. The method as set forth in claim 5, further comprising:
displaying dynamically, and in real-time, a new ordering of non-exact matches as new weight values are received from one or more categories.

7. The method as set forth in claim 1, further comprising:
displaying a user-selectable drill down tool for an associated search criterion of an associated category;
displaying text to indicate a number of records that comprise information that exactly matches the associated search criterion and all received search criteria;

receiving selection of the user-selectable drill down tool; and
displaying one or more non-exact matching records based on the associated search criterion and all received search criteria.

8. The method as set forth in claim 1, further comprising:
receiving a user selection of a non-exact matching record;
generating a new search query that comprises information of the selected non-exact matching record; and
displaying one or more non-exact matching records based on the new search query.

9. A computer-implemented system for handling a search query, comprising:
a user input section for:
displaying, on a user interface of a computer, a plurality of search criteria fields for a plurality of categories, wherein each search criteria field corresponds to one of the categories;
displaying, on the user interface, an input mechanism to input a plurality of weight values, one for each category, to designate an importance of the category to the user relative to other categories;
receiving, through the user interface, a search query comprising a plurality of search criteria values for the categories entered through the search criteria fields;
receiving, through the user interface, the weight values for the categories;
at least one processor and memory, for:
searching, in response to the search query, a database, stored in the memory, comprising a plurality of records that comprise information regarding the categories;
computing a relevance value for a non-exact matching record, such that:
the relevance value of a non-exact matching record increases when the weight value of an associated category increases and when the record contains information that matches the search criterion specified for the associated category;
the relevance value of a non-exact matching record decreases when the weight value of an associated category increases and when the record contains information that does not match the search criterion specified for the associated category;
the relevance value of a non-exact matching record decreases when the weight value of an associated category decreases and when the record contains information that matches the search criterion specified for the associated category; and
the relevance value of a non-exact matching record increases when the weight value of an associated category decreases and when the record contains information that does not match the search criterion specified for the associated category;
a display section for:
displaying, in response to the searching, an indication for one or more exact matching records on the user interface, wherein an exact matching record comprises information that exactly matches all search criteria values of the received search query; and
displaying, in response to the searching, an indication for one or more non-exact matching records on the user interface, wherein a non-exact matching record comprises information that does not exactly match one or more of the search criteria values of the received search query, each non-exact matching record having a relevance value based, in part, on the weight values of the received search query, the non-exact matching records being displayed in an order based on the relevance values.

10. The system as set forth in claim 9, wherein the user input section for receiving, through the user interface, the weight values for the categories comprises a portion for:
receiving the weight values for the categories through a plurality of weight slider tools, one associated with each category.

11. The system as set forth in claim 10, wherein the user input section for receiving, through a plurality of weight slider tools, the weight values comprises a portion for:
receiving the weight values through a weight adjuster element on the weight slider tools, wherein the user may change the weight value of an associated category by selecting and dragging the weight adjuster element to decrease or increase the weight value.

12. The system as set forth in claim 9, wherein the user input section for receiving, through the user interface, a search query comprises a portion for:
receiving the search query through a plurality of criterion slider tools.

13. The system as set forth in claim 9, wherein
the user input section is further for receiving, through the user interface, a new weight value for at least one category; and
the display section is further for displaying, on the user interface, a new ordering of the non-exact matching records based on the new weight value.

14. The system as set forth in claim 13, the display section further comprising a portion for:
displaying dynamically, and in real-time, a new ordering of non-exact matches as new weight values are received from one or more categories.

15. The system as set forth in claim 9, wherein:
the display section is further for:
displaying a user-selectable drill down tool for an associated search criterion of an associated category;
displaying text to indicate a number of records that comprise information that exactly matches the associated search criterion and all received search criteria;
the input section is further for receiving selection of the user-selectable drill down tool; and
the display section is further for displaying one or more non-exact matching records based on the associated search criterion and all received search criteria.

16. The system as set forth in claim 9, wherein:
the input section is further for:
receiving a user selection of a non-exact matching record;
generating a new search query that comprises information of the selected non-exact matching record; and
the display section is further for displaying one or more non-exact matching records based on the new search query.

17. A non-transitory computer-readable storage medium storing one or more instructions which, when executed by one or more processors, cause the one or more processors to perform steps comprising:
displaying, on a user interface of a computer, a plurality of search criteria fields for a plurality of categories, wherein each search criteria field corresponds to one of the categories;
displaying, on the user interface, an input mechanism to input a plurality of weight values, one for each category, to designate an importance of the category to the user relative to other categories;
receiving, through the user interface, a search query comprising a plurality of search criteria values for the categories entered through the search criteria fields;
receiving, through the user interface, the weight values for the categories;
searching, in response to the search query, a database, stored in computer storage, comprising a plurality of records that comprise information regarding the categories;
computing a relevance value for a non-exact matching record, such that:
the relevance value of a non-exact matching record increases when the weight value of an associated category increases and when the record contains information that matches the search criterion specified for the associated category;
the relevance value of a non-exact matching record decreases when the weight value of an associated category increases and when the record contains information that does not match the search criterion specified for the associated category;
the relevance value of a non-exact matching record decreases when the weight value of an associated category decreases and when the record contains information that matches the search criterion specified for the associated category; and
the relevance value of a non-exact matching record increases when the weight value of an associated category decreases and when the record contains information that does not match the search criterion specified for the associated category;
displaying, in response to the searching, an indication for one or more exact matching records on the user interface, wherein an exact matching record comprises information that exactly matches all search criteria values of the received search query; and
displaying, in response to the searching, an indication for one or more non-exact matching records on the user interface, wherein a non-exact matching record comprises information that does not exactly match one or more of the search criteria values of the received search query, based on the relevance values for the non-exact matching records.

18. The non-transitory computer-readable storage medium as set forth in claim 17, wherein receiving, through the user interface, the weight values for the categories comprises:
receiving the weight values for the categories through a plurality of weight slider tools, one associated with each category.

19. The non-transitory computer-readable storage medium as set forth in claim 18, wherein receiving, through a plurality of weight slider tools, the weight values comprises:
receiving the weight values through a weight adjuster element on the weight slider tools, wherein the user may change the weight value of an associated category by selecting and dragging the weight adjuster element to decrease or increase the weight value.

20. The non-transitory computer-readable storage medium as set forth in claim 17, wherein receiving, through the user interface, a search query comprises:

receiving the search query through a plurality of criterion slider tools.

* * * * *